US009118083B2

(12) United States Patent
Monden et al.

(10) Patent No.: US 9,118,083 B2
(45) Date of Patent: Aug. 25, 2015

(54) METHOD FOR PRODUCING FUEL CELL ELECTRODE CATALYST, FUEL CELL ELECTRODE CATALYST, AND USES THEREOF

(75) Inventors: Ryuji Monden, Tokyo (JP); Takuya Imai, Tokyo (JP); Yasuaki Wakizaka, Tokyo (JP); Kunchan Lee, Tokyo (JP); Takashi Sato, Tokyo (JP)

(73) Assignee: SHOWA DENKO K.K, Tokyo (JP)

( * ) Notice: Subject to any disclaimer, the term of this patent is extended or adjusted under 35 U.S.C. 154(b) by 111 days.

(21) Appl. No.: 13/979,333

(22) PCT Filed: Aug. 9, 2011

(86) PCT No.: PCT/JP2011/068171
§ 371 (c)(1),
(2), (4) Date: Jul. 11, 2013

(87) PCT Pub. No.: WO2012/096022
PCT Pub. Date: Jul. 19, 2012

(65) Prior Publication Data
US 2013/0288154 A1    Oct. 31, 2013

(30) Foreign Application Priority Data
Jan. 14, 2011  (JP) .................................. 2011-006190

(51) Int. Cl.
*H01M 4/90* (2006.01)
*H01M 4/88* (2006.01)
(Continued)

(52) U.S. Cl.
CPC .......... *H01M 4/9008* (2013.01); *B01J 31/0232* (2013.01); *B01J 31/223* (2013.01);
(Continued)

(58) Field of Classification Search
None
See application file for complete search history.

(56) References Cited

U.S. PATENT DOCUMENTS 7,585,585 B2    9/2009  Ozaki et al.
8,003,561 B2    8/2011  Ishida et al.
(Continued)

FOREIGN PATENT DOCUMENTS

CN    101627496 A    1/2010
CN    101909749 A    12/2010
(Continued)

OTHER PUBLICATIONS

Fengxiang Yin, et al; "Improved Catalytic Performance of Nitrided Co-Ti and Fe-Ti Catalysts for Oxygen Reduction as Non-Noble Metal Cathodes in Acidic Media"; Electrochemistry Communications; vol. 12, Issue 9; Sep. 2010; pp. 1177-1179.
(Continued)

*Primary Examiner* — Gregg Cantelmo
(74) *Attorney, Agent, or Firm* — Sughrue Mion, PLLC

(57) ABSTRACT

A method for producing a fuel cell electrode catalyst, including: a step (1) of mixing at least a metal compound (1), a nitrogen-containing organic compound (2), a compound (3) containing fluorine and at least one element A selected from the group consisting of boron, phosphorus, and sulfur, and a solvent to obtain a catalyst precursor solution, a step (2) of removing the solvent from the catalyst precursor solution, and a step (3) of heat-treating a solid residue, obtained in the step (2), at a temperature of 500 to 1100° C. to obtain an electrode catalyst; a portion or the entirety of the metal compound (1) being a compound containing, as a metal element, at least one transition metal element M1 selected from the elements of group 4 and group 5 of the periodic table; and at least one of the compounds (1), (2), and (3) having an oxygen atom.

13 Claims, 42 Drawing Sheets

(Catalyst 1)

(51) Int. Cl.
   *B01J 31/02* (2006.01)
   *B01J 31/22* (2006.01)
   *B01J 37/04* (2006.01)
   *B01J 37/08* (2006.01)

(52) U.S. Cl.
   CPC .............. *B01J31/2239* (2013.01); *H01M 4/88* (2013.01); *H01M 4/9041* (2013.01); *B01J 2531/42* (2013.01); *B01J 2531/57* (2013.01); *B01J 2531/58* (2013.01); *B01J 2531/62* (2013.01); *B01J 2531/72* (2013.01); *B01J 2531/842* (2013.01); *B01J 2531/845* (2013.01); *B01J 2531/847* (2013.01); *B01J 2540/42* (2013.01); *Y02E 60/50* (2013.01)

(56) References Cited

U.S. PATENT DOCUMENTS

| | | | |
|---|---|---|---|
| 8,435,916 | B2 | 5/2013 | Ishida et al. |
| 2004/0096728 | A1 | 5/2004 | Campbell |
| 2010/0086823 | A1 | 4/2010 | Koshino et al. |
| 2010/0129698 | A1 | 5/2010 | Okada et al. |
| 2010/0227253 | A1 | 9/2010 | Monden et al. |
| 2010/0255404 | A1 | 10/2010 | Kurozumi et al. |
| 2010/0323272 | A1 | 12/2010 | Ozaki et al. |
| 2011/0008709 | A1 | 1/2011 | Shishikura et al. |
| 2011/0015058 | A1 | 1/2011 | Maki |
| 2011/0020729 | A1 | 1/2011 | Monden et al. |
| 2011/0034325 | A1 | 2/2011 | Catanorchi et al. |
| 2011/0053040 | A1 | 3/2011 | Monden et al. |
| 2011/0143253 | A1 | 6/2011 | Miyata et al. |
| 2012/0220446 | A1 | 8/2012 | Kishimoto et al. |
| 2012/0315568 | A1 | 12/2012 | Lee et al. |

FOREIGN PATENT DOCUMENTS

| | | |
|---|---|---|
| JP | 2004-303664 A | 10/2004 |
| JP | 2005-19332 A | 1/2005 |
| JP | 2007-26746 A | 2/2007 |
| JP | 2007-207662 A | 8/2007 |
| JP | 2008-021638 A | 1/2008 |
| JP | 2008-258150 A | 10/2008 |
| JP | 2009-23887 A | 2/2009 |
| JP | 2009-208061 A | 9/2009 |
| JP | 2009-255053 A | 11/2009 |
| JP | 2009-291714 A | 12/2009 |
| WO | 2006/104123 A1 | 10/2006 |
| WO | 2007/072665 A1 | 6/2007 |
| WO | 2008/111570 A1 | 9/2008 |
| WO | 2009/028408 A1 | 3/2009 |
| WO | 2009/031383 A1 | 3/2009 |
| WO | 2009/107518 A1 | 9/2009 |
| WO | 2009/119523 A1 | 10/2009 |
| WO | 2009/124905 A1 | 10/2009 |
| WO | 2011/099493 A1 | 8/2011 |

OTHER PUBLICATIONS

Song-Wang Yang et al; "Simple and Effective Preparation of N-doped $TiO_2$ Nanocrystallites with Visible-light Activities"; Journal of Inorganic Materials (Chinese); vol. 20, No. 4; 2005; pp. 785-788.

(Catalyst 1)

(Catalyst 1)

(Catalyst 2)

(Catalyst 2)

(Catalyst 3)

(Catalyst 3)

(Catalyst 4)

(Catalyst 4)

(Catalyst 5)

(Catalyst 5)

(Catalyst 6)

(Catalyst 6)

(Catalyst 7)

(Catalyst 7)

(Catalyst 8)

(Catalyst 8)

(Catalyst 9)

(Catalyst 9)

(Catalyst 10)

(Catalyst 10)

(Catalyst 11)

(Catalyst 11)

(Catalyst 12)

(Catalyst 12)

(Catalyst 13)

(Catalyst 13)

15

14

13

12

11

12

13

14

15

(Single cell 13)

(Catalyst 14)

(Catalyst 14)

(Single cell 14)

(Catalyst 15)

(Catalyst 15)

(Catalyst 16)

(Catalyst 16)

(Catalyst 17)

(Catalyst 17)

(Catalyst 18)

(Catalyst 18)

(Catalyst 19)

(Catalyst 19)

(Catalyst 20)

(Catalyst 20)

(Catalyst 21)

(Catalyst 21)

(Catalyst 22)

(Catalyst 22)

(Catalyst 23)

(Catalyst 23)

(Catalyst 24)

(Catalyst 24)

(Catalyst 25)

(Catalyst 25)

(Catalyst 26)

(Catalyst 26)

(Catalyst 27)

(Catalyst 27)

(Catalyst 28)

(Catalyst 28)

(Single cell 28)

(Catalyst 29)

(Catalyst 29)

(Catalyst 30)

(Catalyst 30)

(Catalyst c1)

(Catalyst c1)

(Catalyst c2)

(Catalyst c2)

(Catalyst c3)

(Catalyst c3)

(Catalyst c4)

(Catalyst c4)

(Catalyst c5)

(Catalyst c5)

(Catalyst c6)

(Catalyst c6)

(Catalyst c7)

(Catalyst c7)

(Catalyst c8)

(Catalyst c8)

(Catalyst c9)

(Catalyst c9)

(Catalyst c10)

(Catalyst c10)

(Catalyst c11)

(Catalyst c11)

(Catalyst c12)

(Catalyst c12)

(Catalyst c13)

(Catalyst c14)

(Catalyst c15)

(Catalyst c16)

(Catalyst c17)

(Catalyst 31)

(Catalyst 31)

(Catalyst 32)

(Catalyst 32)

(Catalyst 33)

(Catalyst 33)

(Catalyst 34)

(Catalyst 34)

(Catalyst 35)

(Catalyst 35)

(Catalyst 36)

(Catalyst 36)

(Catalyst 37)

(Catalyst 37)

(Catalyst 38)

(Catalyst 38)

(Catalyst 39)

(Catalyst 39)

(Catalyst 40)

(Catalyst 40)

(Catalyst 41)

(Catalyst 41)

(Catalyst 42)

(Catalyst 42)

METHOD FOR PRODUCING FUEL CELL ELECTRODE CATALYST, FUEL CELL ELECTRODE CATALYST, AND USES THEREOF

CROSS REFERENCE TO RELATED APPLICATIONS

This application is a National Stage of International Application No. PCT/JP2011/068171 filed Aug. 9, 2011, claiming priority based on Japanese Patent Application No. 2011-006190 filed Jan. 14, 2011, the contents of all of which are incorporated herein by reference in their entirety.

TECHNICAL FIELD

The present invention relates to a method for producing a fuel cell electrode catalyst; a fuel cell electrode catalyst; and uses thereof.

BACKGROUND ART

A polymer electrolyte fuel cell is a fuel cell in the form in which a polymer solid electrolyte is sandwiched between an anode and a cathode, a fuel is supplied to the anode, and oxygen or air is supplied to the cathode, whereby oxygen is reduced at the cathode to produce electricity. As the fuel, hydrogen, methanol, or the like is mainly used.

To enhance a reaction rate in a fuel cell and to enhance the energy conversion efficiency of the fuel cell, a layer containing a catalyst (hereinafter also referred to as a "fuel cell catalyst layer") has been conventionally disposed on the surface of a cathode (air electrode) or the surface of an anode (fuel electrode) of the fuel cell.

As such a catalyst, noble metals have been generally used, and, among the noble metals, a noble metal stable at a high potential and having a high activity, such as platinum or palladium, has been mainly used. However, since these noble metals are expensive and limited in resource amount, development of substitutable catalysts has been desired.

Further, there has been a problem that the noble metals used on the surface of a cathode may be dissolved under an acidic atmosphere and are not suitable for uses requiring long-term durability. Accordingly, it has been strongly demanded that catalysts are developed which are not corroded under an acidic atmosphere and have excellent durability and high oxygen reducing ability.

As a catalyst substituted for noble metals, those entirely free of noble metals, such as base metal carbides, base metal oxides, base metal carbonitroxides, chalcogen compounds, and carbon catalysts, have been reported (for example, see Patent Literature 1 to Patent Literature 4). These materials are inexpensive and abundant in resource amounts as compared with noble metal materials such as platinum.

However, these catalysts containing base metal materials described in Patent Literature 1 and Patent Literature 2 have a problem that practically sufficient oxygen reducing ability is not obtained.

Further, the catalysts described in Patent Literature 3 and Patent Literature 4, although exhibiting high oxygen reduction catalytic activity, have a problem that stability under fuel cell operating conditions is extremely low.

As a catalyst substituted for noble metals, Nb and Ti carbonitroxides in Patent Literature 5 and Patent Literature 6 can effectively express the above-described performance and thus have received particular attention.

Although the catalysts described in Patent Literature 5 and Patent Literature 6 have extremely high performance as compared with conventional catalysts substituted for noble metals, a portion of the production step thereof needs to include heat treatment under a high temperature of 1600° C. to 1800° C. (for example, Example 1 of Patent Literature 5 or Example 1 of Patent Literature 6).

Such high-temperature heat treatment is not industrially impossible but involves difficulty and causes increase in equipment cost and difficulty in operation control, leading to increase in production cost, and, thus, the development of a method capable of inexpensive production has been desired.

Patent Literature 7 reports a technology relating to the production of a carbon-containing titanium oxynitride that contains carbon, nitrogen, and oxygen.

However, according to the production method described in Patent Literature 7, the production of the carbon-containing titanium oxynitride requires two-stage synthesis: the production of a titanium oxynitride by reacting a nitrogen-containing organic compound with a titanium precursor; and the production of a carbon-containing titanium oxynitride by reacting a phenol resin with the titanium oxynitride precursor, and thus involves complicated steps. In particular, the production of the titanium oxynitride precursor requires complicated steps including stirring, heating, and refluxing at 80° C. as well as cooling and concentrating under reduced pressure, thus resulting in high production cost.

Further, since the phenol resin is a thermosetting resin having a three-dimensional network structure, it is difficult to homogenously mix and react the phenol resin with a metal oxide. In particular, there is a problem that since the thermal decomposition temperature of the phenol resin is 400° C. to 900° C., a carbonization reaction due to the complete decomposition of the phenol resin is unlikely to take place at a temperature of 1000° C. or less.

Furthermore, Patent Literature 7 and Non-Patent Literature 1 only describe applications to a thin film for a solar collector and a photocatalyst as uses thereof, failing to disclose or examine a method for producing a metal carbonitroxide having particulate or fibrous shape or the like that is highly useful as an electrode catalyst and uses thereof.

Patent Literature 8 discloses a method for producing an electrode catalyst characterized by burning a mixed material of an oxide and a carbon material precursor but an electrode catalyst having sufficient catalytic performance has not been obtained.

Further, Patent Literature 9 discloses a fuel cell electrode catalyst prepared by using a polynuclear complex of cobalt and the like but this catalyst has had problems that the toxicity of the raw material is high, a cost is high, and its catalytic activity is insufficient.

Non-Patent Literature 2 discloses a method for producing an electrode catalyst characterized by burning a mixed material of a titanium alkoxide and a carbon material precursor but the production step does not use an organic substance containing nitrogen and thus an electrode catalyst having sufficient catalytic performance has not been obtained.

CITATION LIST

Patent Literatures

Patent Literature 1: JP 2004-303664 A
Patent Literature 2: WO 07/072,665
Patent Literature 3: US 2004/0096728 A1
Patent Literature 4: JP 2005-19332 A
Patent Literature 5: WO 2009/031383

Patent Literature 6: WO 2009/107518
Patent Literature 7: JP 2009-23887 A
Patent Literature 8: JP 2009-255053 A
Patent Literature 9: JP 2008-258150 A Non-Patent Literatures Non-Patent Literature 1: Journal of Inorganic Materials (Chinese) 20, 4, P785
Non-Patent Literature 2: Electrochemistry Communications Volume 12, Issue 9, September 2010, Pages 1177-1179

SUMMARY OF INVENTION

Technical Field

The present invention seeks to overcome such problems as seen in conventional technologies.

It is an object of the present invention to provide a method for producing a fuel cell electrode catalyst having high catalytic activity using a transition metal (such as titanium) through heat treatment at comparatively low temperature.

Further, it is an object of the present invention to provide a novel heat-treated product useful as a fuel cell electrode catalyst.

Furthermore, it is an object of the present invention to provide a fuel cell electrode catalyst having high catalytic activity and uses thereof (such as electrodes).

Solution to Problem

The present invention relates to, for example, the following [1] to [16].

[1]
A method for producing a fuel cell electrode catalyst, comprising:
a step (1) of mixing at least a metal compound (1), a nitrogen-containing organic compound (2), a compound (3) containing fluorine and at least one element A selected from the group consisting of boron, phosphorus, and sulfur, and a solvent to obtain a catalyst precursor solution,
a step (2) of removing the solvent from the catalyst precursor solution, and
a step (3) of heat-treating a solid residue, obtained in the step (2), at a temperature of 500 to 1100° C. to obtain an electrode catalyst;
a portion or the entirety of the metal compound (1) being a compound containing, as a metal element, at least one transition metal element M1 selected from the elements of group 4 and group 5 of the periodic table; and
at least one of the metal compound (1), the nitrogen-containing organic compound (2), and the compound (3) having an oxygen atom.

[2]
The method for producing a fuel cell electrode catalyst according to the above [1], wherein the compound (3) is at least one selected from the group consisting of boric acid derivatives containing fluorine, sulfonic acid derivatives containing fluorine, and phosphoric acid derivatives containing fluorine.

[3]
The method for producing a fuel cell electrode catalyst according to the above [1] or [2], wherein in the step (1), a solution of the metal compound (1) is mixed with the nitrogen-containing organic compound (2).

[4]
The method for producing a fuel cell electrode catalyst according to any one of the above [1] to [3], wherein in the step (1), a precipitation suppressant comprising a compound having a diketone structure is further mixed.

[5]
The method for producing a fuel cell electrode catalyst according to any one of the above [1] to [4], wherein the metal compound (1) is partially a compound comprising at least one transition metal element M2 selected from iron, nickel, chromium, cobalt, and manganese as a metal element.

[6]
The method for producing a fuel cell electrode catalyst according to any one of the above [1] to [5], wherein the metal compound (1) is at least one selected from the group consisting of metal phosphates, metal sulfates, metal nitrates, metal organic acid salts, metal acid halides, metal alkoxides, metal halides, metal perhalates, metal hypohalites, and metal complexes.

[7]
The method for producing a fuel cell electrode catalyst according to any one of the above [1] to [6], wherein the nitrogen-containing organic compound (2) has, in the molecule, one or more selected from amino group, nitrile group, imido group, imine group, nitro group, amide group, azido group, aziridine group, azo group, isocyanate group, isothiocyanate group, oxime group, diazo group, nitroso group, pyrrole ring, porphyrin ring, imidazole ring, pyridine ring, pyrimidine ring, and pyrazine ring.

[8]
The method for producing a fuel cell electrode catalyst according to any one of the above [1] to [7], wherein the nitrogen-containing organic compound (2) has, in the molecule, one or more selected from hydroxyl group, carboxyl group, aldehyde group, acid halide group, sulfo group, phosphate group, ketone group, ether group, and ester group.

[9]
The method for producing a fuel cell electrode catalyst according to any one of the above [1] to [8], wherein in the step (3), the solid residue is heat-treated in an atmosphere containing 0.01% by volume or more and 10% by volume or less of a hydrogen gas.

[10]
A fuel cell electrode catalyst obtained by the production method according to any one of the above [1] to [9].

[11]
A fuel cell catalyst layer comprising the fuel cell electrode catalyst according to the above [10].

An electrode comprising the fuel cell catalyst layer according to the above [11] and a porous support layer.

A membrane electrode assembly comprising a cathode, an anode, and an electrolyte membrane placed between the cathode and the anode, wherein the cathode and/or the anode is the electrode according to the above [12].

[14]
A fuel cell comprising the membrane electrode assembly according to the above [13].

[15]
The fuel cell according to the above [14], which is a polymer electrolyte fuel cell.

[16]
An article equipped with at least one function selected from the group consisting of electricity generating function, light emitting function, heat generating function, sound generating function, movement function, display function, and charging function, the article comprising the fuel cell according to the above [14] or [15].

Advantageous Effect of Invention

According to the method for producing a fuel cell electrode catalyst of the present invention, there can be produced a fuel cell electrode catalyst having high catalytic activity using a transition metal (such as titanium) through heat treatment at comparatively low temperature.

Further, the heat-treated product of the present invention is useful as a fuel cell electrode catalyst.

Furthermore, the fuel cell electrode catalyst of the present invention has high catalytic activity and is useful for various uses (such as electrodes).

DESCRIPTION OF EMBODIMENTS

Figure 1:
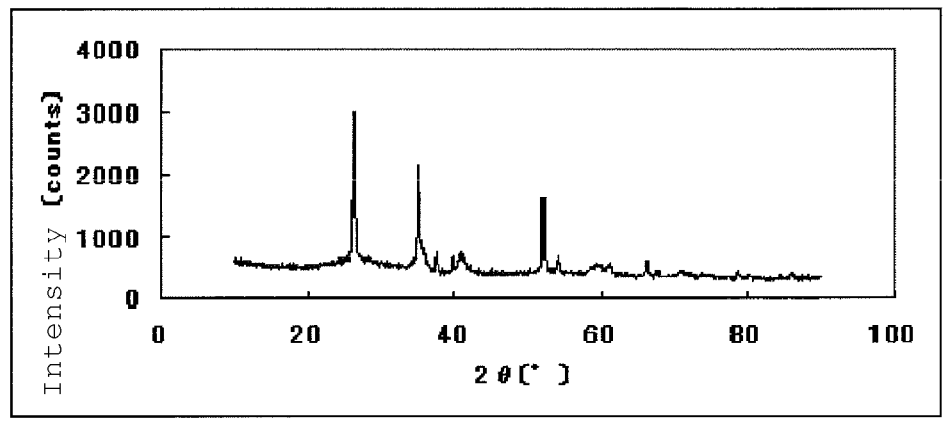
FIG. 1 is a powder X-ray diffraction spectrum of a catalyst (1) of Example 1.

[Method for Producing Fuel Cell Electrode Catalyst]

The method for producing a fuel cell electrode catalyst of the present invention comprises:

a step (1) of mixing at least a metal compound (1), a nitrogen-containing organic compound (2), a compound (3) containing fluorine and at least one element A selected from the group consisting of boron, phosphorus, and sulfur, and a solvent to obtain a solution (in the present specification, also referred to as a "catalyst precursor solution"), a step (2) of removing the solvent from the catalyst precursor solution, and a step (3) of heat-treating a solid residue, obtained in the step (2), at a temperature of 500 to 1100° C. to obtain an electrode catalyst;

a portion or the entirety of the metal compound (1) being a transition metal compound (M1) containing, as a metal element, at least one transition metal element M1 selected from the elements of group 4 and group 5 of the periodic table; and at least one of the metal compound (1), the nitrogen-containing organic compound (2), and the compound (3) having an oxygen atom.

In the present specification, an atom and an ion are not strictly distinguished from each other unless special circumstance requires otherwise, and are referred to as an "atom".

(Step (1))

In the step (1), at least a metal compound (1), a nitrogen-containing organic compound (2), a compound (3) containing fluorine and at least one element A selected from the group consisting of boron, phosphorus, and sulfur, and a solvent are mixed to obtain a catalyst precursor solution.

Exemplary mixing procedures are:

procedure (i): putting a solvent in one container, adding thereto the metal compound (1), the nitrogen-containing organic compound (2), and the compound (3), and mixing them; and procedure (ii): preparing a solution of the metal compound (1) and a solution of the nitrogen-containing organic compound (2) and the compound (3), and mixing them.

When a solvent does not allow each component to have high solubility therein, the procedure (ii) is preferable. When the metal compound (1) is, for example, a metal halide described later, the procedure (i) is preferable, while when the metal compound (1) is, for example, a metal alkoxide or a metal complex described later, the procedure (ii) is preferable.

When a transition metal compound (M1) and a transition metal compound (M2), described later, are used as the metal compound (1), a preferable procedure in the procedure (ii) is:

procedure (ii'): preparing a solution of the transition metal compound (M1), and a solution of the transition metal compound (M2), the nitrogen-containing organic compound (2) and the compound (3), and mixing them.

The mixing operation is preferably performed with stirring, in order to increase the dissolution rate of each component in a solvent.

When a plurality of solutions are prepared and these solutions are then mixed to obtain a catalyst precursor solution, it is preferable that one solution is supplied to the other solution at a constant rate with a pump or the like.

It is also preferable that the solution of the metal compound (1) is added little by little to the solution of the nitrogen-containing organic compound (2) or the solution of the nitrogen-containing organic compound (2) and the compound (3) (i.e., the whole amount is not added at a time). When the transition metal compound (M2) described later is used, it is also preferable that the solution of the transition metal compound (M1) is added little by little to the solution of the nitrogen-containing organic compound (2) and the transition metal compound (M2) or the solution of the nitrogen-containing organic compound (2), the compound (3) and the transition metal compound (M2) (i.e., the whole amount is not added at a time).

The catalyst precursor solution is considered to contain a reaction product of the metal compound (1) and the nitrogen-containing organic compound (2). The solubility of this reaction product in a solvent also varies depending on the combination of the metal compound (1), the nitrogen-containing organic compound (2), a solvent, and the like.

Therefore, when the metal compound (1) is, for example, a metal alkoxide or a metal complex, it is preferable that the catalyst precursor solution does not contain a precipitate or a dispersoid, although this depends on the type of solvent and the type of the nitrogen-containing organic compound (2), and, even if the precipitate or the dispersoid are contained, it is preferable that the amount thereof is small (for example, the amount is 10% by weight or less, preferably 5% by weight or less, more preferably 1% by weight or less of the total amount of the solution).

On the other hand, when the metal compound (1) is, for example, a metal halide, a precipitate which is considered to be the reaction product of the metal-containing compound (1) and the nitrogen-containing organic compound (2) is easily generated in the catalyst precursor solution, although this depends on the type of solvent and the type of the nitrogen-containing organic compound (2).

In the step (1), the metal compound (1), the nitrogen-containing organic compound (2), the compound (3), and a solvent may also be put in a pressure-applicable container such as an autoclave and mixed with being pressurized at a pressure of ordinary pressure or more.

The temperature at which the metal compound (1), the nitrogen-containing organic compound (2), the compound (3), and a solvent are mixed is, for example, 0 to 60° C. In view of a complex being considered to be formed from the metal compound (1) and the nitrogen-containing organic compound (2), if this temperature is excessively high and the solvent contains water, it is considered that the complex is hydrolyzed to cause a hydroxide to precipitate, leading to the failure to obtain an excellent catalyst, whereas if this temperature is excessively low, it is considered that the metal compound (1) is precipitated before the complex is formed, leading to the failure to obtain an excellent catalyst.

<Metal Compound (1)>

A portion or the entirety of the metal compound (1) is a transition metal compound (M1) containing, as a metal element, at least one transition metal element M1 selected from the elements of group 4 and group 5 of the periodic table.

Specific examples of the transition metal element M1 include titanium, zirconium, hafnium, niobium, vanadium, and tantalum; and from the viewpoint of a cost and the performance of the resultant catalyst, titanium, zirconium, niobium, vanadium, and tantalum are preferred, and titanium and zirconium are further preferred. These may be used singly or in combination of two or more kinds.

The metal compound (1) preferably contains at least one atom selected from an oxygen atom and halogen atoms, and specific examples thereof include metal phosphates, metal sulfates, metal nitrates, metal organic acid salts, metal acid halides (intermediate hydrolysates of metal halides), metal alkoxides, metal halides, metal halates, metal hypohalites, and metal complexes. These may be used singly or in combination of two or more kinds.

As the metal alkoxides, methoxide, propoxide, isopropoxide, ethoxide, butoxide, and isobutoxide of the transition metals are preferred; and isopropoxide, ethoxide, and butoxide of the transition metals are further preferred. The metal alkoxide may have one kind of alkoxy group or may have two or more kinds of alkoxy groups.

As the metal compound (1) containing an oxygen atom, metal alkoxides, acetylacetonate complexes, metal acid chlorides, metal sulfates, and metal nitrates are preferred; in view of a cost, metal alkoxides and acetylacetonate complexes are more preferred; and, from the viewpoint of solubility in a solvent, metal alkoxides and acetylacetonate complexes are preferred.

As the metal halides, metal chlorides, metal bromides, and metal iodides are preferred. As the metal acid halides, metal acid chlorides, metal acid bromides, and metal acid iodides are preferred.

As the metal perhalates, metal perchlorates are preferred. As the metal hypohalites, metal hypochlorites are preferred.

Specific examples of the metal compound (1) (transition metal compound (M1)) include:

titanium compounds such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium diisopropoxide diacetylacetonate ($Ti(acac)_2(O\text{-}iPr)_2$, wherein acac represents an acetylacetonato ion and iPr represents an isopropyl group; hereinafter the same applies), titanium oxydiacetylacetonate, bis[tris(2,4-pentanedionato) titanium(IV)] hexachlorotitanate(IV) ($[Ti(acac)_3]_2[TiCl_6]$), titanium tetrachloride, titanium trichloride, titanium oxychloride, titanium tetrabromide, titanium tribromide, titanium oxybromide, titanium tetraiodide, titanium triiodide, and titanium oxyiodide;

niobium compounds such as niobium pentamethoxide, niobium pentaethoxide, niobium pentaisopropoxide, niobium pentabutoxide, niobium pentapentoxide, niobium triacetylacetonate, niobium pentaacetylacetonate, niobium diisopropoxide triacetylacetonate ($Nb(acac)_3(O\text{-}iPr)_2$), tris (2,2,6,6-tetramethyl-3,5-heptanedionato)niobium, niobium (III) hexafluoroacetylacetone, niobium pentachloride, niobium oxychloride, niobium pentabromide, niobium oxybromide, niobium pentaiodide, and niobium oxyiodide;

zirconium compounds such as zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetylacetonate, zirconium diisopropoxide diacetylacetonate ($Zr(acac)_2(O\text{-}iPr)_2$), tetrakis(diethylamino)zirconium, tetrakis(2,2,6,6-tetramethyl-3,5-heptanedionato)zirconium, zirconium(IV) hexafluoroacetylacetonate, tetra-1-methoxy-2-methyl-2-propoxyzirconium (IV), zirconium tetrachloride, zirconium oxychloride, zirconium tetrabromide, zirconium oxybromide, zirconium tetraiodide, and zirconium oxyiodide;

tantalum compounds such as tantalum pentamethoxide, tantalum pentaethoxide, tantalum pentaisopropoxide, tantalum pentabutoxide, tantalum pentapentoxide, tantalum tetraethoxyacetylacetonate, tantalum diisopropoxide diacetylacetonate ($Ta(acac)_2(O\text{-}iPr)_2$), pentakis(diethylamino) tantalum, tantalum pentachloride, tantalum oxychloride, tantalum pentabromide, tantalum oxybromide, tantalum pentaiodide, and tantalum oxyiodide;

hafnium compounds such as hafnium tetramethoxide, hafnium tetraethoxide, hafnium tetrapropoxide, hafnium tetraisopropoxide, hafnium tetrabutoxide, hafnium tetraisobutoxide, hafnium tetrapentoxide, hafnium tetraacetylacetonate, tetrakis(diethylamino)hafnium, tetra-1-methoxy-2-methyl-2-propoxyhafnium (IV), hafnium(IV) acetylacetonate, tetrakis(2,2,6,6-tetramethyl-3,5-heptanedionato)hafnium, hafnium(IV) hexafluoroacetylacetone, hafnium tetrachloride, hafnium oxychloride, hafnium bromide, hafnium oxybromide, hafnium iodide, and hafnium oxyiodide; and vanadium compounds such as vanadium(V) trimethoxideoxide, vanadium(V) ethoxide, vanadium(V) triethoxideoxide, vanadium(V) tri-1-propoxideoxide, vanadium(V) tri-n-butoxideoxide, vanadium(V) tri-t-butoxideoxide, vanadium(V) isopropoxide acetylacetonates ($V(acac)(O\text{-}iPr)_4$, $V(acac)_2(O\text{-}iPr)_3$, $V(acac)_3(O\text{-}iPr)_2$, $V(acac)_4(O\text{-}iPr)$), vanadium(III) acetylacetonate, vanadium(III) acetylacetone, tris (2,2,6,6-tetramethyl-3,5-heptanedionato)vanadium(III), vanadium(III) hexafluoroacetylacetone, vanadium(II) chloride, vanadium(III) chloride, vanadium(IV) chloride, vanadium(V) oxytrichloride, vanadium(III) bromide, vanadium(V) oxybromide, vanadium(III) iodide, and vanadium(V) oxyiodide. These may be used singly or in combination of two or more kinds.

Of these compounds, in view of allowing the resultant catalyst to be fine particles having a uniform particle diameter and to have high activity, preferred are:

titanium tetraethoxide, titanium tetrachloride, titanium oxychloride, titanium tetraisopropoxide, titanium tetraacetylacetonate, titanium diisopropoxide diacetylacetonate ($Ti(acac)_2(O\text{-}iPr)_2$), niobium pentaethoxide, niobium pentachloride, niobium oxychloride, niobium pentaisopropoxide, niobium pentaacetylacetonate, niobium triacetylacetonate, niobium diisopropoxide triacetylacetonate ($Nb(acac)_3(O\text{-}iPr)_2$), zirconium tetraethoxide, zirconium tetrachloride, zirconium oxychloride, zirconium tetraisopropoxide, zirconium tetraacetylacetonate, zirconium diisopropoxide diacetylacetonate ($Zr(acac)_2(O\text{-}iPr)_2$), tantalum pentamethoxide, tantalum pentaethoxide, tantalum pentachloride, tantalum oxychloride, tantalum pentaisopropoxide, tantalum tetraethoxyacetylacetonate ($Ta(acac)(O\text{—}C_2H_5)_4$), tantalum diisopropoxide triacetylacetonate ($Ta(acac)_3(O\text{-}iPr)_2$), vanadium(V) trimethoxideoxide, vanadium(V) ethoxide, vanadium(V) triethoxideoxide, vanadium(V) tri-1-propoxideoxide, vanadium(V) tri-n-butoxideoxide, vanadium (V) tri-t-butoxideoxide, vanadium(V) isopropoxide acetylacetonates ($V(acac)(O\text{-}iPr)_4$, $V(acac)_2(O\text{-}iPr)_3$, $V(acac)_3(O\text{-}iPr)_2$, $V(acac)_4(O\text{-}iPr)$), vanadium(III) acetylacetonate, vanadium(III) acetylacetone, vanadium(III) chloride, and vanadium(IV) chloride; and further preferred are:

titanium pentachloride, titanium tetraisopropoxide, titanium tetraacetylacetonate, niobium pentaethoxide, niobium pentaisopropoxide, zirconium tetrachloride, zirconium oxychloride, zirconium tetraisopropoxide, tantalum pentaisopropoxide, vanadium(V) tri-i-propoxideoxide, vanadium(III) acetylacetone, and vanadium(III) chloride.

Also, the metal compound (1) may be a combination of the transition metal compound (M1) and a transition metal compound (M2) that contains at least one transition metal element M2 selected from iron, nickel, chromium, cobalt and manganese as a metal element. The use of the transition metal compound (M2) improves the performance of the resultant catalyst.

As the transition metal element M2, from the viewpoint of the balance between a cost and the performance of the resultant catalyst, iron and chromium are preferred; and iron is further preferred.

Specific examples of the transition metal compound (M2) include:

iron compounds such as iron(III) ethoxide, iron(III) isopropoxide acetylacetonates ($Fe(acac)(O\text{-}iPr)_2$, $Fe(acac)_2(O\text{-}$ iPr)), iron(III) acetylacetonate, tris(2,2,6,6-tetramethyl-3,5-heptanedionato)iron(III), iron(III) hexafluoroacetylacetonate, iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron(III) nitrate, iron(II) oxalate, iron(III) oxalate, iron(II) phosphate, iron(III) phosphate, ferrocene, iron(II) hydroxide, iron(III) hydroxide, iron(II) oxide, iron(III) oxide, triiron tetraoxide, iron(II) acetate, iron(II) lactate, and iron (III) citrate;

nickel compounds such as nickel(II) ethoxide, nickel(II) isopropoxide acetylacetonate (Ni(acac)(O-iPr)), nickel(II) acetylacetonate, nickel(II) chloride, nickel(II) sulfate, nickel (II) sulfide, nickel(II) nitrate, nickel(II) oxalate, nickel(II) phosphate, nickelocene, nickel(II) hydroxide, nickel(II) oxide, nickel(II) acetate, and nickel(II) lactate;

chromium compounds such as chromium(III) ethoxide, chromium(III) isopropoxide acetylacetonates (Cr(acac)(O-iPr)$_2$, Cr(acac)$_2$(O-iPr)), chromium(III) acetylacetonate, chromium(II) chloride, chromium(III) chloride, chromium (III) sulfate, chromium(III) sulfide, chromium(III) nitrate, chromium(III) oxalate, chromium(III) phosphate, chromium (III) hydroxide, chromium(II) oxide, chromium(III) oxide, chromium(IV) oxide, chromium(VI) oxide, chromium(II) acetate, chromium(III) acetate, and chromium(III) lactate;

cobalt compounds such as cobalt(III) ethoxide, cobalt(III) isopropoxide acetylacetonates (Co(acac)(O-iPr)$_2$, Co(acac)$_2$ (O-iPr)), cobalt(III) acetylacetonate, cobalt(II) chloride, cobalt(III) chloride, cobalt(II) sulfate, cobalt(II) sulfide, cobalt(II) nitrate, cobalt(III) nitrate, cobalt(II) oxalate, cobalt (II) phosphate, cobaltocene, cobalt(II) hydroxide, cobalt(II) oxide, cobalt(III) oxide, tricobalt tetroxide, cobalt(II) acetate, and cobalt(II) lactate; and manganese compounds such as manganese(III) ethoxide, manganese(III) isopropoxide acetylacetonates (Mn(acac) (O-iPr)$_2$, Mn(acac)$_2$(O-iPr)), manganese(III) acetylacetonate, tris(2,2,6,6-tetramethyl-3,5-heptanedionato)manganese(III), manganese(III) hexafluoroacetylacetone, manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese(II) lactate, and manganese citrate. These may be used singly or in combination of two or more kinds.

Of these compounds, preferred are:
iron(III) ethoxide, iron(III) isopropoxide acetylacetonates, iron(III) acetylacetonate, iron(II) chloride, iron(III) chloride, potassium ferrocyanide, potassium ferricyanide, ammonium ferrocyanide, ammonium ferricyanide, iron(II) acetate, iron (II) lactate;

nickel(III) ethoxide, nickel(III) isopropoxide acetylacetonates, nickel(III) acetylacetonate, nickel(II) chloride, nickel (III) chloride, nickel(II) acetate, nickel(II) lactate, nickel(II) nitrate;

chromium(III) ethoxide, chromium(III) isopropoxide acetylacetonates, chromium(III) acetylacetonate, chromium (II) chloride, chromium(III) chloride, chromium(II) acetate, chromium(III) acetate, chromium(III) lactate;

cobalt(III) ethoxide, cobalt(III) isopropoxide acetylacetonates, cobalt(III) acetylacetonate, cobalt(II) chloride, cobalt (III) chloride, cobalt(II) acetate, cobalt(II) lactate; and manganese(III) ethoxide, manganese(III) isopropoxide acetylacetonates, manganese(III) acetylacetonate, manganese(II) chloride, manganese(II) acetate, manganese(II) lactate, and further preferred are:
iron(II) chloride, iron(III) chloride, potassium ferrocyanide, potassium ferricyanide, ammonium ferrocyanide, ammonium ferricyanide, iron(II) acetate, iron(II) lactate, chromium(II) chloride, chromium(III) chloride, chromium (II) acetate, chromium(III) acetate, and chromium(III) lactate.

Assuming that the rate of the transition metal compound (M1) and the transition metal compound (M2) used in the step 1 is converted into the molar ratio (M1:M2) between the atoms of the transition metal element M1 and the atoms of the transition metal element M2 and is represented by M1:M2= $(1-\alpha):\alpha$, the range of a is preferably $0.01 \leq \alpha \leq 0.5$, further preferably $0.02 \leq \alpha \leq 0.4$, particularly preferably $0.05 \leq \alpha \leq 0.3$.

As the metal compound (1), a metal compound (M3) containing at least one metal element M3 selected from aluminum, yttrium, tin, and antimony as a metal element (with the proviso that antimony is regarded as a metal element) may also be combined. These may be used singly or in combination of two or more kinds.

Specific examples of the metal compound (M3) include:
aluminum compounds such as aluminum methoxide, aluminum ethoxide, aluminum propoxide, aluminum isopropoxide, aluminum butoxide, aluminum isobutoxide, aluminum pentoxide, aluminum acetylacetonate, aluminum isopropoxide acetylacetonates (Al(acac)(O-iPr)$_2$, Al(acac)$_2$ (O-iPr)), tris diethylamino aluminum, tris(2,2,6,6-tetramethyl-3,5-heptanedionato)aluminum, aluminum hexafluoroacetylacetonate, tris-1-methoxy-2-methyl-2-propoxyaluminum, aluminum trichloride, aluminum oxychloride, aluminum tribromide, aluminum oxybromide, aluminum triiodide, aluminum oxyiodide, aluminum nitrate, aluminum oxalate, and aluminum sulfate;

yttrium compounds such as yttrium(III) methoxide, yttrium(III) ethoxide, yttrium(III) propoxide, yttrium(III) isopropoxide, yttrium(III) butoxide, yttrium(III) isobutoxide, yttrium(III) pentoxide, yttrium(III) acetylacetonate, yttrium(III) isopropoxide acetylacetonates (Y(acac)(O-iPr)$_2$, Y(acac)$_2$ (O-iPr)), tris diethylamino yttrium, tris(2,2,6,6-tetramethyl-3,5-heptanedionato)yttrium, yttrium(III) hexafluoroacetylacetonate, tris-1-methoxy-2-methyl-2-propoxy yttrium(III), yttrium trichloride, yttrium oxychloride, yttrium tribromide, yttrium oxybromide, yttrium triiodide, yttrium oxyiodide, yttrium acetate, yttrium nitrate, yttrium oxalate, and yttrium sulfate;

tin compounds such as tin(IV) methoxide, tin(IV) ethoxide, tin(IV) propoxide, tin(IV) isopropoxide, tin(IV) butoxide, tin(IV) isobutoxide, tin(IV) pentoxide, tin(II) acetylacetonate, tin(IV) diisopropoxide diacetylacetonate (Sn(acac)$_2$ (O-iPr)$_2$), tetrakisdiethylamino tin, tetrakis(2,2,6,6-tetramethyl-3,5-heptanedionato)tin, tin(II) hexafluoroacetylacetonate, tetra-1-methoxy-2-methyl-2-propoxy tin(IV), tin tetrachloride, tin dichloride, tin oxychloride, tin tetrabromide, tin dibromide, tin oxybromide, tin tetraiodide, tin diiodide, tin oxyiodide, tin acetate, tin oxalate, tin tartrate, and tin sulfate; and antimony compounds such as antimony(III) methoxide, antimony(III) ethoxide, antimony(III) propoxide, antimony (III) isopropoxide, antimony(III) butoxide, antimony(III) isobutoxide, antimony(III) pentoxide, antimony(III) acetylacetonate, antimony(III) isopropoxide acetylacetonates (Sb (acac)(O-iPr)$_2$, Sb(acac)$_2$(O-iPr)), tris diethylamino antimony, tris(2,2,6,6-tetramethyl-3,5-heptanedionato) antimony, antimony(III) hexafluoroacetylacetonate, tris-1-methoxy-2-methyl-2-propoxy antimony(III), antimony trichloride, antimony oxychloride, antimony tribromide, antimony oxybromide, antimony triiodide, antimony oxyiodide, antimony acetate, and antimony sulfate. These may be used singly or in combination of two or more kinds.

Of these compounds, in view of allowing the resultant catalyst to be fine particles having a uniform particle diameter and to have high activity, preferred are:

aluminum trichloride, aluminum oxychloride, aluminum ethoxide, aluminum isopropoxide, aluminum butoxide, aluminum acetylacetonate, aluminum isopropoxide acetylacetonates ($Al(acac)(O\text{-}iPr)_2$, $Al(acac)_2(O\text{-}iPr)$), yttrium trichloride, yttrium oxychloride, yttrium(III) ethoxide, yttrium(III) isopropoxide, yttrium(III) butoxide, yttrium(III) acetylacetonate, yttrium(III) isopropoxide acetylacetonates ($Y(acac)(O\text{-}iPr)_2$, $Y(acac)_2(O\text{-}iPr)$), tin tetrachloride, tin dichloride, tin oxychloride, tin (IV) methoxide, tin(IV) ethoxide, tin(IV) isopropoxide, tin(IV) butoxide, tin(IV) acetylacetonate, tin(IV) diisopropoxide diacetylacetonate ($Sn(acac)_2(O\text{-}iPr)_2$), antimony trichloride, antimony oxychloride, antimony(III) ethoxide, antimony(III) propoxide, antimony(III) isopropoxide, antimony(III) butoxide, antimony(III) isobutoxide, antimony(III) pentoxide, antimony(III) acetylacetonate, antimony(III) isopropoxide acetylacetonates ($Sb(acac)(O\text{-}iPr)_2$, $Sb(acac)_2(O\text{-}iPr)$); and further preferred are:

aluminum trichloride, aluminum ethoxide, aluminum isopropoxide, aluminum butoxide, aluminum acetylacetonate, yttrium trichloride, yttrium(III) ethoxide, yttrium(III) isopropoxide, yttrium(III) acetylacetonate, tin tetrachloride, tin dichloride, tin(IV) methoxide, tin(IV) ethoxide, tin(IV) isopropoxide, tin(IV) butoxide, tin(IV) acetylacetonate, antimony trichloride, antimony(III) ethoxide, antimony (III) propoxide, antimony(III) isopropoxide, antimony(III) butoxide, antimony(III) acetylacetonate.

The metal compound (M3) may also be used, for example, in an amount of 100 mol % or less, 50 mol % or less, or 30 mol % or less, based on the metal compound (M1), in terms of the number of moles of metal atoms.

Assuming that the rate of the transition metal compound (M1) and the metal compound (M3) used in the step 1 is converted into the molar ratio (M1:M3) between the atoms of the transition metal element M1 and the atoms of the metal element M3 and is represented by M1:M3=1:β, the range of β may be, for example, $0 \leq \beta \leq 1$, $0 \leq \beta \leq 0.5$, or $0 \leq \beta \leq 0.3$.

<Nitrogen-Containing Organic Compound (2)>

As the nitrogen-containing organic compound (2), preferred is a compound capable of becoming a ligand that can be coordinated to a metal atom in the metal compound (1) (preferably, a compound capable of forming a mononuclear complex); and further preferred is a compound capable of becoming a multidentate ligand (preferably, a bidentate ligand or a tridentate ligand) (compound capable of forming a chelate).

The nitrogen-containing organic compounds (2) may be used singly or in combination of two or more kinds.

The nitrogen-containing organic compound (2) preferably has a functional group such as amino group, nitrile group, imido group, imine group, nitro group, amide group, azido group, aziridine group, azo group, isocyanate group, isothiocyanate group, oxime group, diazo group, or nitroso group, or a ring such as pyrrole ring, porphyrin ring, pyrrolidine ring, imidazole ring, triazole ring, pyridine ring, piperidine ring, pyrimidine ring, pyrazine ring, or purine ring (these functional groups and rings are also collectively referred to as "nitrogen-containing molecular group").

The nitrogen-containing organic compound (2), by containing the nitrogen-containing molecular group in the molecule, is considered to be more strongly coordinated to a metal atom derived from the metal compound (1) after subjected to the mixing in the step (1).

Among the nitrogen-containing molecular group, amino group, imine group, amide group, pyrrole ring, pyridine ring, and pyrazine ring are more preferred; amino group, imine group, pyrrole ring, and pyrazine ring are further preferred; and amino group and pyrazine ring are particularly preferred because of allowing the resultant catalyst to have particularly high activity.

Specific examples of the nitrogen-containing organic compound (2) (wherein the compound does not contain an oxygen atom) include melamine, ethylenediamine, triazole, acetonitrile, acrylonitrile, ethyleneimine, aniline, pyrrole, polyethyleneimine, salts thereof, and the like, and, of these, ethylenediamine and ethylenediamine.dihydrochloride are preferred because of allowing the resultant catalyst to have high activity.

The nitrogen-containing organic compound (2) preferably further has hydroxyl group, carboxyl group, aldehyde group, acid halide group, sulfo group, phosphate group, ketone group, ether group, or ester group (these are also collectively referred to as "oxygen-containing molecular group"). The nitrogen-containing organic compound (2), by containing the oxygen-containing molecular group in the molecule, is considered to be more strongly coordinated to a metal atom derived from the metal compound (1) after subjected to the mixing in the step (1).

Among the oxygen-containing molecular group, carboxyl group and aldehyde group are particularly preferred because of allowing the resultant catalyst to have particularly high activity.

As the nitrogen-containing organic compound (2) that contains an oxygen atom in the molecule, compounds having the nitrogen-containing molecular group and the oxygen-containing molecular group are preferred. Such compounds are considered to be particularly strongly coordinated to a metal atom derived from the metal compound (1) after subjected to the step (1).

As the compounds having the nitrogen-containing molecular group and the oxygen-containing molecular group, amino acids having amino group and carboxyl group, and derivatives thereof are preferable.

As the amino acids, preferred are alanine, arginine, asparagine, asparagine acid, cysteine, glutamine, glutamic acid, glycine, histidine, isoleucine, leucine, lysine, methionine, phenylalanine, serine, threonine, tryptophan, tyrosine, valine, norvaline, glycylglycine, triglycine, and tetraglycine; because of allowing the resultant catalyst to have high activity, alanine, glycine, lysine, methionine, and tyrosine are more preferred; and because of allowing the resultant catalyst to have extremely high activity, alanine, glycine, and lysine are particularly preferred.

Specific examples of the nitrogen-containing organic compound (2) that contains an oxygen atom in the molecule include, in addition to the above-described amino acids and the like, acylpyrroles such as acetylpyrrole, pyrrolecarboxylic acid, acylimidazoles such as acetylimidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol, and polyvinylpyrrolidone; because of allowing the resultant catalyst to have high activity, preferred are compounds capable of becoming a bidentate ligand: specifically, preferred are pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid, and 8-quinolinol; and more preferred are 2-pyrazinecarboxylic acid and 2-pyridinecarboxylic acid.

The ratio (B/A) of the total number B of carbon atoms of the nitrogen-containing organic compound (2) used in the step (1) to the total number A of atoms of a metal element of the metal compound (1) used in the step (1) is preferably 200 or less, more preferably 150 or less, further preferably 80 or less, particularly preferably 30 or less in terms of allowing the heat treatment in the step (3) to be performed while decreasing components eliminating as carbon compounds such as carbon dioxide and carbon monoxide, i.e., decreasing an emission gas during catalyst production; and the ratio is preferably 1 or more, more preferably 2 or more, further preferably 3 or more, particularly preferably 5 or more in terms of obtaining a catalyst having good activity.

The ratio (C/A) of the total number C of nitrogen atoms of the nitrogen-containing organic compound (2) used in the step (1) to the total number A of atoms of a metal element of the metal compound (1) used in the step (1) is preferably 28 or less, more preferably 17 or less, further preferably 12 or less, particularly preferably 8.5 or less in terms of obtaining a catalyst having good activity; and the ratio is preferably 1 or more, more preferably 2.5 or more, further preferably 3 or more, particularly preferably 3.5 or more in terms of obtaining a catalyst having good activity.

<Compound (3)>

Although an electrode catalyst having higher catalytic activity than that of a conventional catalyst is also produced by the same method for producing a catalyst as the production method of the present invention except that the compound (3) is not used, an electrode catalyst having further high catalytic activity is produced by the method for producing a catalyst of the present invention using the compound (3).

Specific examples of the compound (3) containing fluorine and at least one A selected from the group consisting of boron, phosphorus, and sulfur includes boric acid derivatives containing fluorine, phosphoric acid derivatives containing fluorine, and sulfonic acid derivatives containing fluorine.

Examples of the boric acid derivatives containing fluorine include: for example, tetrafluoroborates, e.g., quaternary ammonium tetrafluoroborates (e.g., ammonium tetrafluoroborate, methylammonium tetrafluoroborate, dimethylammonium tetrafluoroborate, trimethylammonium tetrafluoroborate, ethylammonium tetrafluoroborate, diethylammonium tetrafluoroborate, triethylammonium tetrafluoroborate, butylammonium tetrafluoroborate, dibutylammonium tetrafluoroborate, tributylammonium tetrafluoroborate, tetra-n-butylammonium tetrafluoroborate, tetramethylammonium tetrafluoroborate, tetraethylammonium tetrafluoroborate, tetrapropylammonium tetrafluoroborate, tetrabutylammonium tetrafluoroborate, ethyltrimethylammonium tetrafluoroborate, diethyldimethylammonium tetrafluoroborate, triethylmethylammonium tetrafluoroborate, methyltripropylammonium tetrafluoroborate, ethyltripropylammonium tetrafluoroborate, trimethylpropylammonium tetrafluoroborate, ethyldimethylpropylammonium tetrafluoroborate, diethylmethylpropylammonium tetrafluoroborate, triethylpropylammonium tetrafluoroborate, dimethyldipropylammonium tetrafluoroborate, ethylmethyldipropylammonium tetrafluoroborate, diethyldipropylammonium tetrafluoroborate, trimethylbutylammonium tetrafluoroborate, ethyldimethylbutylammonium tetrafluoroborate, diethylmethylbutylammonium tetrafluoroborate, triethylbutylammonium tetrafluoroborate, tripropylbutylammonium tetrafluoroborate, dimethyldibutylammonium tetrafluoroborate, ethylmethyldibutylammonium tetrafluoroborate, diethyldibutylammonium tetrafluoroborate, and hexyltrimethylammonium tetrafluoroborate (the propyls include n-propyl and i-propyl; and the butyls include n-butyl, i-butyl, s-butyl, and t-butyl)), quaternary pyridinium tetrafluoroborates (e.g., pyridinium tetrafluoroborate, 1-methylpyridinium tetrafluoroborate, 2-bromo-1-ethylpyridinium tetrafluoroborate, and 1-butylpyridinium tetrafluoroborate), and quaternary imidazolium tetrafluoroborates (e.g., 1,3-dimethylimidazolium tetrafluoroborate, 1-ethyl-3-methylimidazolium tetrafluoroborate, 1,3-diethylimidazolium tetrafluoroborate, 1,2-dimethyl-3-ethylimidazolium tetrafluoroborate, 1,2-dimethyl-3-propylimidazolium tetrafluoroborate, and 1-butyl-3-methylimidazolium tetrafluoroborate);

fluoroalkylboric acids, of which all or some of the hydrogen atoms of the alkyl group are substituted by a fluorine atom (e.g., nonacosafluorotetradecylboric acid, heptacosafluorotridecylboric acid, pentacosafluorododecylboric acid, tricosafluoroundecylboric acid, henicosafluorodecylboric acid, nonadecafluorononylboric acid, heptadecafluorooctylboric acid, pentadecafluoroheptylboric acid, tridecafluorohexylboric acid, undecafluoropentylboric acid, nonafluorobutylboric acid, heptafluoropropylboric acid, pentafluoroethylboric acid, trifluoromethylboric acid, and 2,2,2-trifluoroethylboric acid);

monoesters and diesters of the fluoroalkylboric acids (e.g., methyl esters, and ethyl esters); and salts of the fluoroalkylboric acids (e.g., sodium salts, potassium salts, ammonium salts, methylammonium salts, dimethylammonium salts, trimethylammonium salts, and triethylammonium salts).

Specifically, preferred are: ammonium tetrafluoroborate, methylammonium tetrafluoroborate, dimethylammonium tetrafluoroborate, trimethylammonium tetrafluoroborate, ethylammonium tetrafluoroborate, diethylammonium tetrafluoroborate, triethylammonium tetrafluoroborate, butylammonium tetrafluoroborate, dibutylammonium tetrafluoroborate, tributylammonium tetrafluoroborate, tetra-n-butylammonium tetrafluoroborate, tetramethylammonium tetrafluoroborate, tetraethylammonium tetrafluoroborate, tetrapropylammonium tetrafluoroborate, tetrabutylammonium tetrafluoroborate, and 1-butyl-3-methylimidazolium tetrafluoroborate; and more preferred are ammonium tetrafluoroborate, butylammonium tetrafluoroborate, tetraethylammonium tetrafluoroborate, and 1-butyl-3-methylimidazolium tetrafluoroborate.

Examples of the phosphoric acid derivatives containing fluorine include hexafluorophosphate, for example, quaternary ammonium hexafluorophosphates (e.g., ammonium hexafluorophosphate, methylammonium hexafluorophosphate, dimethylammonium hexafluorophosphate, trimethylammonium hexafluorophosphate, ethylammonium hexafluorophosphate, diethylammonium hexafluorophosphate, triethylammonium hexafluorophosphate, butylammonium hexafluorophosphate, dibutylammonium hexafluorophosphate, tributylammonium hexafluorophosphate, tetra-n-butylammonium hexafluorophosphate, tetramethylammonium hexafluorophosphate, tetraethylammonium hexafluorophosphate, tetrapropylammonium hexafluorophosphate, tetrabutylammonium hexafluorophosphate, ethyltrimethylammonium hexafluorophosphate, diethyldimethylammonium hexafluorophosphate, triethylmethylammonium hexafluorophosphate, methyltripropylammonium hexafluorophosphate, ethyltripropylammonium hexafluorophosphate, trimethylpropylammonium hexafluorophosphate, ethyldimethylpropylammonium hexafluorophosphate, diethylmethylpropylammonium hexafluorophosphate, triethylpropylammonium hexafluorophosphate, dimethyldipropylammonium hexafluorophosphate, ethylmethyldipropylammonium hexafluorophosphate, diethyldipropylammonium hexafluorophosphate, trimethylbutylammonium hexafluorophosphate, ethyldimethylbutylammonium hexafluorophosphate, diethylmethylbutylammonium hexafluorophosphate, triethylbutylammonium hexafluorophosphate, tripropylbutylammonium hexafluorophosphate, dimethyldibutylammonium hexafluorophosphate, ethylmethyldibutylammonium hexafluorophosphate, diethyldibutylammonium hexafluorophosphate, and hexyltrimethylammonium tetrafluorophosphate (the propyls include n-propyl, and i-propyl; and the butyls include n-butyl, i-butyl, s-butyl, and t-butyl), quaternary pyridinium hexafluorophosphates (e.g., pyridinium hexafluorophosphate, 1-methylpyridinium hexafluorophosphate, and 2-bromo-1-ethylpyridinium hexafluorophosphate), and quaternary imidazolium tetrafluorophosphates (e.g., 1,3-dimethylimidazolium tetrafluorophosphate, 1-ethyl-3-methylimidazolium tetrafluorophosphate, 1,3-diethylimidazolium tetrafluorophosphate, 1,2-dimethyl-3-ethylimidazolium tetrafluorophosphate, 1,2-dimethyl-3-propylimidazolium tetrafluorophosphate, 1-butyl-3-methylimidazolium tetrafluorophosphate);

hexafluorophosphoric acids;

salts of the hexafluorophosphoric acids (e.g., sodium salts, potassium salts, ammonium salts, alkylammonium (e.g., methylammonium, dimethylammonium, trimethylammonium, ethylammonium, diethylammonium, and triethylammonium) salts);

fluoroalkyl phosphate esters represented by the general formula: $(RO)_nP=O$ (wherein n is 1 to 3; and R is a fluoroalkyl group in which all or some of the hydrogen atoms of an alkyl group are substituted by a fluorine atom (e.g., nonacosafluorotetradecyl group, nonacosafluorotetradecyl group, heptacosafluorotridecyl group, pentacosafluorododecyl group, tricosafluoroundecyl group, henicosafluorodecyl group, nonadecafluorononyl group, heptadecafluorooctyl group, pentadecafluoroheptyl group, tridecafluorohexyl group, undecafluoropentyl group, nonafluorobutyl group, heptafluoropropyl group, pentafluoroethyl group, trifluoromethyl group, and 2,2,2-trifluoroethyl group));

fluoroalkyl phosphoric amide represented by the general formula: $(RN)_3P=O$, $(RN)_2P=O(OH)$, or $(RN)P=O(OH)_2$ (wherein R represents the fluoroalkyl group);

fluoroalkyl phosphorous acid represented the general formula $(RO)_3P$, $(RO)_2(OH)P$, or $(RO)(OH)_2P$ (wherein the fluoroalkyl group is represented);

fluoroalkyl phosphite amide represented by the general formula $(RN)_3P$, $(RN)_2P(OH)$, or $(RN)P(OH)_2$ (wherein R represents the fluoroalkyl group); and fluoroalkylphosphonic acid represented by the general formula: $RPO(OH)_2$ (wherein R represents the fluoroalkyl group).

Specifically, preferred are: ammonium hexafluorophosphate, methylammonium hexafluorophosphate, dimethylammonium hexafluorophosphate, trimethylammonium hexafluorophosphate, ethylammonium hexafluorophosphate, diethylammonium hexafluorophosphate, triethylammonium hexafluorophosphate, butylammonium hexafluorophosphate, dibutylammonium hexafluorophosphate, tributylammonium hexafluorophosphate, tetra-n-butylammonium hexafluorophosphate, tetramethylammonium hexafluorophosphate, tetraethylammonium hexafluorophosphate, tetrapropylammonium hexafluorophosphate, and tetrabutylammonium hexafluorophosphate; and more preferred are: ammonium hexafluorophosphate, tetraethylammonium hexafluorophosphate, and 1-butyl-3-methylimidazolium hexafluorophosphate.

Examples of the sulfonic acid derivatives containing fluorine include:

a copolymer of tetrafluoroethylene and perfluoro[2-(fluorosulfonylethoxy)propyl vinyl ether] (e.g., NAFION (registered trademark, copolymer having a structure represented by the following formula);

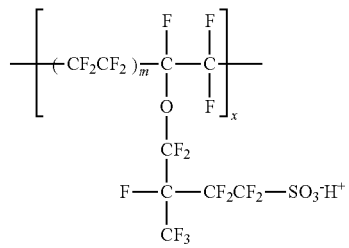

fluoroalkylsulfonic acids in which all or some of the hydrogen atoms of an alkyl group are substituted by a fluorine atom (the number of carbon atoms is, for example, 1 to 30) (e.g., nonacosafluorotetradecanesulfonic acid, heptacosafluorotridecanesulfonic acid, pentacosafluorododecanesulfonic acid, tricosafluoroundecanesulfonic acid, henicosafluorodecanesulfonic acid, nonadecafluorononanesulfonic acid, heptadecafluorooctanesulfonic acid, pentadecafluoroheptanesulfonic acid, tridecafluorohexanesulfonic acid, undecafluoropentanesulfonic acid, nonafluorobutanesulfonic acid, heptafluoropropanesulfonic acid, pentafluoroethanesulfonic acid, trifluoromethanesulfonic acid, and 2,2,2-trifluoroethanesulfonic acid);

esters of the fluoroalkylsulfonic acids (e.g., methyl esters, ethyl esters, and aryl esters (e.g., phenyl ester));

salts of the fluoroalkylsulfonic acids (general formula: $A[RSO_3]$; R represents the fluoroalkyl group) (sodium salts, potassium salts, ammonium salts, alkylammonium (e.g., methylammonium, dimethylammonium, trimethylammonium, ethylammonium, diethylammonium, and triethylammonium) salts);

amides of the fluoroalkylsulfonic acids (general formula: $R-SO_2-NR^1R^2$, R represents the fluoroalkyl group; and $R^1$ and $R^2$ each independently represent a hydrocarbon group having 1 to 10 carbon atoms, in which all or some of the hydrogen atoms may be substituted by a fluorine atom (e.g., methyl group, ethyl group, phenyl group));

halides of the fluoroalkylsulfonic acids (general formula: $(R-SO_2)X$; R represents the fluoroalkyl group; and X represents fluorine, chlorine, bromine, or iodine); and acid anhydrides of the fluoroalkylsulfonic acids (general formula: $(R-SO_2)_2O$; R represents the fluoroalkyl group).

Specifically, preferred are: a copolymer of tetrafluoroethylene and perfluoro[2-(fluorosulfonylethoxy)propyl vinyl ether] (e.g., NAFION (registered trademark), heptadecafluorooctanesulfonic acid, pentadecafluoroheptanesulfonic acid, tridecafluorohexanesulfonic acid, undecafluoropentanesulfonic acid, nonafluorobutanesulfonic acid, heptafluoropropanesulfonic acid, pentafluoroethanesulfonic acid, trifluoromethanesulfonic acid, ammonium heptadecafluorooctanesulfonate, ammonium pentadecafluoroheptanesulfonate, ammonium tridecafluorohexanesulfonate, ammonium undecafluoropentanesulfonate, ammonium nonafluorobutanesulfonate, ammonium heptafluoropropanesulfonate, ammonium pentafluoroethanesulfonate, ammonium trifluoromethanesulfonate, trimethylammonium trifluoromethanesulfonate, triethylammonium trifluoromethanesulfonate, tributylammonium trifluoromethanesulfonate, tetramethylammonium trifluoromethanesulfonate, tetraethylammonium trifluoromethanesulfonate, tetrabutylammonium trifluoromethanesulfonate, methyl trifluoromethanesulfonate, ethyl trifluoromethanesulfonate, nonafluoro-1-butanesulfonic acid, ferrous trifluoromethanesulfonate, and trifluoromethanesulfonic anhydrides; and more preferred are: trifluoromethanesulfonic acid, heptadecafluorooctanesulfonic acid, nonafluoro-1-butanesulfonic acid, tetrabutylammonium trifluoromethanesulfonate, ammonium heptadecafluorooctanesulfonate, and ferrous trifluoromethanesulfonate.

Further, preferred are ones that cause stabilization in a reaction system due to a skeleton with interface activity power, i.e., the presence of a hydrophobic site and a hydrophilic site.

These may be used singly or in combination of two or more kinds.

The amount of the element A contained in the compound (3) used in the step (1) (i.e., the total number of atoms of the element A contained in the compound (3) used in the step (1)) is typically 0.01 to 3 mol, preferably 0.01 to 2 mol, further preferably 0.01 to 1 mol, based on 1 mol of metal atoms in the metal compound (1) used in the step (1).

When the element A is only boron, the amount thereof is typically 0.01 to 3 mol, preferably 0.01 to 2 mol, further preferably 0.01 to 1 mol, based on the above-described criterion; when the element A is only phosphorus, the amount thereof is typically 0.01 to 3 mol, preferably 0.01 to 2 mol, further preferably 0.01 to 1 mol, based on the above-described criterion; and when the element A is only sulfur, the amount thereof is typically 0.01 to 3 mol, preferably 0.01 to 2 mol, further preferably 0.01 to 1 mol, based on the above-described criterion.

Further, the amount of fluorine contained in the compound (3) used in the step (1) (i.e., the total number of fluorine atoms contained in the compound (3) used in a step (1)) is typically 0.01 to 5 mol, preferably 0.02 to 4 mol, further preferably 0.03 to 3 mol, based on 1 mol of metal atoms in the metal compound (1) used in the step (1).

The above-described amount of the compound (3) is an amount in a case in which a raw material other than the compound (3) used in the step (1) contains neither element A nor fluorine. It is preferable to appropriately reduce the amount of the compound (3) used in the step (1) when the raw material other than the compound (3) contains the element A or fluorine.

<Solvent>

Examples of the solvent include water, alcohols, and acids. As the alcohols, ethanol, methanol, butanol, propanol, and ethoxyethanol are preferred; and ethanol and methanol are further preferred. As the acids, acetic acid, nitric acid (aqueous solution), hydrochloric acid, an aqueous phosphoric acid solution, and an aqueous citric acid solution are preferred; acetic acid and nitric acid are further preferred; and acetic acid is particularly preferred. These may be used singly or in combination of two or more kinds.

When the metal compound (1) is a metal halide, the solvent is preferably methanol.

The solvent may also be used so that the amount thereof is, for example, 50 to 95% by weight in 100% by weight of a catalyst precursor solution.

<Precipitation Suppressant>

When the metal compound (1) contains halogen atoms, i.e., when the metal compound (1) is titanium chloride, niobium chloride, zirconium chloride, tantalum chloride, or the like, in general, these compounds are easily hydrolyzed by water to cause precipitates of hydroxides, acid chlorides, and the like. Thus, when the metal compound (1) contains halogen atoms, it is preferable that a strong acid is added in such a manner that the amount of the strong acid in a solution (catalyst precursor solution) becomes 1% by weight or more. For example, when the acid is hydrochloric acid, by adding the acid in such a manner that the concentration of hydrogen chloride in the solution (catalyst precursor solution) becomes 5% by weight or more, more preferably 10% by weight or more, a clear catalyst precursor solution can be obtained while preventing the occurrence of the precipitation of a hydroxide, an acid chloride, or the like derived from the metal compound (1).

Further, in the case where the metal compound (1) contains a halogen atom, a clear catalyst precursor solution may be obtained by using an alcohol alone as the solvent and by adding no acid.

In the case where the metal compound (1) is a metal complex with the solvent being water alone or a combination of water and another compound, it is also preferable to use the precipitation suppressant for suppressing the occurrence of the precipitation of a hydroxide or an acid chloride. In this case, the precipitation suppressant is preferably a compound having a diketone structure; more preferably diacetyl, acetylacetone, 2,5-hexanedione, and dimedone; further preferably acetylacetone and 2,5-hexanedione.

The precipitation suppressant is added so that the amount of the precipitation suppressant becomes preferably 1 to 70% by weight, more preferably 2 to 50% by weight, further preferably 15 to 40% by weight, in 100% by weight of a metal compound solution (solution that contains the metal compound (1) but contains neither the nitrogen-containing organic compound (2) nor the compound (3)).

The precipitation suppressant is added preferably so that the amount of the precipitation suppressant becomes preferably 0.1 to 40% by weight, more preferably 0.5 to 20% by weight, further preferably 2 to 10% by weight in 100% by weight of the catalyst precursor solution.

The precipitation suppressant may be added in any stage of the step (1).

In the step (1), preferably, a solution that contains the metal compound (1) and the precipitation suppressant is prepared, and this solution is then mixed with the nitrogen-containing organic compound (2) and the compound (3) to obtain a catalyst precursor solution. By performing the step (1) in this way, the occurrence of the precipitation can be more surely prevented.

(Step (2))

In the step (2), the solvent is removed from the catalyst precursor solution obtained in the step (1).

The solvent removal may be performed in air, or may be performed under an atmosphere of an inert gas (for example, nitrogen, argon, and helium). As the inert gas, from the viewpoint of a cost, nitrogen and argon are preferred; and nitrogen is more preferred.

The temperature in the solvent removal may be ordinary temperature when the vapor pressure of the solvent is large, but from the viewpoint of mass production of the catalyst, temperature is preferably 30° C. or more, more preferably 40° C. or more, further preferably 50° C. or more; and from the viewpoint of preventing the decomposition of the catalyst precursor that is presumed to be a metal complex, such as a chelate, contained in the solution obtained in the step (1), the temperature is preferably 350° C. or less, more preferably 150° C. or less, further preferably 110° C. or less.

The solvent removal may be performed under atmospheric pressure when the vapor pressure of the solvent is high, but may be performed under reduced pressure (e.g., 0.1 Pa to 0.1 MPa) in order to remove the solvent within a shorter period of time. For the solvent removal under reduced pressure, for example, an evaporator may be used.

The solvent removal may be performed with the mixture obtained in the step (1) being allowed to stand still; however, in order to obtain a more homogenous solid residue, preferred is the solvent removal with the mixture being rotated.

When the weight of a container holding the mixture is large, it is preferable that the solution is rotated using a stirring rod, a stirring blade, a stirring bar, or the like.

When the solvent removal is performed while regulating the vacuum degree of a container holding the mixture, in which case the drying is performed in a sealable container, it is preferable that the solvent removal is performed while the whole container is rotated: for example, it is preferable that the solvent removal is performed using e.g., a rotary evaporator.

Depending on solvent-removal methods or properties of the metal compound (1), the nitrogen-containing organic compound (2), or the compound (3), the solid residue obtained in the step (2) may have a non-uniform composition or be at a non-uniform agglomeration state. In this case, the solid residue may be subjected to mixing and crushing to obtain more uniform and finer powders to be used in the step (3), whereby a catalyst can be obtained which has more uniform particle diameter.

For the mixing and crushing of the solid residue, for example, a roll-rotating mill, a ball mill, a small-diameter ball mill (bead mill), a medium-stirring mill, an air flow crusher, a mortar, an automatic kneading mortar, a crushing tank, or a jet mill is employable; when the solid residue has been provided in a small amount, a mortar, an automatic kneading mortar, or a batch-type ball mill is preferably used; and when the solid residue has been provided in a large amount and is to be subjected to continuous mixing or crushing treatment, a jet mill is preferably used.

(Step (3))

In the step (3), the solid residue obtained in the step (2) is heat-treated to obtain an electrode catalyst.

The temperature in this heat treatment is 500 to 1100° C., preferably 600 to 1050° C., more preferably 700 to 950° C.

If the temperature in this heat treatment is excessively higher than the above range, sintering and grain growth occur between particles of the resultant electrode catalyst, consequently decreasing the specific surface area of the electrode catalyst, and therefore poor processability is caused when the particles are processed to a catalyst layer by a coating method. On the other hand, if the temperature in this heat treatment is excessively lower than the above range, an electrode catalyst having high activity cannot be obtained.

Examples of methods of the heat treatment method include a standing method, a stirring method, a dropping method, and a powder capturing method.

The standing method is a method in which the solid residue obtained in the step (2) is placed in a stationary electric furnace or the like and is heated. During the heating, the solid residue that has been weighed may also be put in a ceramic container such as an alumina board or a quartz board. The standing method is preferable in view of being able to heat a large amount of the solid residue.

The stirring method is a method in which the solid residue is put in an electric furnace such as a rotary kiln and is heated while being stirred. The stirring method is preferable in view of being able to heat a large amount of the solid residue and in view of being able to prevent the aggregation and growth of the particles of the resultant electrode catalyst. Furthermore, the stirring method is preferable in view of being able to continuously produce the electrode catalyst by sloping a furnace.

The dropping method is a method in which an induction furnace is heated to a predetermined heating temperature while flowing an atmosphere gas through the furnace, a thermal equilibrium is maintained at the temperature, and thereafter the solid residue is dropped and heated in a crucible which is a heating zone in the furnace. The dropping method is preferable in view of being able to minimizing the aggregation and growth of the particles of the resultant electrode catalyst.

The powder capturing method is a method by which the solid residue is caused to suspend as particles in an inert gas atmosphere containing a trace amount of an oxygen gas and the solid residue is captured and heated in a vertical tubular furnace kept at a predetermined heating temperature.

When the heat treatment is performed by the standing method, a temperature-raising rate, which is not particularly limited, is preferably around 1° C./min to 100° C./min, more preferably 5° C./min to 50° C./min. Further, the heating time is preferably 0.1 to 10 hours, more preferably 0.5 to 5 hours, further preferably 0.5 to 3 hours. When the heating by the standing method is performed in a tubular furnace, the heating time of the solid residue is 0.1 to 10 hours, preferably 0.5 hour to 5 hours. The heating time in this range leads to the tendency of the formation of uniform electrode catalyst particles.

Under the stirring method, the heating time of the solid residue is usually 10 minutes to 5 hours, preferably 30 minutes to 2 hours. Under this method, when the solid residue is continuously heated, for example, by sloping the furnace, the heating time is defined as a mean residence time calculated from the sample flowing amount in a steady furnace.

Under the dropping method, the heating time of the solid residue is usually 0.5 to 10 minutes, preferably 0.5 to 3 minutes. The heating time within this range leads to the tendency of the formation of uniform electrode catalyst particles.

Under the powder capturing method, the heating time of the solid residue is 0.2 second to 1 minute, preferably 0.2 to 10 seconds. The heating time within this range leads to the tendency of the formation of uniform electrode catalyst particles.

When the heat treatment is performed under the standing method, a heating furnace employing LNG (liquefied natural gas), LPG (liquefied petroleum gas), light oil, heavy oil, electricity, or the like as a heat source may be used as a heat treatment apparatus. In this case, since the atmosphere in heat treatment of the solid residue is important in the present invention, a preferable apparatus is not a heating apparatus that holds fuel flame within the furnace and thereby provides heating from the inside of the furnace, but a heating apparatus that provides heating from the outside of the furnace.

When a heating furnace is used which provides the solid residue in an amount of 50 kg or more per one batch, from the viewpoint of a cost, a heating furnace employing LNG or LPG as a heat source is preferable.

When an electrode catalyst having particularly high catalytic activity is desired, it is preferable to use an electric furnace employing electricity as a heat source, which allows for the strict controlling of temperature.

Exemplary shapes of the furnace include a tubular furnace, a top-loading furnace, a tunnel furnace, a box furnace, a sample table elevating-type furnace (elevator furnace), a carbottom furnace, and the like; of these, preferred are a tubular furnace, a top-loading furnace, a box furnace, and a sample table elevating-type furnace, which allow for the particular strict controlling of atmosphere; and preferred are a tubular furnace and a box furnace.

When the stirring method is adopted, the above heat source is also employable; however, especially when the solid residue is continuously heat-treated by the stirring method using a inclined rotary kiln, it is likely that the equipment size becomes larger and a large amount of energy is needed; and thus it is preferable to use a heat source derived from fuels such as LPG.

The atmosphere in performing the heat treatment is preferably atmosphere containing an inert gas as a main component, which allows the resultant electrode catalyst to have increased activity. Among the inert gases, in view of relative inexpensiveness and easy availability, nitrogen, argon, and helium are preferred; and nitrogen and argon are further preferred. These inert gases may be used singly or in combination of two or more kinds. Although these gases are commonly recognized as being inert, there is a possibility that in the heat treatment of the step (3), these inert gases, i.e., nitrogen, argon, helium, and the like are reacted with the solid residue.

The presence of a reactive gas in the atmosphere in performing the heat treatment may allow the resultant electrode catalyst to have higher catalytic performance. For example, when the heat treatment is performed under the atmosphere of a nitrogen gas; an argon gas; a mixed gas of a nitrogen gas and an argon gas; or a mixed gas of one or more gases selected from a nitrogen gas and an argon gas and one or more gases selected from a hydrogen gas, an ammonia gas, and an oxygen gas, an electrode catalyst having high catalytic performance tends to be obtained.

When the atmosphere in performing the heat treatment contains a hydrogen gas, the concentration of the hydrogen gas is, for example, 100% by volume or less, preferably 0.01 to 10% by volume, more preferably 1 to 5% by volume.

When the atmosphere in performing the heat treatment contains an oxygen gas, the concentration of the oxygen gas is, for example, 0.01 to 10% by volume, preferably 0.01 to 5% by volume.

A pressure in the heat treatment is not particularly limited, and the heat treatment may also be carried out under atmospheric pressure in consideration of production stability, a cost, and the like.

After the heat treatment, a heat-treated product may also be disintegrated. Performing the disintegrating may improve the processability in using the resultant electrode catalyst to produce an electrode, and the properties of the resultant electrode. For the crushing, for example, a roll-rotating mill, a ball mill, a small-diameter ball mill (bead mill), a medium-stirring mill, an air flow crusher, a mortar, an automatic kneading mortar, a crushing tank, or a jet mill may be used. When the electrode catalyst has been provided in a small amount, a mortar, an automatic kneading mortar, or a batch-type ball mill is preferred; and when the heat-treated product is to be continuously treated in a large amount, a jet mill or a continuous-type ball mill is preferred, and among the continuous-type ball mills, a bead mill is further preferred.

Heat-Treated Product

The heat-treated product of the present invention is obtained through:

a step (1) of mixing at least a metal compound (1), a nitrogen-containing organic compound (2), a compound (3) containing fluorine and at least one element A selected from the group consisting of boron, phosphorus, and sulfur, and a solvent to obtain a catalyst precursor solution;

a step (2) of removing a solvent from the catalyst precursor solution; and a step (3) of heat-treating a solid residue, obtained in the step (2), at a temperature of 500 to 1100° C., a portion or the entirety of the metal compound (1) being a transition metal compound (M1) containing, as a metal element, at least one transition metal element M1 selected from the elements of group 4 and group 5 of the periodic table; and at least one of the metal compound (1), the nitrogen-containing organic compound (2), and the compound (3) having an oxygen atom.

The details of the steps (1) to (3) and the compounds (1) to (3) are as mentioned above.

The heat-treated product of the present invention is useful as a fuel cell electrode catalyst described below.

Fuel Cell Electrode Catalyst

The fuel cell electrode catalyst of the present invention (hereinafter also simply referred to as "catalyst") is produced by the above-mentioned method for producing a fuel cell electrode catalyst of the present invention. Also, the catalyst of the present invention may comprise the above-mentioned heat-treated product of the present invention.

When the proportions of the number of atoms of a metal element, carbon, nitrogen, oxygen, the element A, and fluorine that constitute the catalyst is represented in such a manner as the metal element:carbon:nitrogen:oxygen:the element A:fluorine=1:x:y:z:a:b, the following is preferably satisfied: $0<x\leq 9$, $0<y\leq 2$, $0<z\leq 5$, $0<a\leq 1$, and $0<b\leq 2$.

In terms of allowing the electrode catalyst to have high activity, the range of x is more preferably $0.15\leq x\leq 9.0$, further preferably $0.2\leq x\leq 8.0$, particularly preferably $1.0\leq x\leq 7.0$; the range of y is more preferably $0.01\leq y\leq 2.0$, further preferably $0.02\leq y\leq 1.8$, particularly preferably $0.03\leq y\leq 1.5$; the range of z is more preferably $0.05\leq z\leq 5.0$, further preferably $0.1\leq z\leq 4.0$, particularly preferably $0.2\leq z\leq 3.5$;

the range of a is more preferably $0.001\leq a\leq 1$, further preferably $0.001\leq a\leq 0.5$, particularly preferably $0.001\leq a\leq 0.2$; and the range of b is more preferably $0.0001\leq b\leq 2$, further preferably $0.001\leq b\leq 1$, particularly preferably $0.001\leq b\leq 0.2$.

In the case where, as the metal elements, one transition metal element M1 selected from the group consisting of the group 4 and the group 5 elements of the periodic table and at least one transition metal element M2 selected from iron, nickel, chromium, cobalt, and manganese are contained in the catalyst, when the proportions of the number of atoms of the transition metal element M1 and the transition metal element M2 that constitute the catalyst are represented in such a manner as the transition metal element M1: the transition metal element $M2=(1-\alpha):\alpha$, the following is preferably satisfied: $0<\alpha\leq 0.5$; more preferably $0.01\leq \alpha\leq 0.5$, further preferably $0.02\leq \alpha\leq 0.4$, particularly preferably $0.05\leq \alpha\leq 0.3$ in terms of the high activity of the electrode catalyst.

Furthermore, the atoms of the metal element M3 may also be contained in the catalyst, and when the proportions of the number of atoms of the transition metal element M1 and the metal element M3 that constitute the catalyst are represented in such a manner as the transition metal element M1: the metal element $M3=1:\beta$, the following is satisfied: e.g., $0\leq \beta\leq 1$; $0\leq \beta\leq 0.5$, or $0\leq \beta\leq 0.3$.

The values of $\alpha$, x, y, z, a, and b are those as measured by the method adopted in Examples described later.

According to the method for producing a fuel cell electrode catalyst of the present invention, a fuel cell electrode catalyst having a large specific surface area is produced, and the specific surface area as calculated by BET method of the catalyst of the present invention is preferably 30 to 1000 $m^2/g$, more preferably 30 to 350 $m^2/g$, further preferably 50 to 300 $m^2/g$, particularly preferably 100 to 300 $m^2/g$.

The catalyst (A) has an oxygen reduction onset potential of, as measured according to a measurement method (A) described below, is preferably 0.6 V (vs. RHE) or more, more preferably 0.7 V (vs. RHE) or more, further preferably 0.8 V or more, particularly preferably 0.85 V or more as measured versus a reversible hydrogen electrode.

[Measurement Method (A):

A catalyst and carbon are added to a solvent so that the catalyst dispersed in the carbon being electron conductive particles accounts for 1% by mass. The mixture is ultrasonically stirred to give a suspension. The carbon source herein is carbon black (specific surface area: 100-300 $m^2/g$) (e.g., VULCAN (registered trademark) XC-72 manufactured by Cabot Corporation), and the catalyst is dispersed therein with a catalyst:carbon mass ratio of 95:5. The solvent is a mixture of isopropyl alcohol:water (=2:1 by mass).

While ultrasonicating the suspension, a 10 μL portion thereof is collected and is quickly dropped on a glassy carbon electrode (diameter: 5.2 mm) and dried at 120° C. for 5 minutes to form a fuel cell catalyst layer containing the catalyst on the glassy carbon electrode. This dropping and drying operation is performed until 1.0 mg or more of the fuel cell catalyst layer is formed on the carbon electrode surface.

Subsequently, 10 μL of a 5% NAFION (registered trademark) solution (DE521, DuPont) diluted ten times with isopropyl alcohol is further dropped on the fuel cell catalyst layer and is dried at 120° C. for 1 hour.

Using the electrode manufactured above, polarization is carried out in a 0.5 mol/L sulfuric acid aqueous solution at 30° C. under an oxygen atmosphere and a nitrogen atmosphere at a potential scanning rate of 5 mV/sec, thereby recording a current-potential curve. As a reference, a reversible hydrogen electrode in a sulfuric acid aqueous solution of the same concentration is used. In the current-potential curve, the potential at which the reduction current starts to differ by 0.2 $\mu A/cm^2$ or more between the polarization under the oxygen atmosphere and that under the nitrogen atmosphere is defined as the oxygen reduction onset potential.]

In the present invention, the oxygen reduction current density can be determined in such a manner as described below.

At first, from the result of the measurement method (A), a difference between the reduction current under oxygen atmosphere and the reduction current under nitrogen atmosphere at a specific potential (e.g., 0.80 V (vs. RHE)) is calculated. The calculated value is divided by an area of the electrode to provide a value and this value is defined as an oxygen reduction current density ($mA/cm^2$).

The catalyst of the present invention is preferably a catalyst which shows a peak attributed to titanium oxide, more preferably a catalyst which shows a peak attributed to anatase-type titanium oxide in X-ray diffractometry (the details of the measurement method is as described in Examples) when the metal element M1 is titanium.

It is considered that when a catalyst is produced by the method for producing a fuel cell electrode catalyst of the present invention using a titanium compound as the metal compound (1), since fluorine is present in the compound (3), the sintering temperature of the catalyst is decreased in the step (3) in comparison with the case in which the compound (3) is not used, and this causes the formation of an anatase skeleton.

Rutile-type titanium oxide is obtained by heat-treating a raw material at 800° C. or more when titanium oxide is produced by a conventionally common method, while anatase-type titanium oxide can be obtained even by performing heat treatment at 800° C. or more in the step (3) according to the method for producing a catalyst of the present invention.

Further, the catalyst which shows a peak attributed to titanium oxide can be produced by heat-treating the solid residue containing a titanium atom at 500° C. or more.

Uses

The catalyst of the present invention can be used as a catalyst alternative to a platinum catalyst.

The fuel cell catalyst layer of the present invention comprises the catalyst.

Fuel cell catalyst layers include anode catalyst layers and cathode catalyst layers, and the catalyst may be used in any one of these layers. Because the catalyst has excellent durability and high oxygen reducing ability, it is preferably used in cathode catalyst layers.

The fuel cell catalyst layer of the present invention preferably further comprises an electron conductive powder. When the fuel cell catalyst layer comprising the catalyst further comprises the electron conductive powder, the reduction current can be more increased. It is considered that the electron conductive powder increases the reduction current because of allowing the catalyst to have an electrical bond for inducing electrochemical reaction.

The electron conductive particles are usually used as a carrier of the catalyst.

Although the catalyst has conductivity to some degree, in order for the catalyst to be given more electrons or in order for a reactant to receive many electrons from the catalyst, the catalyst, in order to be provided with conductivity, may be mixed with carrier particles. The carrier particles may be mixed into the catalyst produced after subjected to the step (1) to the step (3), or may be mixed in any stage of from the step (1) to the step (3).

Examples of materials of the electron conductive particles include carbon, conductive polymers, conductive ceramics, metals, and conductive inorganic oxides such as tungsten oxide and iridium oxide, and these materials can be used singly or in combination with one another. In particular, carbon or a mixture of carbon and other electron conductive particles is preferred, since the electron conductive particles composed of carbon have a large specific surface area, those having a small particle diameter are easily available inexpensively, and they are excellent in chemical resistance and high-potential resistance. That is, the fuel cell catalyst layer preferably comprises the catalyst and carbon.

Examples of the carbon include carbon black, graphite, activated carbon, carbon nanotube, carbon nanofiber, carbon nanohorn, fullerene, porous carbon, graphene, and the like. If the particle diameter of the electron conductive particles composed of carbon is excessively small, an electron conductive path is not readily formed, while if the particle diameter is excessively large, the fuel cell catalyst layer tends to have decreased gas diffusion properties or the catalyst usage rate tends to be lowered, and, therefore, the particle diameter of the electron conductive particles composed of carbon is preferably 10 to 1000 nm, more preferably 10 to 100 nm.

When the electron conductive particles are composed of carbon, the weight ratio of the catalyst to the electron conductive particles (catalyst: electron conductive particles) is preferably 4:1 to 1000:1.

The conductive polymers are not particularly limited but examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline, polyphenylquinoxaline, and the like. Of these, polypyrrole, polyaniline, and polythiophene are preferred, and polypyrrole is more preferred.

The fuel cell catalyst layer of the present invention preferably further comprises a polymer electrolyte. The polymer electrolytes are not particularly limited as long as being those commonly used in fuel cell catalyst layers. Specific examples thereof include perfluorocarbon polymers having a sulfonic acid group (such as NAFION (registered trademark)), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trademark) is preferable. Examples of the source of NAFION (registered trademark) in forming the fuel cell catalyst layer include a 5% NAFION (registered trademark) solution (DE521, DuPont) and the like.

The fuel cell catalyst layer of the present invention may be used as an anode catalyst layer or a cathode catalyst layer. The fuel cell catalyst layer of the present invention comprises the catalyst that has high oxygen reducing ability and is resistant to corrosion in acidic electrolytes even at high potential and is therefore useful as a catalyst layer provided in a cathode of a fuel cell (as a cathode catalyst layer). In particular, the catalyst layer is preferably provided in a cathode of a membrane electrode assembly in a polymer electrolyte fuel cell.

The catalyst may be dispersed on the electron conductive particles serving as a carrier by methods such as airborne dispersion methods and in-liquid dispersion methods. The in-liquid dispersion methods are preferable because a dispersion of the catalyst and the electron conductive particles in a solvent can be used in the step for forming a fuel cell catalyst layer. Exemplary in-liquid dispersion methods include a method using orifice-choked flow, a method using rotational shear flow, a method using ultrasonic, and the like. The solvents used in the in-liquid dispersion methods are not particularly limited as long as the catalysts or the electron conductive particles are not corroded and are dispersed therein. Volatile liquid organic solvents, water or the like are generally used.

When the catalyst is dispersed on the electron conductive particles, the electrolyte described above and a dispersant may be further dispersed together.

The fuel cell catalyst layer may be formed by any methods without limitation. For example, a suspension containing the catalyst, the electron conductive particles, and the electrolyte may be applied to an electrolyte membrane or a gas diffusion layer as described later. The application methods include dipping, screen printing, roll coating, spraying, and the like. In another embodiment, a suspension containing the catalyst, the electron conductive particles, and the electrolyte may be applied or filtered on a substrate to form a fuel cell catalyst layer, and the catalyst layer may be transferred to an electrolyte membrane.

The electrode of the present invention comprises the fuel cell catalyst layer and a porous support layer.

The electrode of the present invention may be used as any electrode of a cathode or an anode. The electrode of the present invention has excellent durability and high catalytic performance, and therefore using the electrode as a cathode leads to higher industrial advantage.

The porous support layer is a layer which diffuses gas (hereinafter also referred to as a "gas diffusion layer"). The gas diffusion layer is not limited as long as having electron conductivity, high gas diffusion properties, and high corrosion resistance. Carbon-based porous materials such as carbon paper and carbon cloth, and stainless steel and anticorrosive-coated aluminum foils for weight reduction are generally used as the gas diffusion layer.

The membrane electrode assembly of the present invention comprises a cathode, an anode, and an electrolyte membrane interposed between the cathode and the anode, wherein the cathode and/or the anode are the electrodes.

The catalytic performance in the membrane electrode assembly can be evaluated, for example, by a maximum power density calculated as described below.

Figure 27:
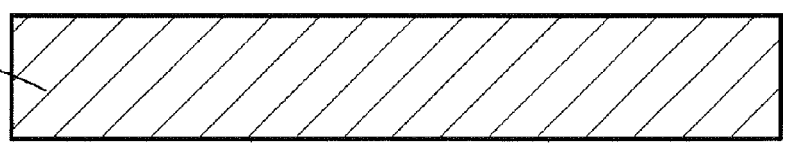
FIG. 27 is an example of an exploded cross-sectional view of a single cell of a polymer electrolyte fuel cell.
Figure 27:
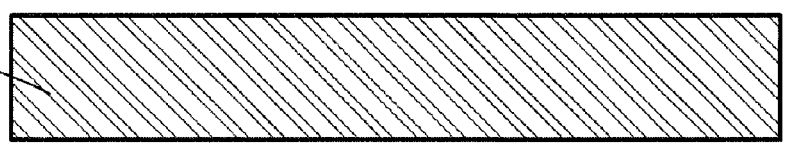
Figure 27:
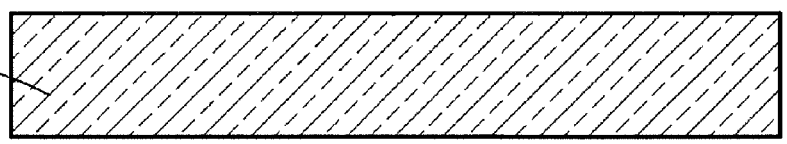
Figure 27:
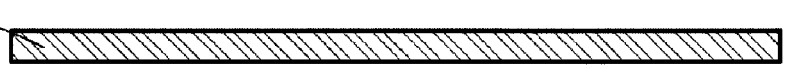
Figure 27:
Figure 27:
Figure 27:
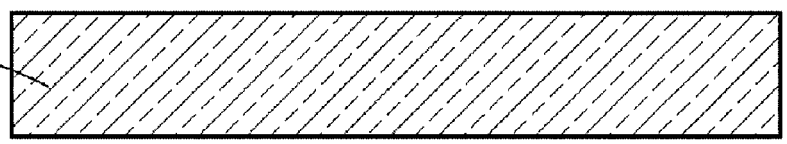
Figure 27:
Figure 27:
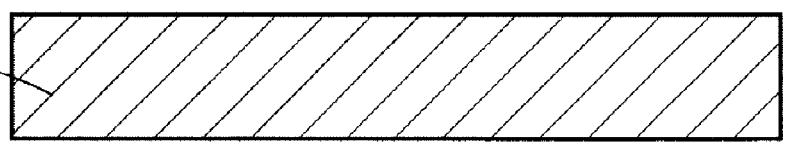

First, as illustrated in FIG. 27, a membrane electrode assembly 11 is held by sealing materials (gaskets 12), separators each having a gas flow passage 13, and collectors 14 and fixed with a bolt, and secured so that the pressure of contacted surface becomes a prescribed value (4 N), to thereby prepare a single cell of a polymer electrolyte fuel cell.

To the anode side, hydrogen was supplied as a fuel at a flow rate of 1 L/min, and to the cathode side, oxygen was supplied as an oxidizing agent at a flow rate of 2 L/min, and, while applying a back pressure of 300 kPa to both sides, a current-voltage property of the single cell at a temperature of 90° C. is measured. From the current-voltage property curve obtained, a maximum power density is calculated. The higher the maximum power density is, the higher the catalytic performance in the membrane electrode assembly is. The maximum power density is preferably 400 mW/cm$^2$ or more, more preferably 600 mW/cm$^2$ or more, and the upper limit thereof is, e.g., around 1000 mW/cm$^2$.

As the electrolyte membranes, perfluorosulfonic acid-based electrolyte membranes or hydrocarbon electrolyte membranes are generally used, and there may also be used membranes in which polymer microporous membranes are impregnated with liquid electrolyte; membranes in which porous bodies are filled with polymer electrolyte; or the like.

The fuel cell of the present invention comprises the membrane electrode assembly.

The electrode reaction in fuel cells takes place at a so-called three-phase interface (electrolyte-electrode catalyst-reactant gas). The fuel cells are classified according to the electrolytes used, into several types such as molten carbonate type (MCFC), phosphoric acid type (PAFC), solid oxide type (SOFC), polymer electrolyte type (PEFC), and the like. Especially, the membrane electrode assembly of the present invention is preferably used in polymer electrolyte fuel cells.

The fuel cell comprising the catalyst of the present invention has high performance and is considerably inexpensive as compared with platinum catalysts. The fuel cell of the present invention has at least one function selected from the group consisting of electricity generating function, light emitting function, heat generating function, sound generating function, movement function, display function, and charging function and can improve the performance of an article, particularly a mobile article, having a fuel cell. The fuel cell is held preferably on the surface or inside of the article.

<Specific Examples of Articles Comprising Fuel Cell of the Present Invention>

Specific examples of the articles comprising the fuel cell of the present invention include architectural structures such as buildings, houses and tents, illumination equipment such as fluorescent light, LED, organic EL, street light, interior illumination and traffic light, machinery, automotive devices including vehicles, household appliances, agricultural equipment, electronic devices, mobile information terminals including mobile phones, beauty instruments, portable tools, sanitary goods such as bathroom goods and lavatory goods, furniture, toys, ornaments, bulletin boards, cool boxes, outdoor goods such as exterior generators, teaching materials, artificial flowers, items of artwork, power source for cardiac pacemakers and power source for heating and cooling apparatuses equipped with Peltier elements.

EXAMPLES

The present invention will be described below based on examples but the present invention is not limited to these examples.

In Examples and Comparative Examples, various measurements were performed by the following methods.

[Analytical Methods]

1. Powder X-ray Diffractometry

Samples were subjected to powder X-ray diffractometry using Rotaflex manufactured by Rigaku Corporation.

The details of the measurement conditions are as follows.

X-ray output: (Cu—Kα):50 kV, 180 mA
Scanning axis: θ/2θ
Measurement range (2θ):10.00° to 89.98°
Measurement mode: FT
Reading width: 0.02°
Sampling time: 0.70 sec
DS, SS, RS: 0.5°, 0.5°, 0.15 mm
Goniometer radius: 185 mm With regard to the counting of diffraction peaks in the powder X-ray diffractometry for each sample, a signal that was detected with a signal (S) to noise (N) ratio (S/N) of 2 or more was regarded as a single peak.

The noise (N) was the width of the baseline.

2. Elemental Analysis

<Carbon, Sulfur>

About 0.01 g of a sample was weighed and measured with a carbon/sulfur analyzer (EMIA-920V manufactured by HORIBA, Ltd.).

<Nitrogen, Oxygen>

About 0.01 g of a sample was weighed, was sealed in a Ni capsule, and was measured with an oxygen/nitrogen analyzer (TC600 manufactured by LECO).

<Metals (Niobium, Vanadium, Titanium, Zirconium, Tantalum, Iron, etc.)>

About 0.1 g of a sample was weighed in a quartz beaker to completely decompose the sample by heating, using sulfuric acid, nitric acid, and fluorinated acid. After cooling, this solution was quantitatively determine to 100 ml, was further appropriately diluted, and was quantitated using ICP-OES (VISTA-PRO manufactured by SII) or ICP-MS (HP7500 manufactured by Agilent).

<Fluorine>

Several mg of a sample was decomposed by combustion while flowing water vapor under oxygen air stream. A generated gas was made to be absorbed by 10 mM $Na_2CO_3$ (containing hydrogen peroxide; standard for correction Br—: 5 ppm) to measure the amount of fluorine by ion chromatography.

Combustion Decomposition Conditions:
Sample combustion apparatus: AQF-100 (manufactured by Mitsubishi Chemical Analytech Co., Ltd.)
Combustion tube temperature: 950° C. (temperature-raising decomposition by moving sample board)
Ion chromatography measurement conditions
Measuring apparatus: DIONEX DX-500
Eluent: 1.8 mM $Na_2CO_3$+1.7 mM $NaHCO_3$
Column (temperature): ShodexSI-90 (room temperature)
Flow rate: 1.0 ml/min
Injection amount: 25 μl
Detector: Electric conductivity detector
Suppressor: DIONEX ASRS-300

<Boron>

Several tens of mg of a sample, added with phosphoric acid and then added with sulfuric acid, was heated until white smoke of sulfuric acid was generated, and was left standing to cool. Then, an operation of addition of nitric acid→heating→standing to cool was repeated several times. The sample subjected to these operations was quantitatively determined with pure water to 50 ml in a plastic container, followed by diluting the quantitatively determined product (supernatant liquid in the case of generating a precipitate) 10 times with pure water. Then, the amount of boron was measured by ICP emission spectrometry.

<Phosphorus>

About 0.02 g of a sample was added with sulfuric acid, was heated until white smoke of sulfuric acid was generated, and was left standing to cool, followed by adding nitric acid and repeating an operation of addition of nitric acid→heating→standing to cool until complete decomposition thereof. The sample subjected to these operations was quantitatively determined with pure water to 100 ml in a plastic container. When a white turbidity was seen, fluorinated acid was added until the white turbidity was not seen. The quantitatively determined product was further diluted 50 times with pure water and the amount of phosphorus was measured by ICP emission spectrometry.

3. BET Specific Surface Area Measurement

A BET specific surface area was measured using Micromeritics Gemini 2360 manufactured by Shimadzu Corporation. The pretreatment time and the pretreatment temperature were set at 30 minutes and 200° C., respectively.

Anode Preparation Example 1

1. Preparation of Anode Ink

Into 50 mL of pure water, 0.6 g of platinum supporting carbon (TEC10E60E, manufactured by TANAKA KIKINZOKU KOGYO K.K.) and 5 g of an aqueous solution containing 0.25 g of a proton conductive material (NAFION (registered trademark)) (5% NAFION (registered trademark) aqueous solution, manufactured by Wako Pure Chemical Industries, Ltd.) were introduced, and the resultant solution was mixed with an ultrasonic wave dispersion machine (UT-106H, manufactured by Sharp Manufacturing Systems Corporation) for 1 hour, to prepare an anode ink (1).

2. Preparation of Electrode Having Anode Catalyst Layer

A gas diffusion layer (carbon paper (TGP-H-060, manufactured by Toray Industries, Inc.)) was immersed in acetone for 30 seconds and degreased, thereafter dried, and then immersed in an aqueous 10% polytetrafluoroethylene (hereinafter also referred to as "PTFE") solution for 30 seconds.

The immersed product was dried at room temperature and was then heated at 350° C. for 1 hour to provide a water-repellent gas diffusion layer having PTFE dispersed in the carbon paper (hereinafter also referred to as "GDL").

The GDL was formed into the size of 5 cm×5 cm, and the surface thereof was coated with the anode ink (1) using an automatic spray-coating apparatus (manufactured by San-Ei Tech Ltd.) at 80° C. By repeating the spray-coating, an electrode having an anode catalyst layer (1) in which the amount of platinum (Pt) per unit area was 1 mg/cm$^2$ was prepared.

Example 1

1. Production of Catalyst

In a beaker, 2.60 g (25.94 mmol) of acetylacetone was put; while this was stirred, 5.60 g (17.59 mmol) of niobium ethoxide was added; and 8 mL (140.00 mmol) of acetic acid was further dropwise added over 2 minutes to prepare a niobium solution.

In a beaker, 60 mL of water, 50 mL of ethanol, and 60 mL of acetic acid were put; and 8.74 g (70.36 mmol) of pyrazinecarboxylic acid was added thereto and completely dissolved. While the resultant solution was stirred, 191 mg (0.88 mmol) of tetraethylammonium tetrafluoroborate was added thereto, and 290 mg (1.67 mmol) of iron acetate was added little by little and dissolved. Then, with the temperature kept at room temperature and stirring, the niobium solution was dropwise added over 10 minutes; and the dropwise addition was followed by stirring for 30 minutes to obtain a catalyst precursor solution (1).

The catalyst precursor solution (1) was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was crushed with an automatic mortar to obtain 11.3 g of a powder (1) for burning.

In a rotary kiln furnace, 1.2 g of the powder (1) for burning was heated to 890° C. under the flowing at a rate of 20 mL/min of a nitrogen gas containing 4% by volume of a hydrogen gas (i.e., mixed gas of hydrogen gas:nitrogen gas=4% by volume: 96% by volume) at a temperature-raising rate of 10° C./min, was burnt at 890° C. for 0.5 hour, and was subjected to natural cooling to obtain 282 mg of a powdery catalyst (1).

The powder X-ray diffraction spectrum of the catalyst (1) is shown in FIG. 1.

The rate of each element constituting the catalyst (1) (proportion of the number of atoms) was Nb:Fe:C:N:O:B:F=1: 0.10:3.20:0.55:2.77:0.04:0.001.

Further, the BET specific surface area of the catalyst (1) was 208.8 m$^2$/g.

2. Production of Fuel Cell Electrode

The catalyst (1) in an amount of 0.095 g and carbon (VULCAN (registered trademark) XC72 manufactured by Cabot Corporation) in an amount of 0.005 g were added to 10 g of a solution obtained by mixing isopropyl alcohol and pure water at a mass ratio of isopropyl alcohol:pure water=2:1. The mixture was ultrasonically stirred to give a suspended mixture. On a glassy carbon electrode (diameter: 6 mm, manufactured by Tokai Carbon Co., Ltd.), 30 μl of this mixture was applied and was dried at 120° C. for 5 minutes, thereby forming 1.0 mg or more of a fuel cell catalyst layer on the carbon electrode surface. Furthermore, 10 μl of NAFION (registered trademark) (a 5% NAFION (registered trademark) solution (DE521, DuPont)) diluted ten times with isopropyl alcohol was applied thereon and was dried at 120° C. for 1 hour to obtain a fuel cell electrode (1).

3. Evaluation of Oxygen Reducing Ability

The fuel cell electrode (1) prepared was subjected to polarization in a 0.5 mol/L sulfuric acid aqueous solution at 30° C. under an oxygen atmosphere and a nitrogen atmosphere at a potential scanning rate of 5 mV/sec, thereby recording each current-potential curve. As a reference electrode, a reversible hydrogen electrode was used in a sulfuric acid aqueous solution of the same concentration.

In the result of the above measurement, the potential at which the reduction current started to differ by 0.2 μA/cm$^2$ or more between the reduction current under the oxygen atmosphere and that under the nitrogen atmosphere was defined as an oxygen reduction onset potential. Further, a difference between the reduction current under oxygen atmosphere and the reduction current under nitrogen atmosphere at 0.80 V (vs. RHE) was calculated. The calculated value was divided by an area of the electrode to provide a value and this value was defined as an oxygen reduction current density (mA/cm$^2$).

The catalytic performance of the fuel cell electrode (1) was evaluated based on the oxygen reduction onset potential and the oxygen reduction current density.

The higher the oxygen reduction onset potential and the higher the oxygen reduction current density are, the higher the catalytic performance of the catalyst in the fuel cell electrode is.

Figure 2:
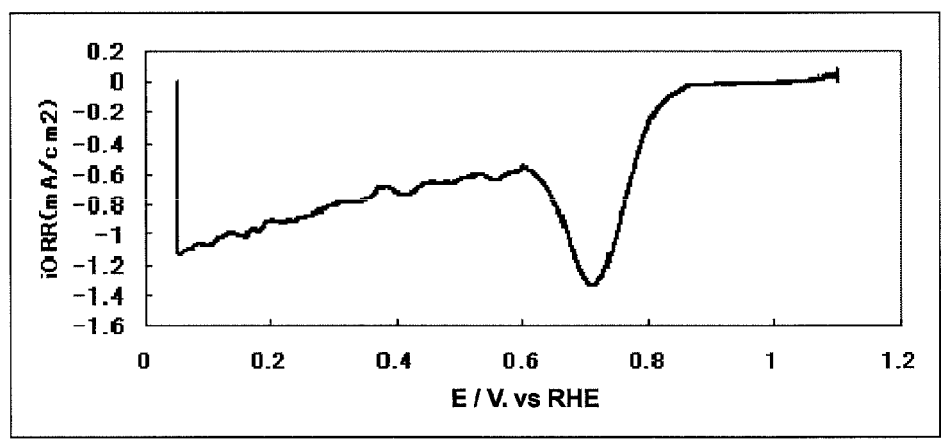
FIG. 2 is an oxygen reduction current density-potential curve of a fuel cell electrode (1) of Example 1.

FIG. 2 shows the current-potential curve obtained in the above measurement.

The catalyst (1) had an oxygen reduction onset potential of 1.02 V (vs. RHE) and an oxygen reduction current density of 0.266 mA/cm$^2$ at 0.80 V.

Example 2

1. Production of Catalyst

The same operation as in Example 1 was carried out, except that 10 ml of a 5% NAFION (registered trademark) solution (DE521, DuPont) was used instead of tetraethylammonium tetrafluoroborate, to obtain 231 mg of a powdery catalyst (2). The weight of the powder for burning obtained in this process was 10.8 g.

Figure 3:
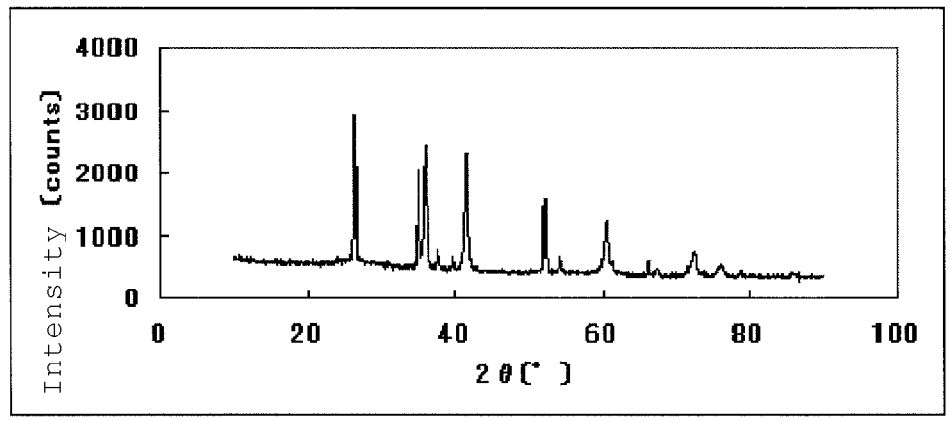
FIG. 3 is a powder X-ray diffraction spectrum of a catalyst (2) of Example 2.

The powder X-ray diffraction spectrum of the catalyst (2) is shown in FIG. 3.

The rate of each element constituting the catalyst (2) (proportion of the number of atoms) was Nb:Fe:C:N:O:S:F=1: 0.10:4.50:1.10:2.03:0.013:0.001.

Further, the BET specific surface area of the catalyst (2) was 220 m$^2$/g.

2. Production of Fuel Cell Electrode and Evaluation of Oxygen Reducing Ability A fuel cell electrode (2) was produced and the oxygen reducing ability thereof was evaluated by the same method as in Example 1 except that 0.095 g of the catalyst (2) was used instead of 0.095 g of the catalyst (1).

Figure 4:
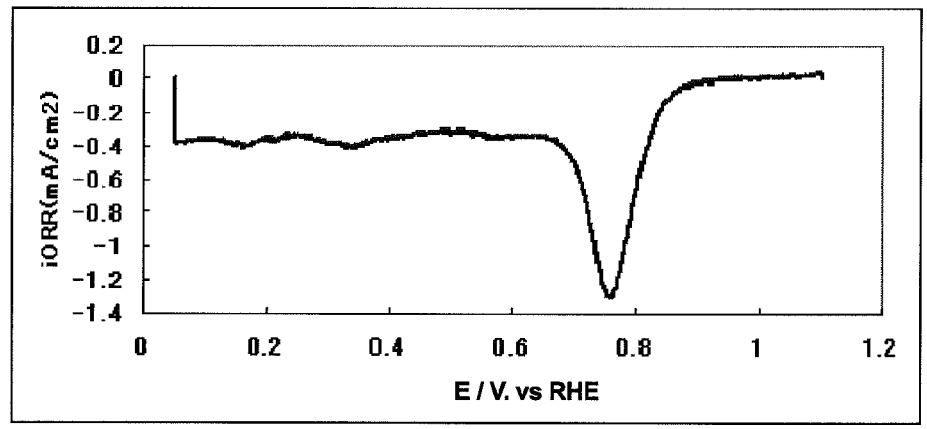
FIG. 4 is an oxygen reduction current density-potential curve of a fuel cell electrode (2) of Example 2.

The measurement result is shown in FIG. 4. The catalyst (2) had an oxygen reduction onset potential of 0.96 V (vs. RHE) and an oxygen reduction current density of 0.645 mA/cm$^2$ at 0.80 V.

Example 3

1. Production of Catalyst

The same operation as in Example 1 was carried out, except that 880 mg (1.76 mmol) of heptadecafluorooctanesulfonic acid was used instead of tetraethylammonium tetrafluoroborate, to obtain 209 mg of a powdery catalyst (3). The weight of the powder for burning obtained in this process was 11.5 g.

Figure 5:
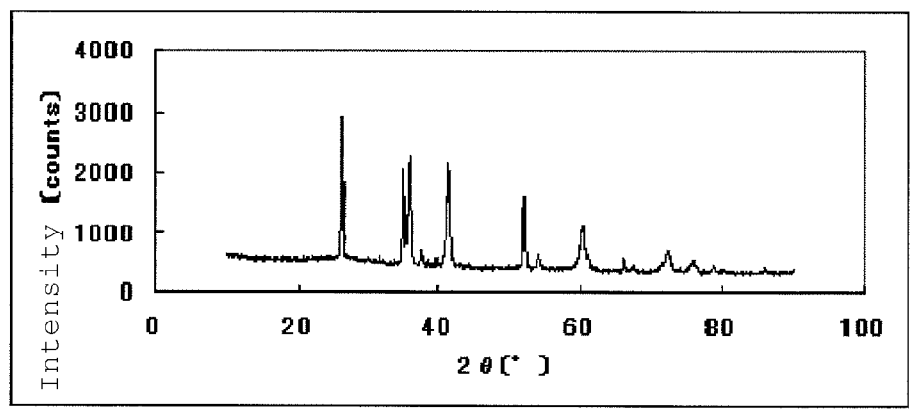
FIG. 5 is a powder X-ray diffraction spectrum of a catalyst (3) of Example 3.

The powder X-ray diffraction spectrum of the catalyst (3) is shown in FIG. 5.

The rate of each element constituting the catalyst (3) (proportion of the number of atoms) was Nb:Fe:C:N:O:S:F=1:0.10:4.68:1.00:2.16:0.05:0.001.

Further, the BET specific surface area of the catalyst (3) was 204.9 m$^2$/g.

2. Production of Fuel Cell Electrode and Evaluation of Oxygen Reducing Ability A fuel cell electrode (3) was produced and the oxygen reducing ability thereof was evaluated by the same method as in Example 1 except that 0.095 g of the catalyst (3) was used instead of 0.095 g of the catalyst (1).

Figure 6:
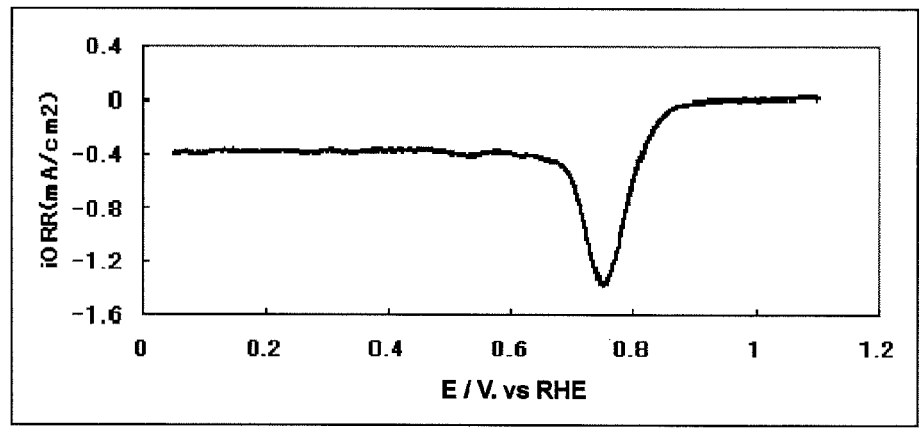
FIG. 6 is an oxygen reduction current density-potential curve of a fuel cell electrode (3) of Example 3.

The measurement result is shown in FIG. 6. The catalyst (3) had an oxygen reduction onset potential of 0.95 V (vs. RHE) and an oxygen reduction current density of 0.570 mA/cm$^2$ at 0.80 V.

Example 4

1. Production of Catalyst

The same operation as in Example 1 was carried out, except that 10 ml of a 5% NAFION (registered trademark) solution (DE521, DuPont) was used instead of tetraethylammonium tetrafluoroborate and iron acetate was not used, to obtain 209 mg of a powdery catalyst (4). The weight of the powder for burning obtained in this process was 11.3 g.

Figure 7:
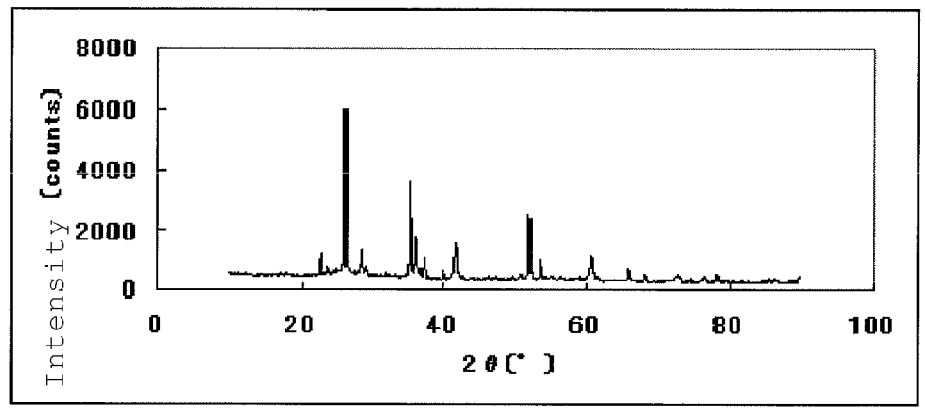
FIG. 7 is a powder X-ray diffraction spectrum of a catalyst (4) of Example 4.

The powder X-ray diffraction spectrum of the catalyst (4) is shown in FIG. 7.

The rate of each element constituting the catalyst (4) (proportion of the number of atoms) was Nb:C:N:O:S:F=1:4.51:0.72:2.64:0.006:0.001.

Further, the BET specific surface area of the catalyst (4) was 229 m$^2$/g.

2. Production of Fuel Cell Electrode and Evaluation of Oxygen Reducing Ability A fuel cell electrode (4) was produced and the oxygen reducing ability thereof was evaluated by the same method as in Example 1 except that 0.095 g of the catalyst (4) was used instead of 0.095 g of the catalyst (1).

Figure 8:
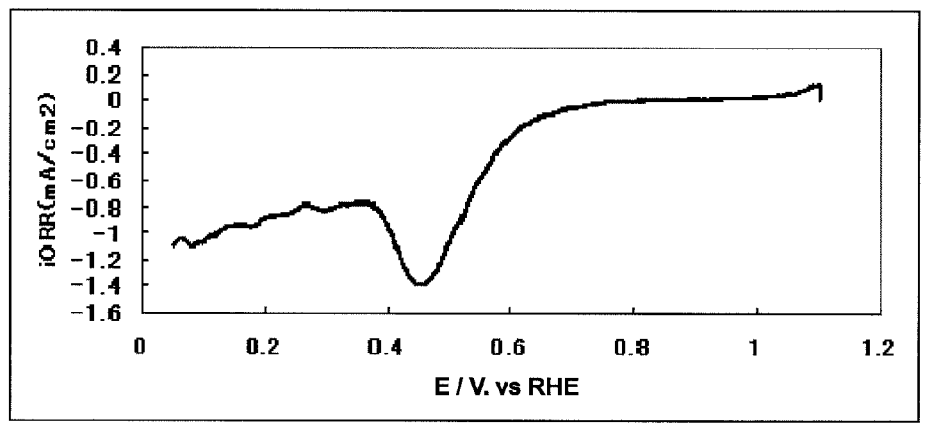
FIG. 8 is an oxygen reduction current density-potential curve of a fuel cell electrode (4) of Example 4.

The measurement result is shown in FIG. 8. The catalyst (4) had an oxygen reduction onset potential of 0.83 V (vs. RHE) and an oxygen reduction current density of 0.010 mA/cm$^2$ at 0.80 V.

Example 5

1. Production of Catalyst

The same operation as in Example 2 was carried out, except that 7.94 g (17.59 mmol) of zirconium butoxide was used instead of niobium ethoxide, to obtain 341 mg of a powdery catalyst (5). The weight of the powder for burning obtained in this process was 12.1 g.

Figure 9:
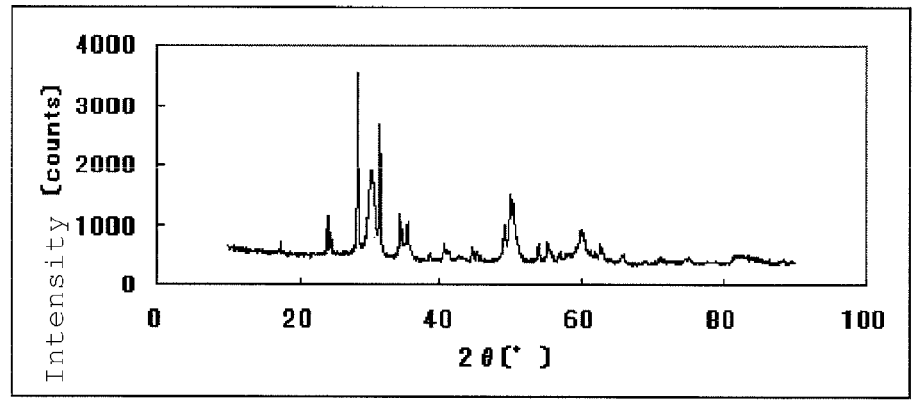
FIG. 9 is a powder X-ray diffraction spectrum of a catalyst (5) of Example 5.

The powder X-ray diffraction spectrum of the catalyst (5) is shown in FIG. 9.

The rate of each element constituting the catalyst (5) (proportion of the number of atoms) was Zr:Fe:C:N:O:S:F=1:0.08:5.89:0.39:2.71:0.006:0.09.

Further, the BET specific surface area of the catalyst (5) was 245 m$^2$/g.

2. Production of Fuel Cell Electrode and Evaluation of Oxygen Reducing Ability A fuel cell electrode (5) was produced and the oxygen reducing ability thereof was evaluated by the same method as in Example 1 except that 0.095 g of the catalyst (5) was used instead of 0.095 g of the catalyst (1).

Figure 10:
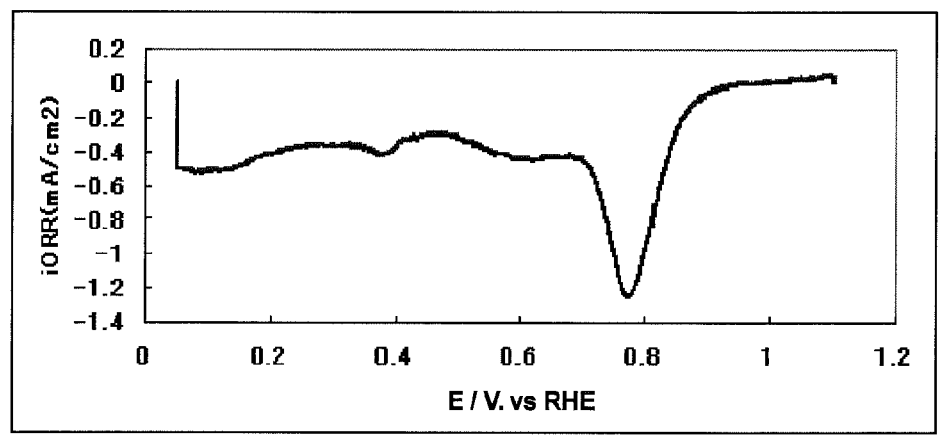
FIG. 10 is an oxygen reduction current density-potential curve of a fuel cell electrode (5) of Example 5.

The measurement result is shown in FIG. 10. The catalyst (5) had an oxygen reduction onset potential of 0.95 V (vs. RHE) and an oxygen reduction current density of 0.997 mA/cm$^2$ at 0.80 V.

Example 6

1. Production of Catalyst

The same operation as in Example 5 was carried out, except that 880 mg (1.76 mmol) of heptadecafluorooctanesulfonic acid was used instead of a NAFION (registered trademark) solution, to obtain 341 mg of a powdery catalyst (6). The weight of the powder for burning obtained in this process was 12.8 g.

Figure 11:
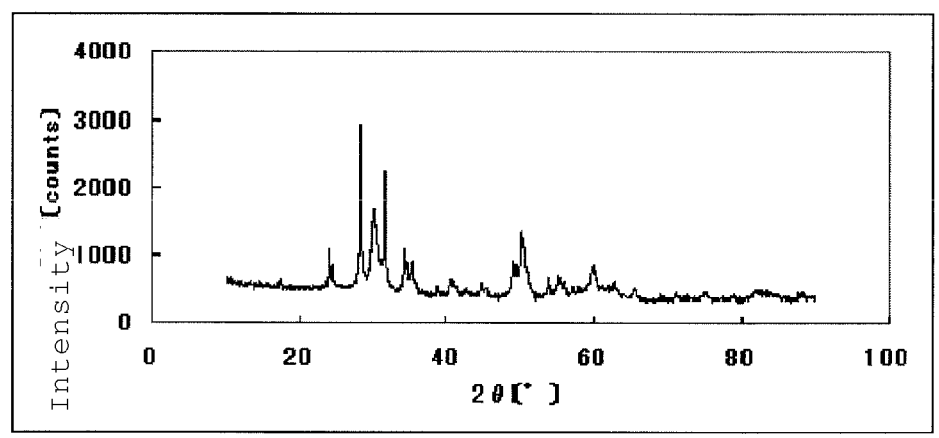
FIG. 11 is a powder X-ray diffraction spectrum of a catalyst (6) of Example 6.

The powder X-ray diffraction spectrum of the catalyst (6) is shown in FIG. 11.

The rate of each element constituting the catalyst (6) (proportion of the number of atoms) was Zr:Fe:C:N:O:S:F=1:0.08:6.08:0.50:2.71:0.012:0.08.

Further, the BET specific surface area of the catalyst (6) was 236.7 m$^2$/g.

2. Production of Fuel Cell Electrode and Evaluation of Oxygen Reducing Ability A fuel cell electrode (6) was produced and the oxygen reducing ability thereof was evaluated by the same method as in Example 1 except that 0.095 g of the catalyst (6) was used instead of 0.095 g of the catalyst (1).

Figure 12:
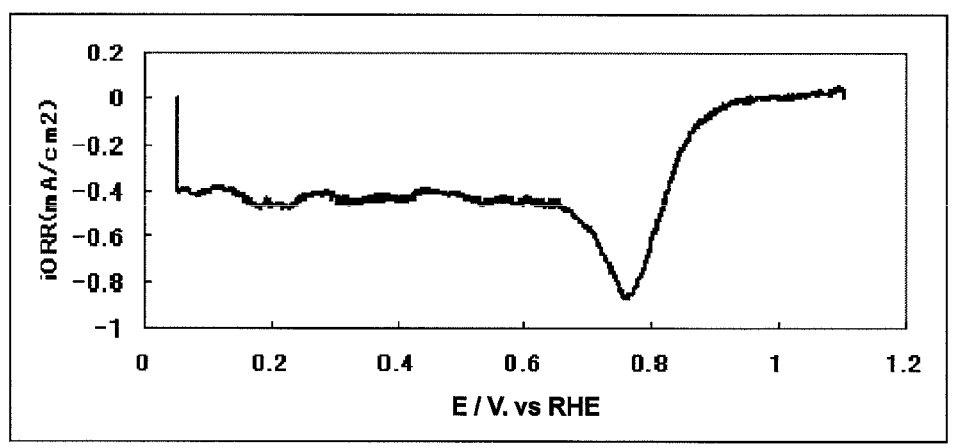
FIG. 12 is an oxygen reduction current density-potential curve of a fuel cell electrode (6) of Example 6.

The measurement result is shown in FIG. 12.

The catalyst (6) had an oxygen reduction onset potential of 0.96 V (vs. RHE) and an oxygen reduction current density of 0.603 mA/cm$^2$ at 0.80 V.

Example 7

1. Production of Catalyst

The same operation as in Example 1 was carried out, except that 7.94 g (17.59 mmol) of zirconium butoxide was used instead of niobium ethoxide, to obtain 349 mg of a powdery catalyst (7). The weight of the powder for burning obtained in this process was 11.8 g.

Figure 13:
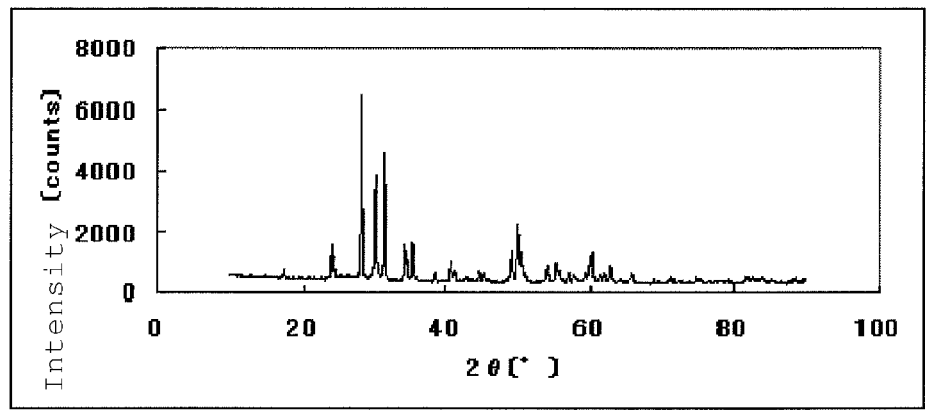
FIG. 13 is a powder X-ray diffraction spectrum of a catalyst (7) of Example 7.

The powder X-ray diffraction spectrum of the catalyst (7) is shown in FIG. 13.

The rate of each element constituting the catalyst (7) (proportion of the number of atoms) was Zr:Fe:C:N:O:B:F=1:0.08:5.86:0.15:2.25:0.04:0.01.

Further, the BET specific surface area of the catalyst (7) was 260.1 m²/g.

2. Production of Fuel Cell Electrode and Evaluation of Oxygen Reducing Ability A fuel cell electrode (7) was produced and the oxygen reducing ability thereof was evaluated by the same method as in Example 1 except that 0.095 g of the catalyst (7) was used instead of 0.095 g of the catalyst (1).

Figure 14:
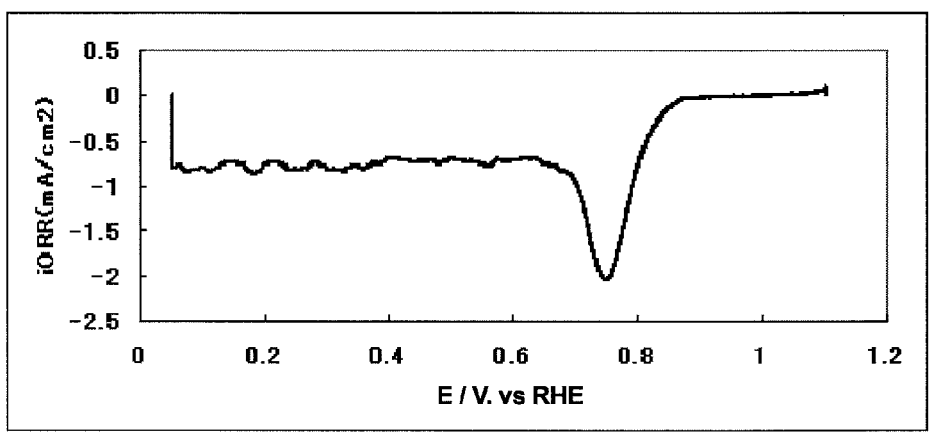
FIG. 14 is an oxygen reduction current density-potential curve of a fuel cell electrode (7) of Example 7.

The measurement result is shown in FIG. 14. The catalyst (7) had an oxygen reduction onset potential of 1.00 V (vs. RHE) and an oxygen reduction current density of 0.768 mA/cm² at 0.80 V.

Example 8

1. Production of Catalyst

In a beaker, 58 ml of acetic acid was put; and while stirring this, 8.578 g (17.59 mmol) of zirconium(IV) acetylacetonate was added to prepare a zirconium solution.

The same operation as in Example 2 was carried out, except that this zirconium solution was used instead of the niobium solution, to obtain 344 mg of a powdery catalyst (8). The weight of the powder for burning obtained in this process was 11.8 g.

Figure 15:
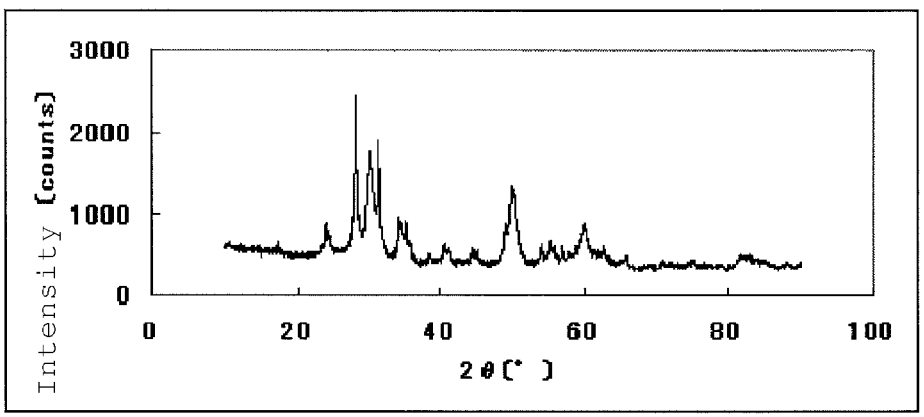
FIG. 15 is a powder X-ray diffraction spectrum of a catalyst (8) of Example 8.

The powder X-ray diffraction spectrum of the catalyst (8) is shown in FIG. 15.

The rate of each element constituting the catalyst (8) (proportion of the number of atoms) was Zr:Fe:C:N:O:S:F=1: 0.08:5.70:0.37:2.65:0.005:0.154.

Further, the BET specific surface area of the catalyst (8) was 163.4 m²/g.

2. Production of Fuel Cell Electrode and Evaluation of Oxygen Reducing Ability A fuel cell electrode (8) was produced and the oxygen reducing ability thereof was evaluated by the same method as in Example 1 except that 0.095 g of the catalyst (8) was used instead of 0.095 g of the catalyst (1).

Figure 16:
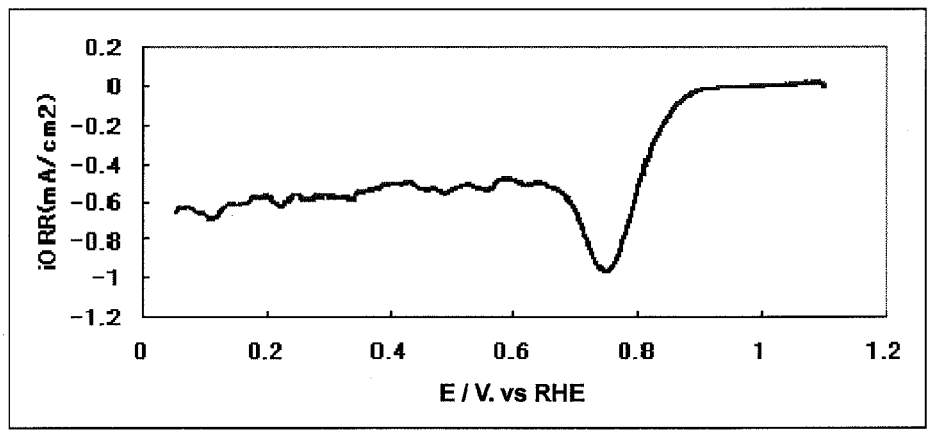
FIG. 16 is an oxygen reduction current density-potential curve of a fuel cell electrode (8) of Example 8.

The measurement result is shown in FIG. 16. The catalyst (8) had an oxygen reduction onset potential of 1.02 V (vs. RHE) and an oxygen reduction current density of 0.516 mA/cm² at 0.80 V.

Example 9

1. Production of Catalyst

The same operation as in Example 4 was carried out, except that 7.94 g (17.59 mmol) of zirconium butoxide was used instead of niobium ethoxide, to obtain 332 mg of a powdery catalyst (9). The weight of the powder for burning obtained in this process was 12.1 g.

Figure 17:
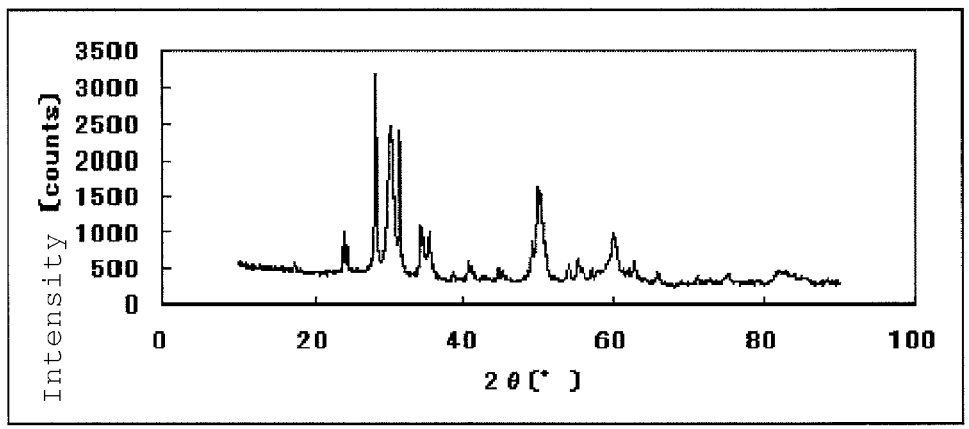
FIG. 17 is a powder X-ray diffraction spectrum of a catalyst (9) of Example 9.

The powder X-ray diffraction spectrum of the catalyst (9) is shown in FIG. 17.

The rate of each element constituting the catalyst (9) (proportion of the number of atoms) was Zr:C:N:O:S:F=1:5.82: 0.42:2.82:0.001:0.09.

Further, the BET specific surface area of the catalyst (9) was 216.2 m²/g.

2. Production of Fuel Cell Electrode and Evaluation of Oxygen Reducing Ability A fuel cell electrode (9) was produced and the oxygen reducing ability thereof was evaluated by the same method as in Example 1 except that 0.095 g of the catalyst (9) was used instead of 0.095 g of the catalyst (1).

Figure 18:
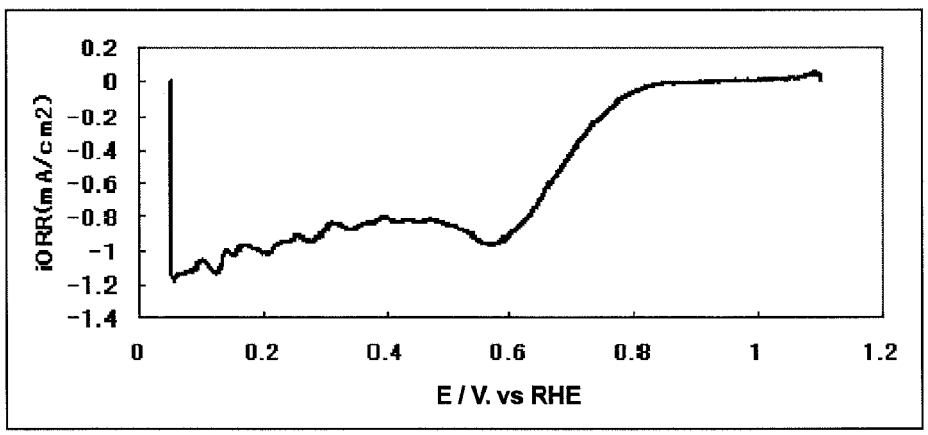
FIG. 18 is an oxygen reduction current density-potential curve of a fuel cell electrode (9) of Example 9.

The measurement result is shown in FIG. 18. The catalyst (9) had an oxygen reduction onset potential of 0.94 V (vs. RHE) and an oxygen reduction current density of 0.065 mA/cm² at 0.80 V.

Example 10

1. Production of Catalyst

In a beaker, 1.82 g (18.14 mmol) of acetylacetone was put; while stirring this, 5.00 g (12.31 mmol) of tantalum ethoxide was added; and 6 ml (105.00 mmol) of acetic acid was further dropwise added over 2 minutes to prepare a tantalum solution.

In a beaker, 60 ml of water, 50 ml of ethanol, and 60 ml of acetic acid were put; and 6.109 g (49.2 mmol) of pyrazinecarboxylic acid was added thereto and completely dissolved. To the resultant solution, 7 ml of a 5% NAFION (registered trademark) solution (DE521, DuPont) was added, and 203 mg (1.17 mmol) of iron acetate was added little by little and dissolved while stirring. Then, with the temperature kept at room temperature and stirring, the tantalum solution was dropwise added over 10 minutes; and the dropwise addition was followed by stirring for 30 minutes.

The solvent was completely removed with an evaporator from the resultant solution, and the solid residue was crushed with an automatic mortar to obtain 10.8 g of a powder (10) for burning.

In a rotary kiln furnace, 1.2 g of the powder (10) for burning was heated to 890° C. under flowing at a rate of 20 ml/min of a nitrogen gas containing 4% by volume of a hydrogen gas at a temperature-raising rate of 10° C./min, was burnt at 890° C. for 0.5 hour, and was subjected to natural cooling to obtain 326 mg of a powdery catalyst (10).

Figure 19:
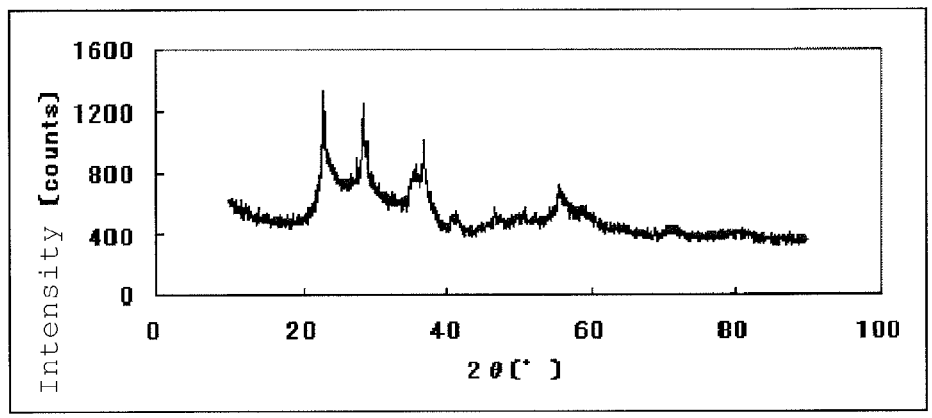
FIG. 19 is a powder X-ray diffraction spectrum of a catalyst (10) of Example 10.

The powder X-ray diffraction spectrum of the catalyst (10) is shown in FIG. 19.

The rate of each element constituting the catalyst (10) (proportion of the number of atoms) was Ta:Fe:C:N:O:S:F=1: 0.09:3.43:0.42:2.56:0.013:0.03.

Further, the BET specific surface area of the catalyst (10) was 20.3 m²/g.

2. Production of Fuel Cell Electrode and Evaluation of Oxygen Reducing Ability A fuel cell electrode (10) was produced and the oxygen reducing ability thereof was evaluated by the same method as in Example 1 except that 0.095 g of the catalyst (10) was used instead of 0.095 g of the catalyst (1).

Figure 20:
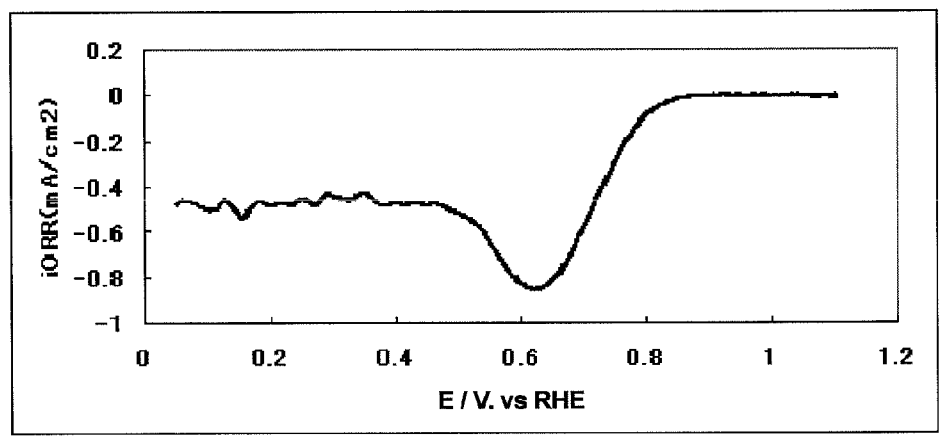
FIG. 20 is an oxygen reduction current density-potential curve of a fuel cell electrode (10) of Example 10.

The measurement result is shown in FIG. 20. The catalyst (10) had an oxygen reduction onset potential of 0.92 V (vs. RHE) and an oxygen reduction current density of 0.087 mA/cm² at 0.80 V.

Example 11

1. Production of Catalyst

The same operation as in Example 10 was carried out, except that the amount of the 5% NAFION (registered trademark) solution was changed from 7 ml to 10 ml and iron acetate was not used, to obtain 383 mg of a powdery catalyst (11). The weight of the powder for burning obtained in this process was 10.8 g.

Figure 21:
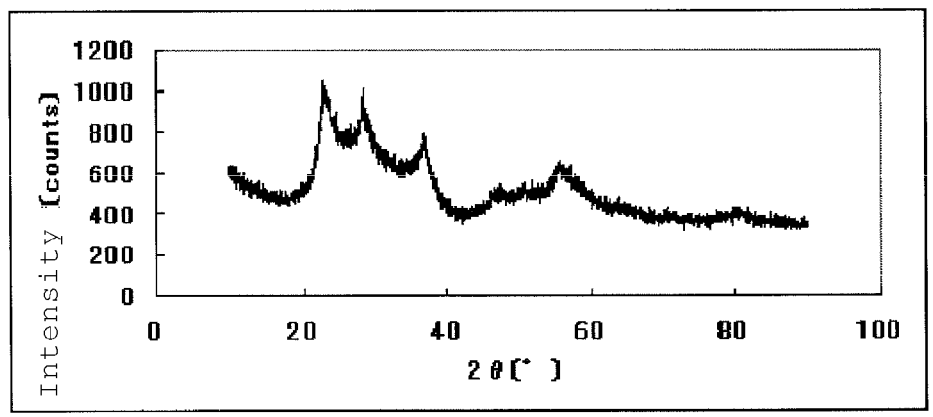
FIG. 21 is a powder X-ray diffraction spectrum of a catalyst (11) of Example 11.

The powder X-ray diffraction spectrum of the catalyst (11) is shown in FIG. 21.

The rate of each element constituting the catalyst (11) (proportion of the number of atoms) was Ta:C:N:O:S:F=1: 3.30:0.38:2.42:0.009:0.03.

Further, the BET specific surface area of the catalyst (11) was 1.1 m$^2$/g.

2. Production of Fuel Cell Electrode and Evaluation of Oxygen Reducing Ability

A fuel cell electrode (11) was produced and the oxygen reducing ability was evaluated by the same method as in Example 1 except that 0.095 g of the catalyst (11) was used instead of 0.095 g of the catalyst (1).

Figure 22:
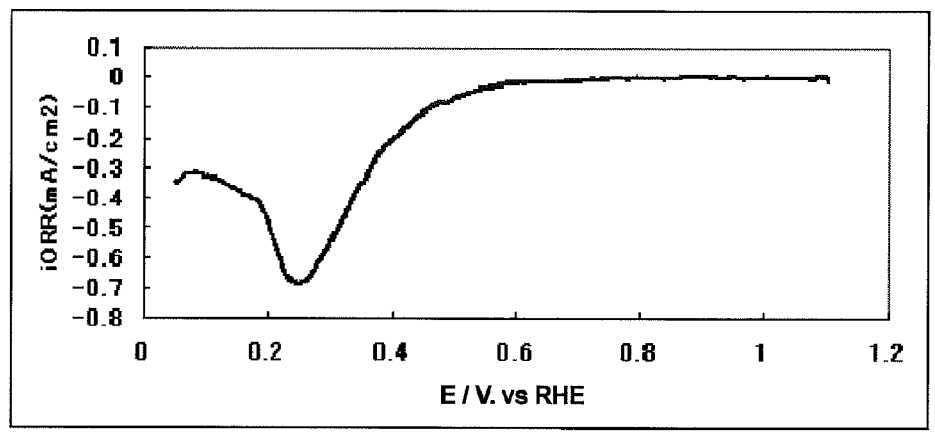
FIG. 22 is an oxygen reduction current density-potential curve of a fuel cell electrode (11) of Example 11.

The measurement result is shown in FIG. 22. The catalyst (11) had an oxygen reduction onset potential of 0.87 V (vs. RHE) and an oxygen reduction current density of 0.006 mA/cm$^2$ at 0.80 V.

Example 12

1. Production of Catalyst

The same operation as in Example 1 was carried out, except that 5 ml (17.59 mmol) of titanium tetraisopropoxide was used instead of niobium ethoxide and 368 mg (1.76 mmol) of tetrafluoroboric acid was used instead of tetraethylammonium tetrafluoroborate, to obtain 230 mg of a powdery catalyst (12). The weight of the powder for burning obtained in this process was 11.1 g.

Figure 23:
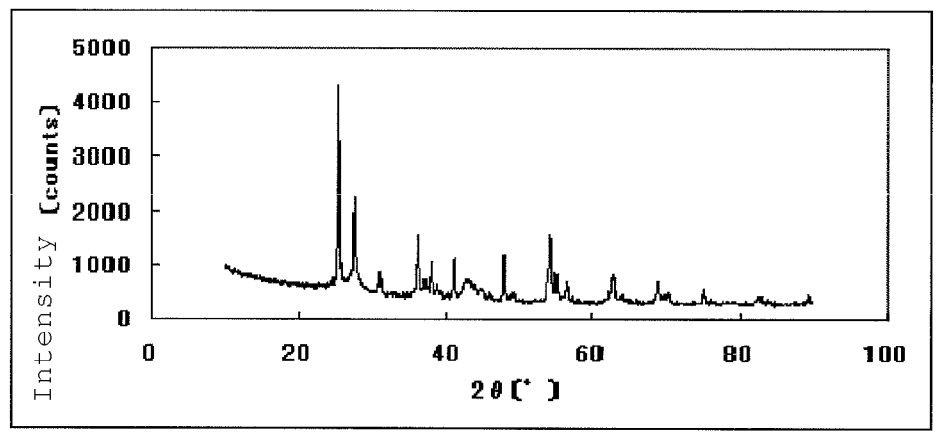
FIG. 23 is a powder X-ray diffraction spectrum of a catalyst (12) of Example 12.

The powder X-ray diffraction spectrum of the catalyst (12) is shown in FIG. 23.

The rate of each element constituting the catalyst (12) (proportion of the number of atoms) was Ti:Fe:C:N:O:B:F=1: 0.08:2.85:0.30:2.30:0.032:0.005.

Further, the BET specific surface area of the catalyst (12) was 293.1 m$^2$/g.

2. Production of Fuel Cell Electrode and Evaluation of Oxygen Reducing Ability

A fuel cell electrode (12) was produced and the oxygen reducing ability thereof was evaluated by the same method as in Example 1 except that 0.095 g of the catalyst (12) was used instead of 0.095 g of the catalyst (1).

Figure 24:
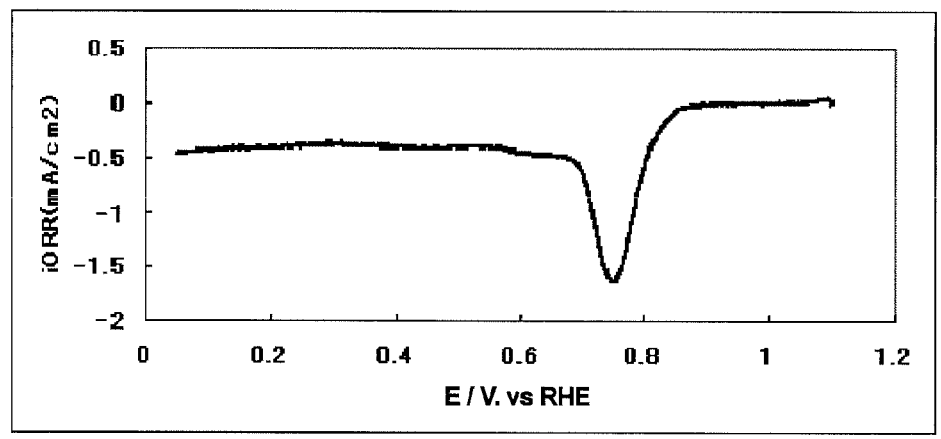
FIG. 24 is an oxygen reduction current density-potential curve of a fuel cell electrode (12) of Example 12.

The measurement result is shown in FIG. 24. The catalyst (12) had an oxygen reduction onset potential of 0.92V (vs. RHE) and an oxygen reduction current density of 0.550 mA/cm$^2$ at 0.80 V.

Example 13

1. Production of Catalyst

The same operation as in Example 12 was carried out, except that 287 mg (1.76 mmol) of ammonium tetrafluorophosphate was used instead of tetrafluoroboric acid, to obtain 224 mg of a powdery catalyst (13). The weight of the powder for burning obtained in this process was 11.0 g.

Figure 25:
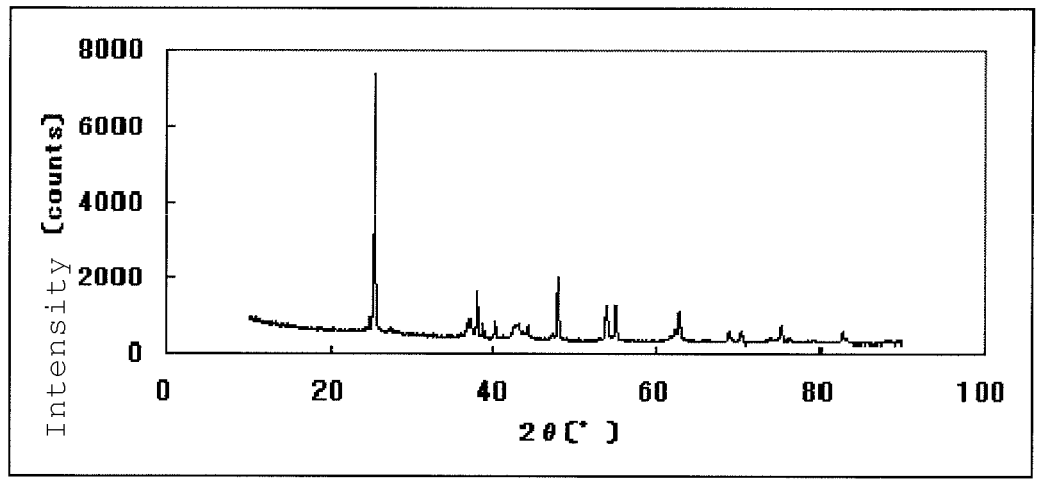
FIG. 25 is a powder X-ray diffraction spectrum of a catalyst (13) of Example 13.

The powder X-ray diffraction spectrum of the catalyst (13) is shown in FIG. 25.

The rate of each element constituting the catalyst (13) (proportion of the number of atoms) was Ti:Fe:C:N:O:P:F=1: 0.10:2.37:0.31:2.10:0.10:0.007.

Further, the BET specific surface area of the catalyst (13) was 240.9 m$^2$/g.

2. Production of Fuel Cell Electrode and Evaluation of Oxygen Reducing Ability

A fuel cell electrode (13) was produced and the oxygen reducing ability thereof was evaluated by the same method as in Example 1 except that 0.095 g of the catalyst (13) was used instead of 0.095 g of the catalyst (1).

Figure 26:
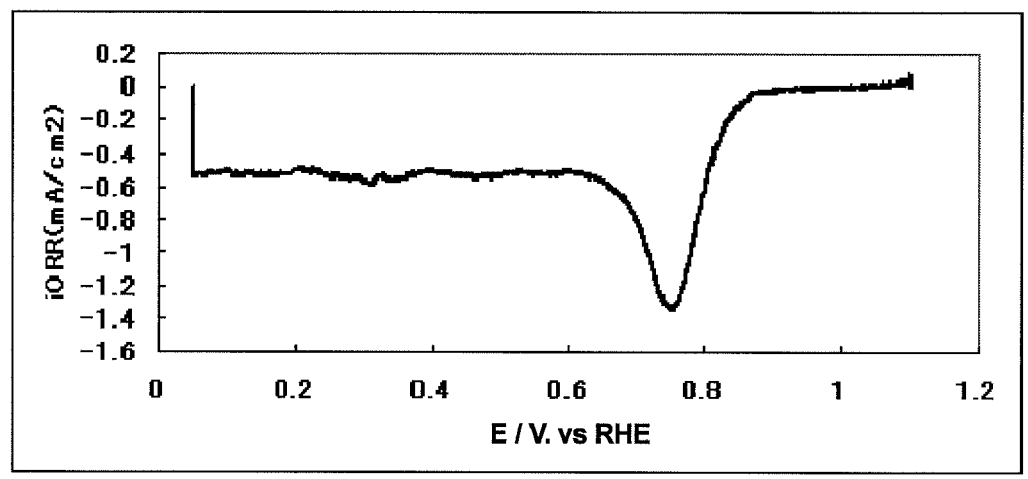
FIG. 26 is an oxygen reduction current density-potential curve of a fuel cell electrode (13) of Example 13.

The measurement result is shown in FIG. 26. The catalyst (13) had an oxygen reduction onset potential of 0.97 V (vs. RHE) and an oxygen reduction current density of 0.580 mA/cm$^2$ at 0.80 V.

3. Production of Fuel Cell Membrane Electrode Assembly and Evaluation of Power Generation Property (1) Preparation of Ink To 50 ml of 2-propanol (manufactured by Wako Pure Chemical Industries, Ltd.), 0.237 g of the catalyst (13) prepared as described above and 0.1183 g of carbon black (Ketjen black EC300J, manufactured by LION Corporation) as an electronically conductive material were added, 2.84 g of an aqueous solution containing 0.142 g of a proton conductive material (NAFION (registered trademark)) (5% NAFION (registered trademark) aqueous solution, manufactured by Wako Pure Chemical Industries, Ltd.) was further put, and the resultant was mixed with an ultrasonic wave dispersion machine (UT-106H type, manufactured by Sharp Manufacturing Systems Corporation) for 1 hour to prepare a cathode ink (1).

(2) Production of Electrode Having Fuel Cell Catalyst Layer

A gas diffusion layer (carbon paper (TGP-H-060, manufactured by Toray Industries, Inc.) was immersed in acetone for 30 seconds and degreased, thereafter dried, and then immersed in an aqueous 10% PTFE solution for 30 seconds.

The immersed product was dried at room temperature, and was heated at 350° C. for 1 hour, to provide a water-repellent gas diffusion layer having PTFE dispersed in the carbon paper (hereinafter also referred to as "GDL").

The above GDL was formed into the size of 5 cm×5 cm, and the surface thereof was coated with the above cathode ink (1) using an automatic spray-coating apparatus (manufactured by San-Ei Tech Ltd.) at 80° C. By repeating the spray-coating, an electrode having on the GDL surface a cathode catalyst layer (1), in which the total amount of the fuel cell catalyst (13) and the carbon black per unit area was 5 mg/cm$^2$ (hereinafter also referred to as "cathode (1)") was prepared. Further, the mass of the fuel cell catalyst (13) in the cathode catalyst layer (1) per unit area was 3.3 mg/cm$^2$.

(3) Production of Fuel Cell Membrane Electrode Assembly

As an electrolyte membrane, a cathode, and an anode, NAFION (registered trademark) membrane (N-117, manufactured by DuPont), the cathode (1), and the electrode having the anode catalyst layer (1) on the GDL surface, prepared in Anode Preparation Example 1 (hereinafter also referred to as "anode (1)") were prepared, respectively.

A fuel cell membrane electrode assembly (hereinafter also referred to as "MEA") in which the electrolyte membrane was interposed between the cathode and the anode was prepared in such a manner as described below.

First, the electrolyte membrane was heated in 3% hydrogen peroxide water at 80° C. for 1 hour and then heated in pure water at 80° C. for 1 hour. Subsequently, the electrolyte membrane was heated in a 1 M aqueous sulfuric acid solution at 80° C. for 1 hour and then heated in pure water at 80° C. for 1 hour.

The electrolyte membrane from which water was removed in such a manner was held by the cathode (1) and the anode (1); and these were thermally contact bonded with a hot pressing machine at a temperature of 140° C. and at a pressure of 3 MPa for 6 minutes, to thereby prepare MEA (13) (FIG. 27) so that the cathode catalyst layer (1) and the anode catalyst layer (1) would adhere to the electrolyte membrane.

(4) Preparation of Single Cell

As illustrated in FIG. 27, the MEA (13) prepared in the above 4 was held by two sealing materials (gaskets), two separators each having a gas flow passage, two collectors and two rubber heaters, and fixed and secured with a bolt such that the pressure of contacted surface would be a prescribed value (4 N), to thereby prepare a single cell (hereinafter also referred to as "single cell (13)") (cell area: 25 cm$^2$) of a polymer electrolyte fuel cell.

(5) Evaluation of Power Generation Property (Measurement of Catalytic Performance)

The temperature of the single cell (13), the temperature of an anode humidifier, and the temperature of a cathode humidifier were set to 90° C., 95° C. and 65° C., respectively. To the anode side, hydrogen was supplied as a fuel at a flow rate of 1 L/min, and to the cathode side, oxygen was supplied as an oxidizing agent at a flow rate of 2 L/min; and while applying a back pressure of 300 kPa to both sides, the current-voltage property of the single cell (13) was measured.

Figure 28:
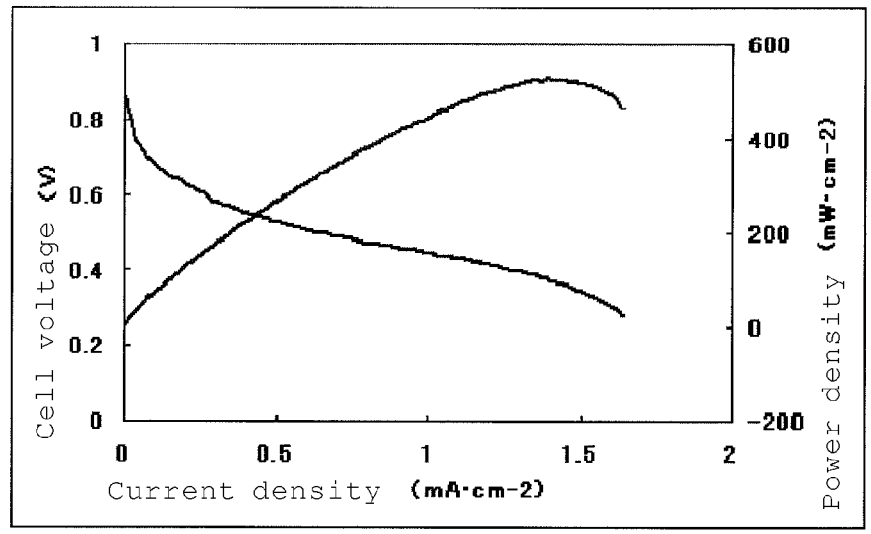
FIG. 28 is a voltage-current density curve in a single cell (13) made in Example 13.

The measurement result is shown in FIG. 28. From the current-voltage property curve obtained, a maximum power density was calculated. The higher the maximum power density is, the higher the catalytic performance in the MEA is. The catalytic performance, i.e., the maximum power density, in the MEA (13) was 559 mW/cm$^2$.

Example 14

1. Production of Catalyst

The same operation as in Example 1 was carried out, except that 5 ml (17.59 mmol) of titanium tetraisopropoxide was used instead of niobium ethoxide, the amount of tetraethylammonium tetrafluoroborate was changed to 368 mg (1.76 mmol), and burning time was changed to 0.25 hour, to obtain 205.5 mg of a powdery catalyst (14). The weight of the powder for burning obtained in this process was 11.4 g.

Figure 29:
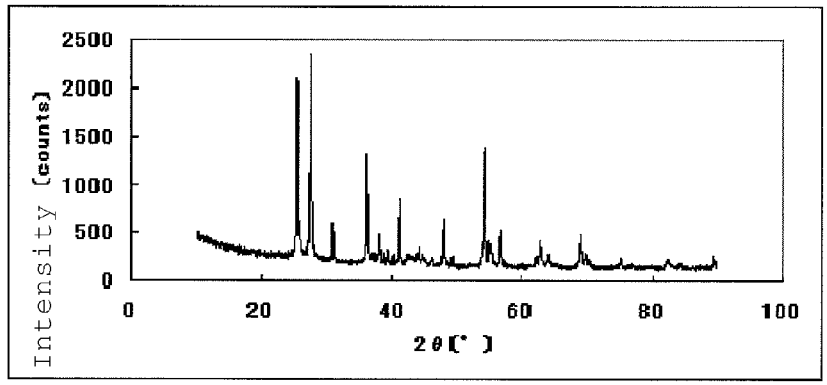
FIG. 29 is a powder X-ray diffraction spectrum of a catalyst (14) of Example 14.

The powder X-ray diffraction spectrum of the catalyst (14) is shown in FIG. 29.

The rate of each element constituting the catalyst (14) (proportion of the number of atoms) was Ti:Fe:C:N:O:B:F=1: 0.08:1.84:0.12:1.54:0.03:0.002.

Further, the BET specific surface area of the catalyst (14) was 264.3 m$^2$/g.

2. Production of Fuel Cell Electrode and Evaluation of Oxygen Reducing Ability

A fuel cell electrode (14) was produced and the oxygen reducing ability thereof was evaluated by the same method as in Example 1 except that 0.095 g of the catalyst (14) was used instead of 0.095 g of the catalyst (1).

Figure 30:
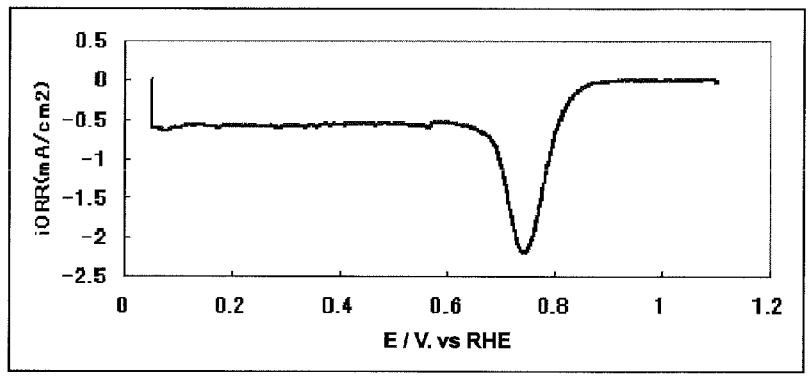
FIG. 30 is an oxygen reduction current density-potential curve of a fuel cell electrode (14) of Example 14.

The measurement result is shown in FIG. 30. The catalyst (14) had an oxygen reduction onset potential of 0.93 V (vs. RHE) and an oxygen reduction current density of 0.654 mA/cm$^2$ at 0.80 V.

3. Production of Fuel Cell Membrane Electrode Assembly and Evaluation of Power Generation Property A fuel cell membrane electrode assembly (hereinafter also referred to as "MEA (14)") was prepared by the same method as in Example 13 except that the catalyst (14) was used instead of the catalyst (13), and a single cell of a polymer electrolyte fuel cell (hereinafter also referred to as "single cell (14)") was prepared by the same method as in Example 13 except that the MEA (14) was used instead of the MEA (13).

The power generation property of the single cell (14) was evaluated by the same method as in Example 13.

Figure 31:
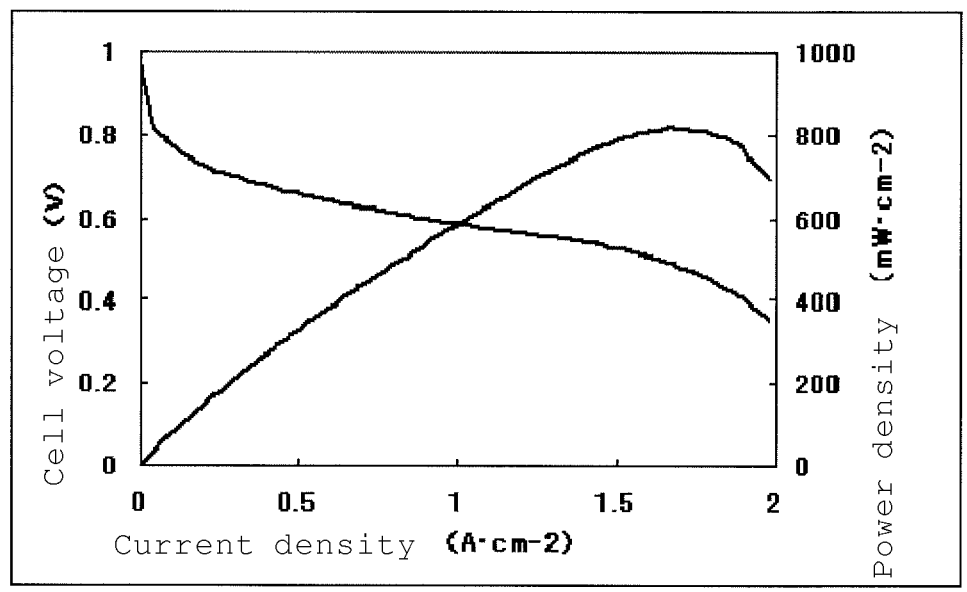
FIG. 31 is a voltage-current density curve in a single cell (14) made in Example 14.

The measurement result is shown in FIG. 31. The catalytic performance, i.e., the maximum power density, in the MEA (14) was 822 mW/cm$^2$.

Example 15

1. Production of Catalyst

The same operation as in Example 12 was carried out, except that the amount of dropwise added acetic acid in preparation of a titanium solution was changed from 8 ml to 28 ml and 10 ml of a 5% NAFION (registered trademark) solution (DE521, DuPont) was used instead of tetrafluoroboric acid, to obtain 208 mg of a powdery catalyst (15). The weight of the powder (15) for burning obtained in this process was 11.7 g.

Figure 32:
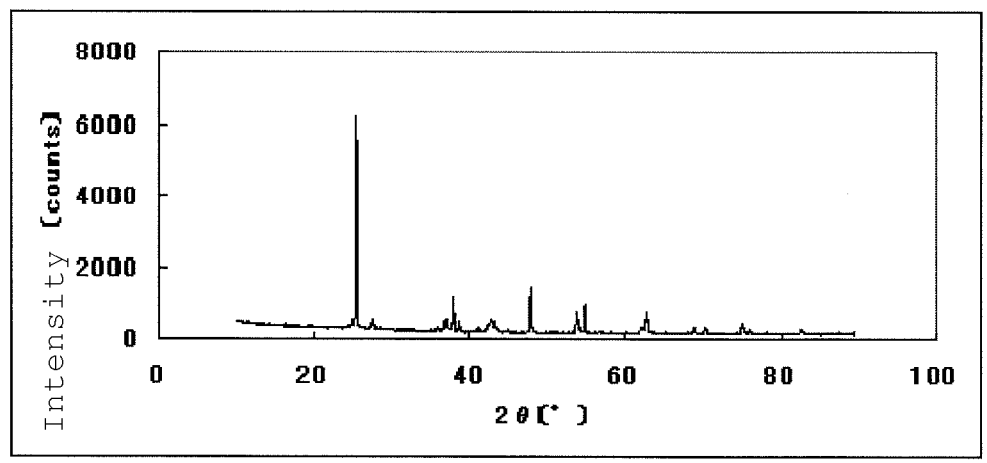
FIG. 32 is a powder X-ray diffraction spectrum of a catalyst (15) of Example 15.

The powder X-ray diffraction spectrum of the catalyst (15) is shown in FIG. 32.

The rate of each element constituting the catalyst (15) (proportion of the number of atoms) was Ti:Fe:C:N:O:S:F=1: 0.11:3.31:0.43:1.62:0.03:0.005.

Further, the BET specific surface area of the catalyst (15) was 296.6 m$^2$/g.

2. Production of Fuel Cell Electrode and Evaluation of Oxygen Reducing Ability

A fuel cell electrode (15) was produced and the oxygen reducing ability thereof was evaluated by the same method as in Example 1 except that 0.095 g of the catalyst (15) was used instead of 0.095 g of the catalyst (1).

Figure 33:
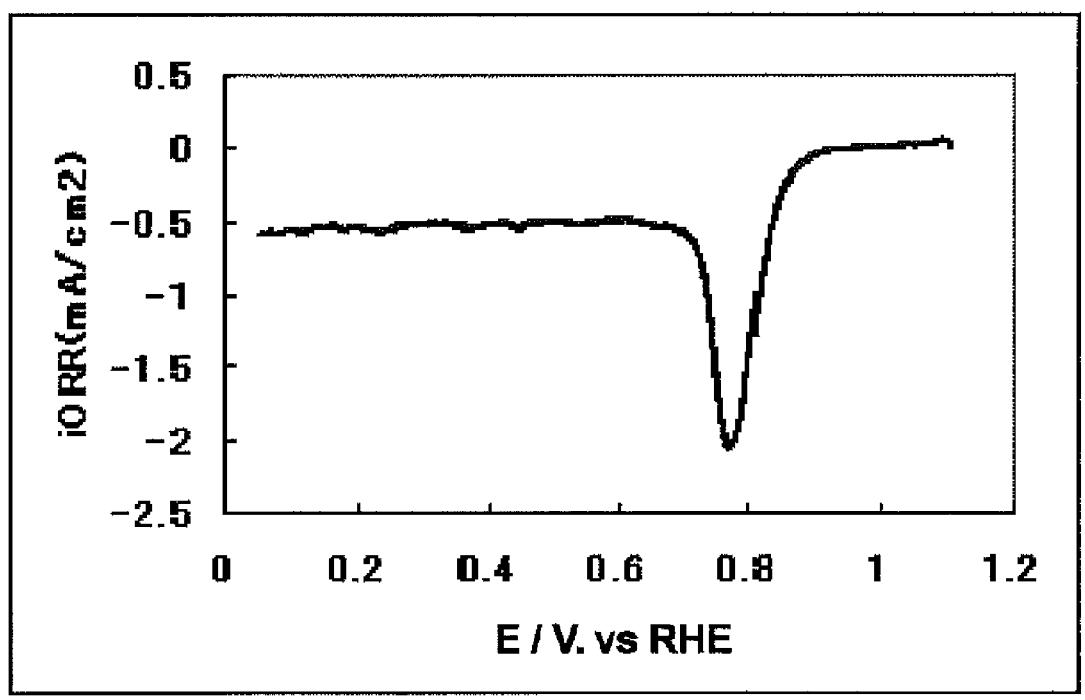
FIG. 33 is an oxygen reduction current density-potential curve of a fuel cell electrode (15) of Example 15.

The measurement result is shown in FIG. 33.

The catalyst (15) had an oxygen reduction onset potential of 0.97 V (vs. RHE) and an oxygen reduction current density of 1.300 mA/cm$^2$ at 0.80 V.

Example 16

1. Production of Catalyst

In a beaker, 5.12 g (51.08 mmol) of acetylacetone was put; and while stirring this, 10 ml (35.18 mmol) of titanium tetraisopropoxide was added to prepare a titanium solution.

In a beaker, 120 ml of water was put, and 10.043 g (140.72 mmol) of glycine was added thereto and was completely dissolved. To the resultant solution, while stirring this, 764 mg (3.52 mmol) of tetraethylammonium tetrafluoroborate was added, and 580 mg (3.34 mmol) of iron acetate was further little by little added and dissolved. Then, with the temperature kept at room temperature and stirring, the titanium solution was dropwise added over 10 minutes, and the dropwise addition was followed by stirring for 30 minutes.

The solvent was completely removed with an evaporator from the resultant solution, and the solid residue was crushed with an automatic mortar to obtain 15.3 g of a powder (16) for burning.

In a rotary kiln furnace, 1.2 g of the powder (16) for burning was heated to 890° C. under flowing at a rate of 20 ml/min of a nitrogen gas containing 4% by volume of a hydrogen gas at a temperature-raising rate of 10° C./min, was burnt at 890° C. for 0.5 hour, and was subjected to natural cooling to obtain 370 mg of a powdery catalyst (16).

Figure 34:
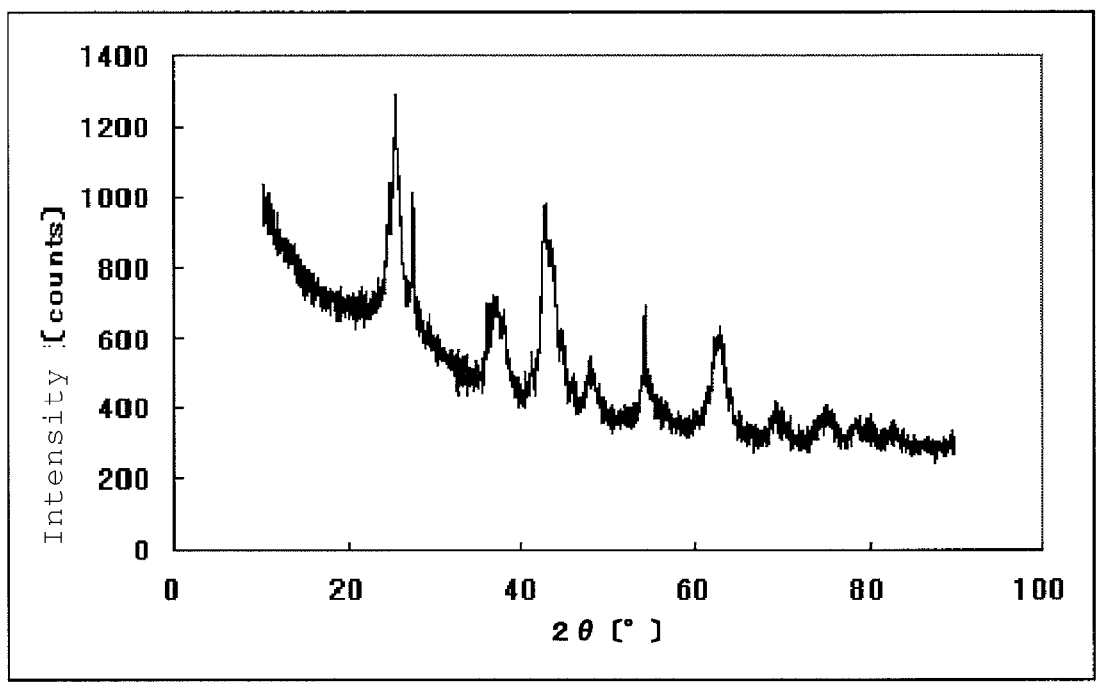
FIG. 34 is a powder X-ray diffraction spectrum of a catalyst (16) of Example 16.

The powder X-ray diffraction spectrum of the catalyst (16) is shown in FIG. 34.

The rate of each element constituting the catalyst (16) (proportion of the number of atoms) was Ti:Fe:C:N:O:B:F=1: 0.12:4.44:0.51:2.39:0.040:0.007.

Further, the BET specific surface area of the catalyst (16) was 269 m$^2$/g.

2. Production of Fuel Cell Electrode and Evaluation of Oxygen Reducing Ability

A fuel cell electrode (16) was produced and the oxygen reducing ability thereof was evaluated by the same method as in Example 1 except that 0.095 g of the catalyst (16) was used instead of 0.095 g of the catalyst (1).

Figure 35:
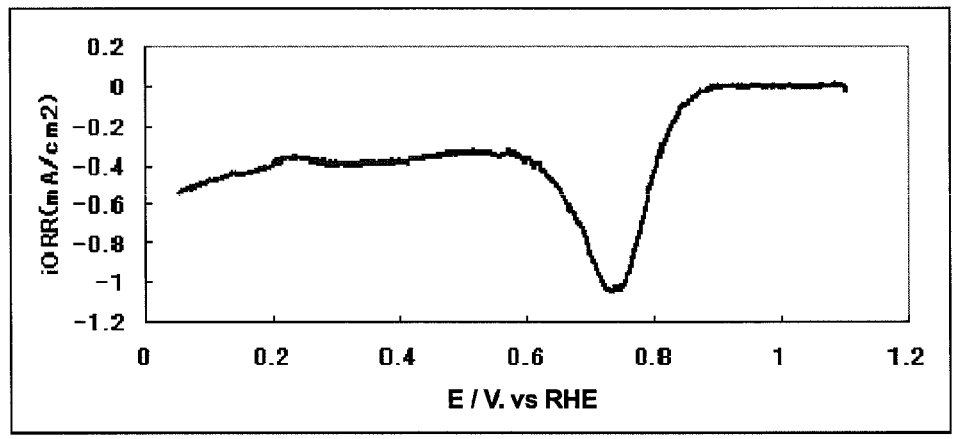
FIG. 35 is an oxygen reduction current density-potential curve of a fuel cell electrode (16) of Example 16.

The measurement result is shown in FIG. 35. The catalyst (16) had an oxygen reduction onset potential of 0.90 V (vs. RHE) and an oxygen reduction current density of 0.428 mA/cm$^2$ at 0.80 V.

Example 17

1. Production of Catalyst

In a beaker, 2.6 g (25.94 mmol) of acetylacetone was put; and while stirring this, 5 ml (17.59 mmol) of titanium isopropoxide and 0.794 g (1.759 mmol) of zirconium butoxide were added to prepare a titanium-zirconium solution.

The same operation as in Example 2 was carried out, except that this titanium-zirconium solution was used instead of the niobium solution, to obtain 203 mg of a powdery catalyst (17). The weight of the powder (17) for burning obtained in this process was 11.4.

Figure 36:
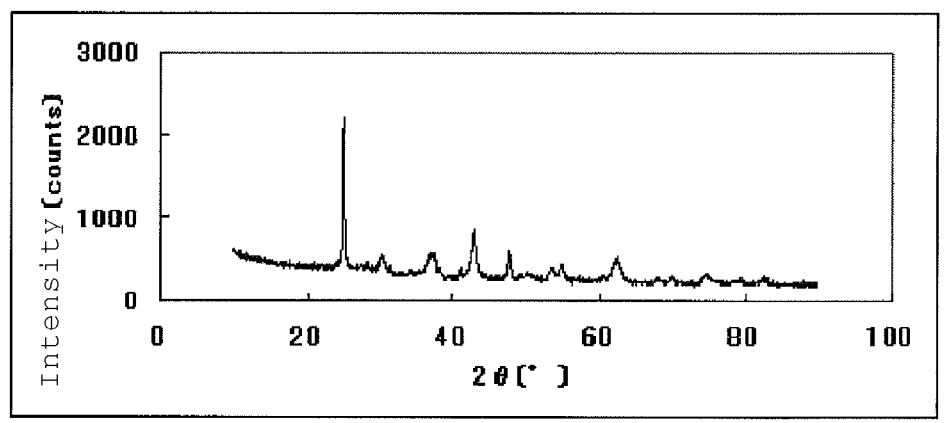
FIG. 36 is a powder X-ray diffraction spectrum of a catalyst (17) of Example 17.

The powder X-ray diffraction spectrum of the catalyst (17) is shown in FIG. 36.

The rate of each element constituting the catalyst (17) (proportion of the number of atoms) was Ti:Zr:Fe:C:N:O:S: F=1:0.08:0.10:3.16:0.38:1.44:0.009:0.003.

Further, the BET specific surface area of the catalyst (17) was 256.1 m$^2$/g.

2. Production of Fuel Cell Electrode and Evaluation of Oxygen Reducing Ability

A fuel cell electrode (17) was produced and the oxygen reducing ability thereof was evaluated by the same method as in Example 1 except that 0.095 g of the catalyst (17) was used instead of 0.095 g of the catalyst (1).

Figure 37:
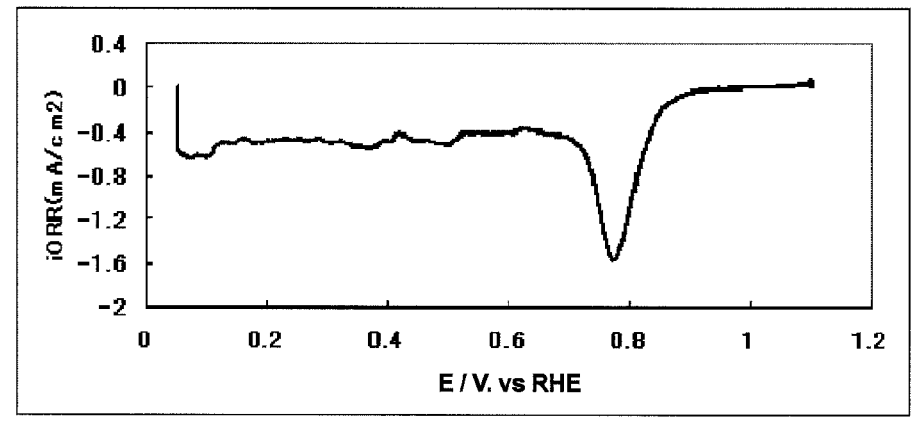
FIG. 37 is an oxygen reduction current density-potential curve of a fuel cell electrode (17) of Example 17.

The measurement result is shown in FIG. 37. The catalyst (17) had an oxygen reduction onset potential of 0.95 V (vs. RHE) and an oxygen reduction current density of 1.070 mA/cm$^2$ at 0.80 V.

Example 18

1. Production of Catalyst

The same operation as in Example 15 was carried out, except that 11.83 g (70.36 mmol) of 2,3-pyrazinedicarboxylic acid was used instead of pyrazinecarboxylic acid, to obtain 168 mg of a powdery catalyst (18). The weight of the powder for burning obtained in this process was 11.7 g.

Figure 38:
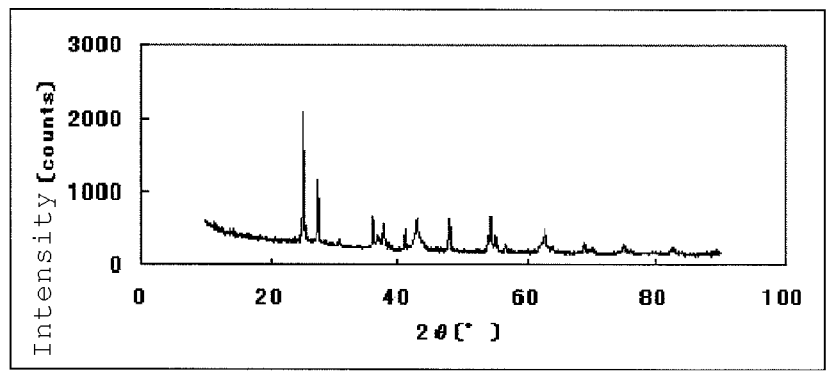
FIG. 38 is a powder X-ray diffraction spectrum of a catalyst (18) of Example 18.

The powder X-ray diffraction spectrum of the catalyst (18) is shown in FIG. 38.

The rate of each element constituting the catalyst (18) (proportion of the number of atoms) was Ti:Fe:C:N:O:S:F=1: 0.09:2.51:0.39:1.67:0.006:0.002.

Further, the BET specific surface area of the catalyst (18) was 241.9 m$^2$/g.

2. Production of Fuel Cell Electrode and Evaluation of Oxygen Reducing Ability

A fuel cell electrode (18) was produced and the oxygen reducing ability thereof was evaluated by the same method as in Example 1 except that 0.095 g of the catalyst (18) was used instead of 0.095 g of the catalyst (1).

Figure 39:
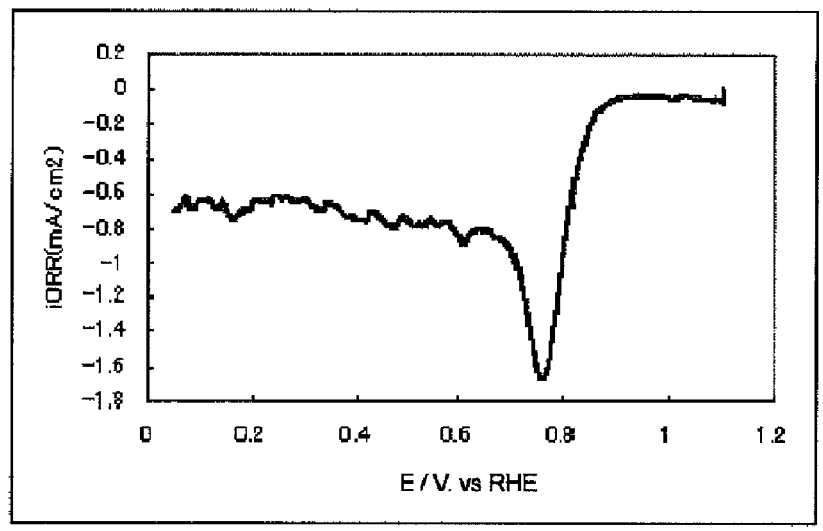
FIG. 39 is an oxygen reduction current density-potential curve of a fuel cell electrode (18) of Example 18.

The measurement result is shown in FIG. 39. The catalyst (18) had an oxygen reduction onset potential of 0.95 V (vs. RHE) and an oxygen reduction current density of 0.88 mA/cm$^2$ at 0.80 V.

Example 19

1. Production of Catalyst

The same operation as in Example 15 was carried out, except that 9.788 g (70.36 mmol) of 3-aminopyrazine-2-carboxylic acid was used instead of pyrazinecarboxylic acid, to obtain 173 mg of a powdery catalyst (19). The weight of the powder for burning obtained in this process was 12.7 g.

Figure 40:
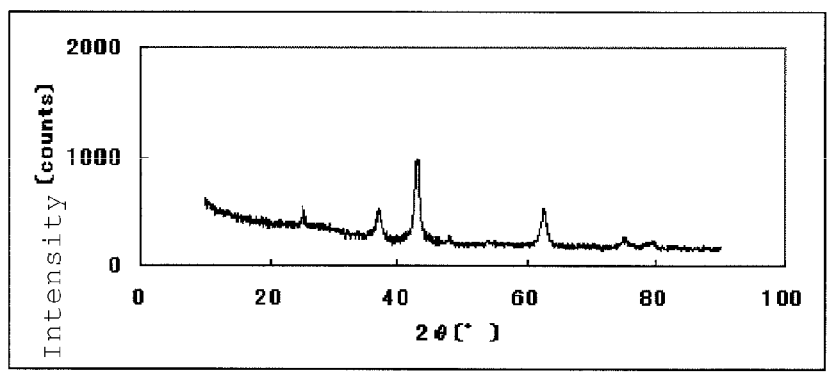
FIG. 40 is a powder X-ray diffraction spectrum of a catalyst (19) of Example 19.

The powder X-ray diffraction spectrum of the catalyst (19) is shown in FIG. 40.

The rate of each element constituting the catalyst (19) (proportion of the number of atoms) was Ti:Fe:C:N:O:S:F=1: 0.09:2.73:0.64:1.17:0.006:0.002.

Further, the BET specific surface area of the catalyst (19) was 297.4 m$^2$/g.

2. Production of Fuel Cell Electrode and Evaluation of Oxygen Reducing Ability

A fuel cell electrode (19) was produced and the oxygen reducing ability thereof was evaluated by the same method as in Example 1 except that 0.095 g of the catalyst (19) was used instead of 0.095 g of the catalyst (1).

Figure 41:
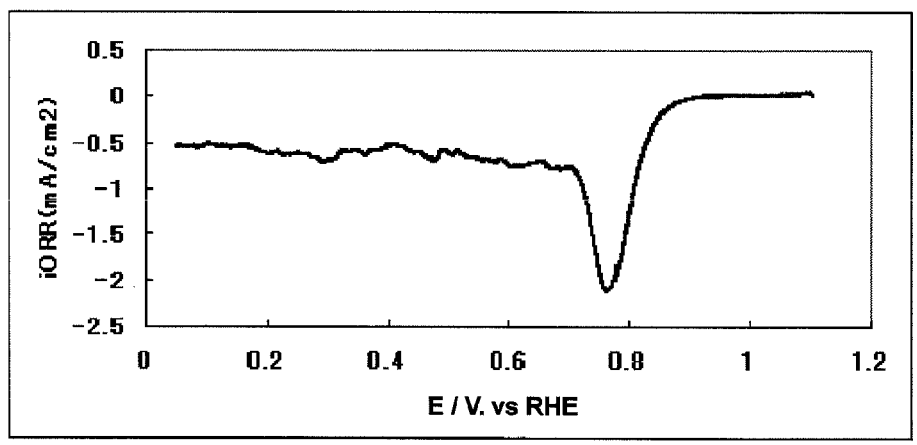
FIG. 41 is an oxygen reduction current density-potential curve of a fuel cell electrode (19) of Example 19.

The measurement result is shown in FIG. 41. The catalyst (19) had an oxygen reduction onset potential of 0.93 V (vs. RHE) and an oxygen reduction current density of 1.07 mA/cm$^2$ at 0.80 V.

Example 20

1. Production of Catalyst

In a beaker, 25 ml of methanol was put; and while stirring this, 3.78 g (20 mmol) of titanium tetrachloride, 10 ml of a 5% NAFION (registered trademark) solution (DE521, DuPont), and 694 mg (4.00 mmol) of iron acetate were added sequentially. To the resultant solution, 7.608 g (80 mmol) of 2-aminopyrimidine was added little by little, followed by stirring the mixture for 3 hours to obtain a catalyst precursor solution (20).

The catalyst precursor solution (20) was heated and stirred with a rotary evaporator in a nitrogen atmosphere under reduced pressure with the temperature of a hot stirrer set at about 100° C., and thereby the solvent was slowly evaporated, and a chloride residue and the like were removed by further heating at 300° C. for 1 hour under nitrogen gas stream to obtain 3.7 g of a powder (20) for burning.

In a rotary kiln furnace, 1.2 g of the powder (20) for burning was heated to 890° C. under the flowing at a rate of 20 mL/min of a nitrogen gas containing 4% by volume of a hydrogen gas (i.e., mixed gas of hydrogen gas:nitrogen gas=4% by volume: 96% by volume) at a temperature-raising rate of 10° C./min, was burnt at 890° C. for 0.5 hour, and was subjected to natural cooling to obtain 473 mg of a powdery catalyst (20).

Figure 42:
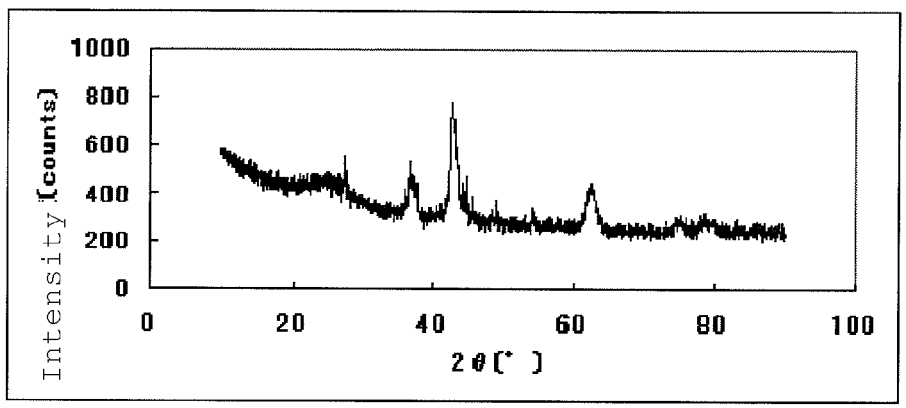
FIG. 42 is a powder X-ray diffraction spectrum of a catalyst (20) of Example 20.

The powder X-ray diffraction spectrum of the catalyst (20) is shown in FIG. 42.

The rate of each element constituting the catalyst (20) (proportion of the number of atoms) was Ti:Fe:C:N:O:S:F=1: 0.23:6.40:0.85:1.37:0.026:0.018.

Further, the BET specific surface area of the catalyst (20) was 246.5 m$^2$/g.

2. Production of Fuel Cell Electrode and Evaluation of Oxygen Reducing Ability A fuel cell electrode (20) was produced and the oxygen reducing ability thereof was evaluated by the same method as in Example 1 except that 0.095 g of the catalyst (20) was used instead of 0.095 g of the catalyst (1).

Figure 43:
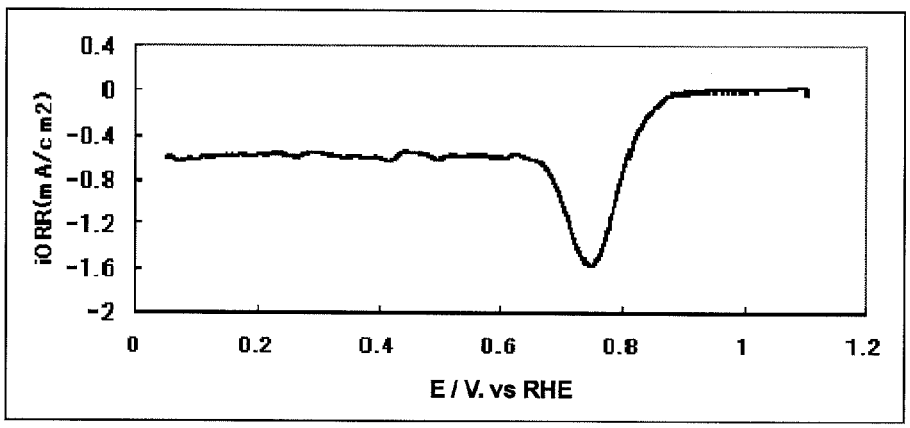
FIG. 43 is an oxygen reduction current density-potential curve of a fuel cell electrode (20) of Example 20.

The measurement result is shown in FIG. 43. The catalyst (20) had an oxygen reduction onset potential of 0.94 V (vs. RHE) and an oxygen reduction current density of 0.709 mA/cm$^2$ at 0.80 V.

Example 21

1. Production of Catalyst

In a beaker, 16 ml of acetic acid was put; and while stirring this, 4.5 ml (15.83 mmol) of titanium diisopropoxide diacetylacetonate was added to prepare a titanium solution.

The same operation as in Example 2 was carried out, except that this titanium solution was used instead of the niobium solution, to obtain 219 mg of a powdery catalyst (21). The weight of the powder for burning obtained in this process was 11.4 g.

Figure 44:
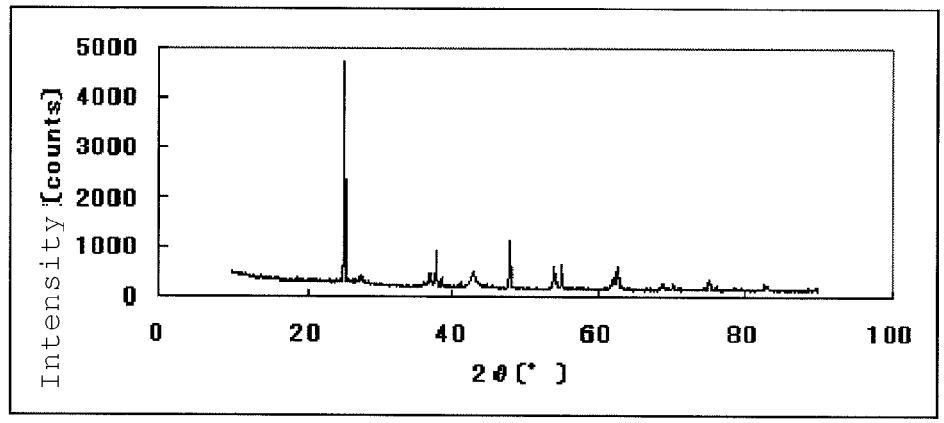
FIG. 44 is a powder X-ray diffraction spectrum of a catalyst (21) of Example 21.

The powder X-ray diffraction spectrum of the catalyst (21) is shown in FIG. 44.

The rate of each element constituting the catalyst (21) (proportion of the number of atoms) was Ti:Fe:C:N:O:S:F=1: 0.09:3.02:0.30:1.24:0.007:0.003.

Further, the BET specific surface area of the catalyst (21) was 286.1 m$^2$/g.

2. Production of Fuel Cell Electrode and Evaluation of Oxygen Reducing Ability A fuel cell electrode (21) was produced and the oxygen reducing ability thereof was evaluated by the same method as in Example 1 except that 0.095 g of the catalyst (21) was used instead of 0.095 g of the catalyst (1).

Figure 45:
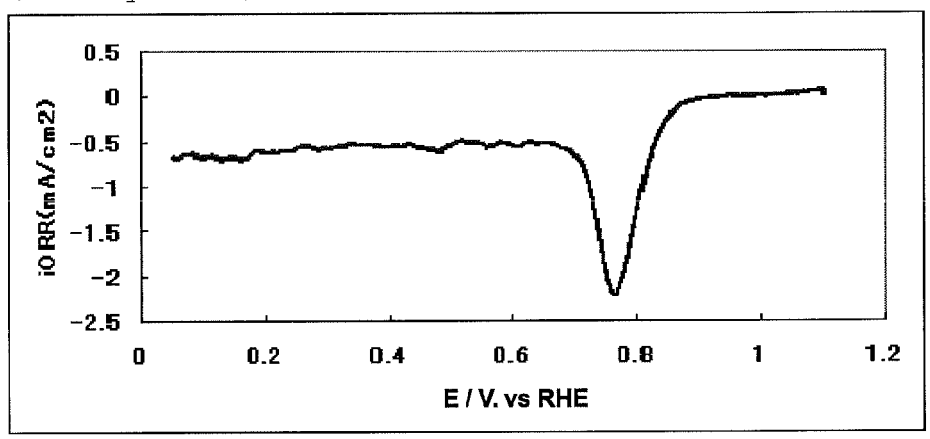
FIG. 45 is an oxygen reduction current density-potential curve of a fuel cell electrode (21) of Example 21.

The measurement result is shown in FIG. 45. The catalyst (21) had an oxygen reduction onset potential of 0.95 V (vs. RHE) and an oxygen reduction current density of 1.233 mA/cm$^2$ at 0.80 V.

Example 22

1. Production of Catalyst

The same operation as in Example 15 was carried out, except that 378 mg (1.67 mmol) of 1-butyl-3-methylimidazoliumtetrafluoroborate was used instead of a 5% NAFION (registered trademark) solution (DE521, DuPont), to obtain 220 mg of a powdery catalyst (22). The weight of the powder for burning obtained in this process was 10.8 g.

Figure 46:
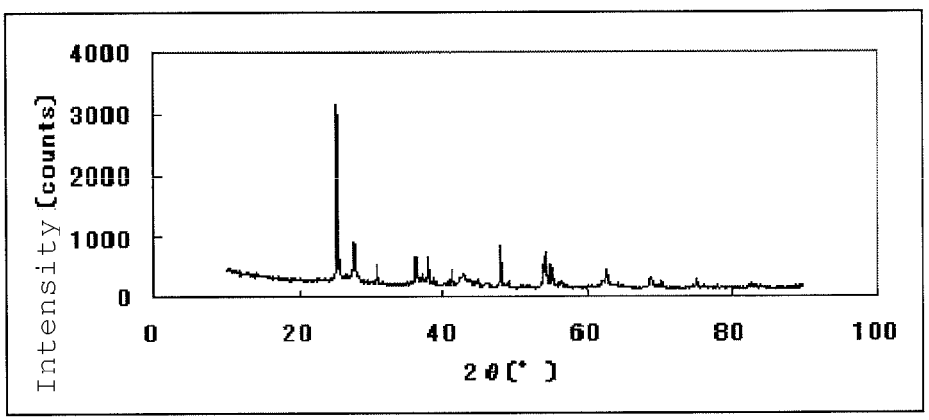
FIG. 46 is a powder X-ray diffraction spectrum of a catalyst (22) of Example 22.

The powder X-ray diffraction spectrum of the catalyst (22) is shown in FIG. 46.

The rate of each element constituting the catalyst (22) (proportion of the number of atoms) was Ti:Fe:C:N:O:B:F=1: 0.08:2.46:0.26:2.08:0.034:0.005.

Further, the BET specific surface area of the catalyst (22) was 277 m$^2$/g.

2. Production of Fuel Cell Electrode and Evaluation of Oxygen Reducing Ability A fuel cell electrode (22) was produced and the oxygen reducing ability thereof was evaluated by the same method as in Example 1 except that 0.095 g of the catalyst (22) was used instead of 0.095 g of the catalyst (1).

Figure 47:
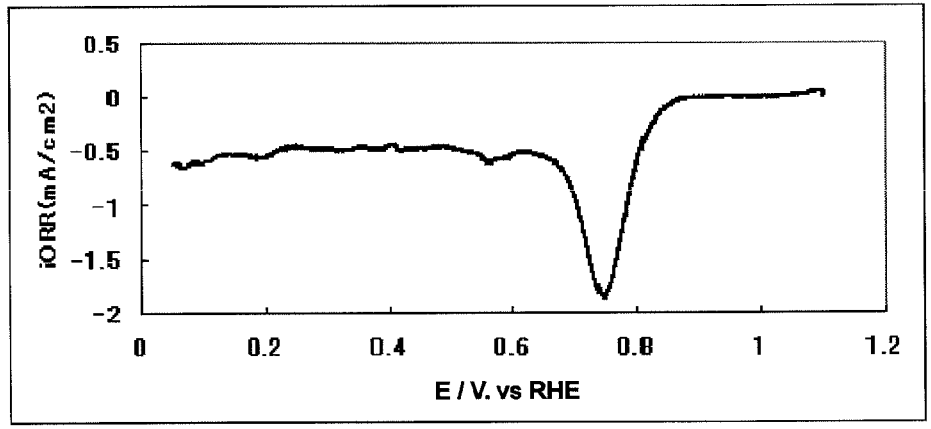
FIG. 47 is an oxygen reduction current density-potential curve of a fuel cell electrode (22) of Example 22.

The measurement result is shown in FIG. 47. The catalyst (22) had an oxygen reduction onset potential of 0.94 V (vs. RHE) and an oxygen reduction current density of 0.606 mA/cm$^2$ at 0.80 V.

Example 23

1. Production of Catalyst

The same operation as in Example 15 was carried out, except that 251 mg (1.67 mmol) of trifluoromethanesulfonic acid was used instead of a 5% NAFION (registered trademark) solution (DE521, DuPont), to obtain 205 mg of a powdery catalyst (23). The weight of the powder for burning obtained in this process was 11.7 g.

Figure 48:
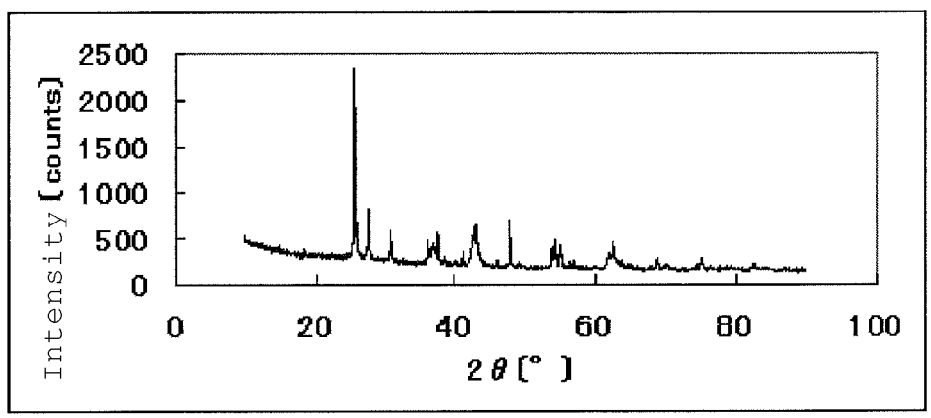
FIG. 48 is a powder X-ray diffraction spectrum of a catalyst (23) of Example 23.

The powder X-ray diffraction spectrum of the catalyst (23) is shown in FIG. 48.

The rate of each element constituting the catalyst (23) (proportion of the number of atoms) was Ti:Fe:C:N:O:S:F=1: 0.09:2.28:0.37:1.56:0.011:0.002.

Further, the BET specific surface area of the catalyst (23) was 253.3 m$^2$/g.

2. Production of Fuel Cell Electrode and Evaluation of Oxygen Reducing Ability A fuel cell electrode (23) was produced and the oxygen reducing ability thereof was evaluated by the same method as in Example 1 except that 0.095 g of the catalyst (23) was used instead of 0.095 g of the catalyst (1).

Figure 49:
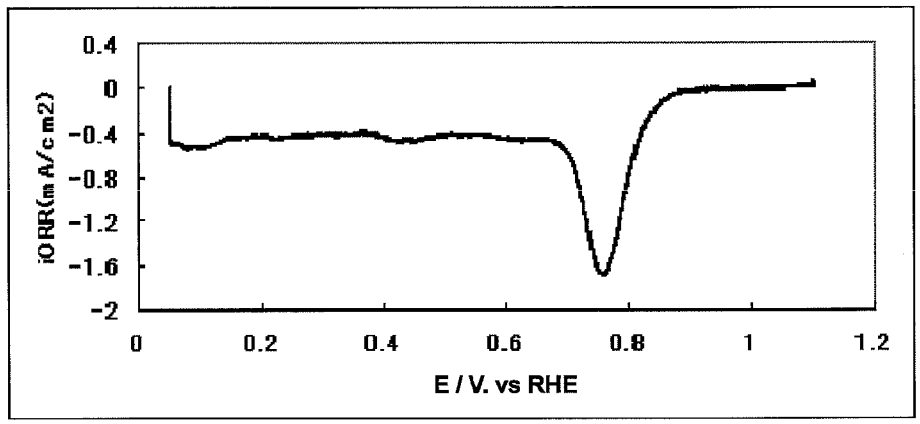
FIG. 49 is an oxygen reduction current density-potential curve of a fuel cell electrode (23) of Example 23.

The measurement result is shown in FIG. 49. The catalyst (23) had an oxygen reduction onset potential of 0.93 V (vs. RHE) and an oxygen reduction current density of 1.07 mA/cm$^2$ at 0.80 V.

Example 24

1. Production of Catalyst

In a rotary kiln furnace, 1.2 g of the powder (15) for burning was heated to 950° C. under the flowing at a rate of 20 mL/min of a nitrogen gas containing 4% by volume of a hydrogen gas at a temperature-raising rate of 10° C./min, was burnt at 950° C. for 0.5 hour, and was subjected to natural cooling to obtain 210 mg of a powdery catalyst (24).

Figure 50:
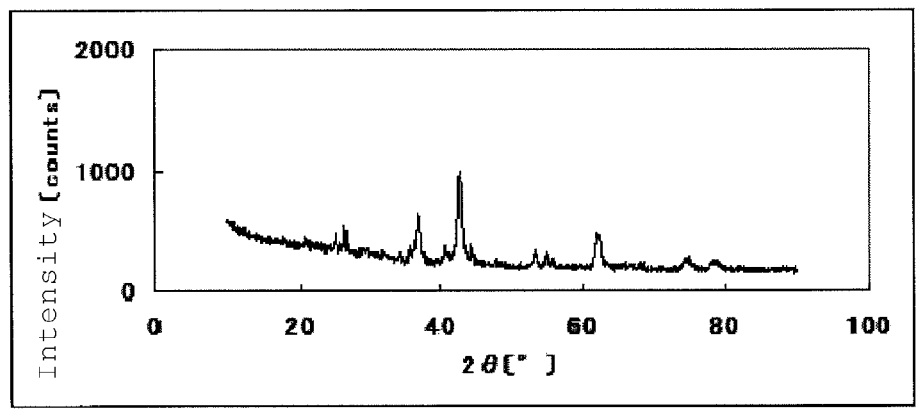
FIG. 50 is a powder X-ray diffraction spectrum of a catalyst (24) of Example 24.

The powder X-ray diffraction spectrum of the catalyst (24) is shown in FIG. 50.

The rate of each element constituting the catalyst (24) (proportion of the number of atoms) was Ti:Fe:C:N:O:S:F=1: 0.10:3.66:0.53:1.29:0.012:0.002.

Further, the BET specific surface area of the catalyst (24) was 280.9 m$^2$/g.

2. Production of Fuel Cell Electrode and Evaluation of Oxygen Reducing Ability A fuel cell electrode (24) was produced and the oxygen reducing ability thereof was evaluated by the same method as in Example 1 except that 0.095 g of the catalyst (24) was used instead of 0.095 g of the catalyst (1).

Figure 51:
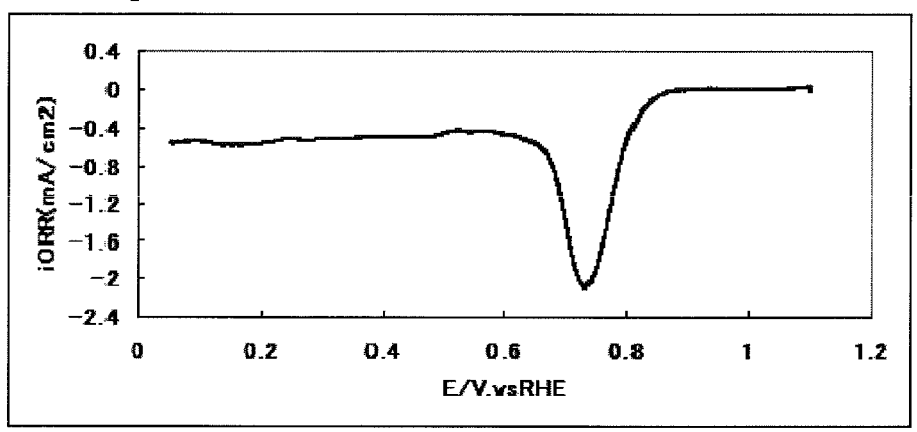
FIG. 51 is an oxygen reduction current density-potential curve of a fuel cell electrode (24) of Example 24.

The measurement result is shown in FIG. 51. The catalyst (24) had an oxygen reduction onset potential of 0.90 V (vs. RHE) and an oxygen reduction current density of 0.513 mA/cm$^2$ at 0.80 V.

Example 25

1. Production of Catalyst

In a rotary kiln furnace, 2.0 g of the powder (15) for burning was heated to 1050° C. under the flowing at a rate of 20 mL/min of a nitrogen gas containing 4% by volume of a hydrogen gas at a temperature-raising rate of 10° C./min, was burnt at 1050° C. for 0.5 hour, and was subjected to natural cooling to obtain 284 mg of a powdery catalyst (25).

Figure 52:
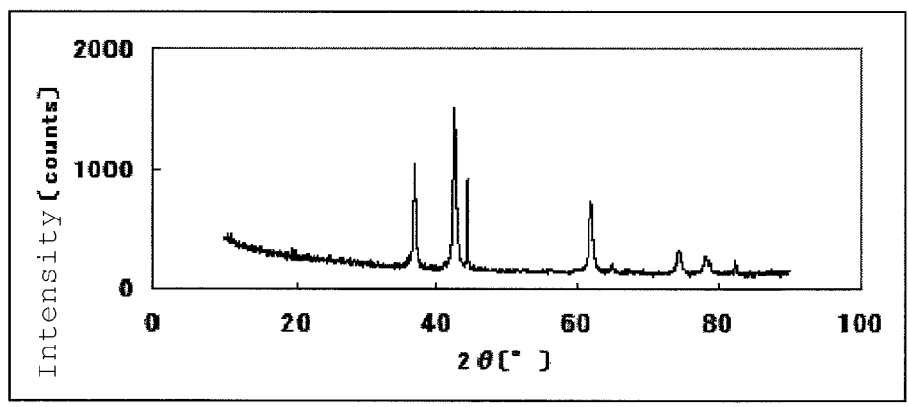
FIG. 52 is a powder X-ray diffraction spectrum of a catalyst (25) of Example 25.

The powder X-ray diffraction spectrum of the catalyst (25) is shown in FIG. 52.

The rate of each element constituting the catalyst (25) (proportion of the number of atoms) was Ti:Fe:C:N:O:S:F=1: 0.11:3.87:0.32:1.45:0.010:0.003.

Further, the BET specific surface area of the catalyst (25) was 260.0 m$^2$/g.

2. Production of Fuel Cell Electrode and Evaluation of Oxygen Reducing Ability A fuel cell electrode (25) was produced and the oxygen reducing ability thereof was evaluated by the same method as in Example 1 except that 0.095 g of the catalyst (25) was used instead of 0.095 g of the catalyst (1).

Figure 53:
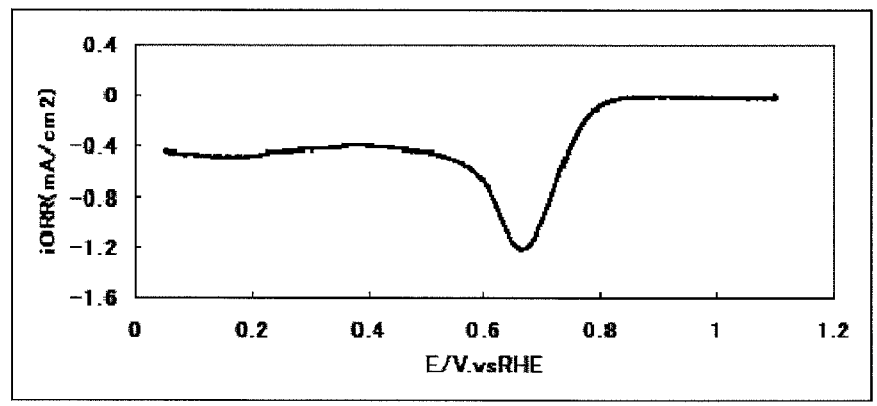
FIG. 53 is an oxygen reduction current density-potential curve of a fuel cell electrode (25) of Example 25.

The measurement result is shown in FIG. 53. The catalyst (25) had an oxygen reduction onset potential of 0.88 V (vs. RHE) and an oxygen reduction current density of 0.083 mA/cm$^2$ at 0.80 V.

Example 26

1. Production of Catalyst

The same operation as in Example 12 was carried out, except that 910 mg (1.76 mmol) of ammonium heptadecafluorooctanesulfonate was used instead of tetrafluoroboric acid, to obtain 190 mg of a powdery catalyst (26). The weight of the powder for burning obtained in this process was 11.8 g.

Figure 54:
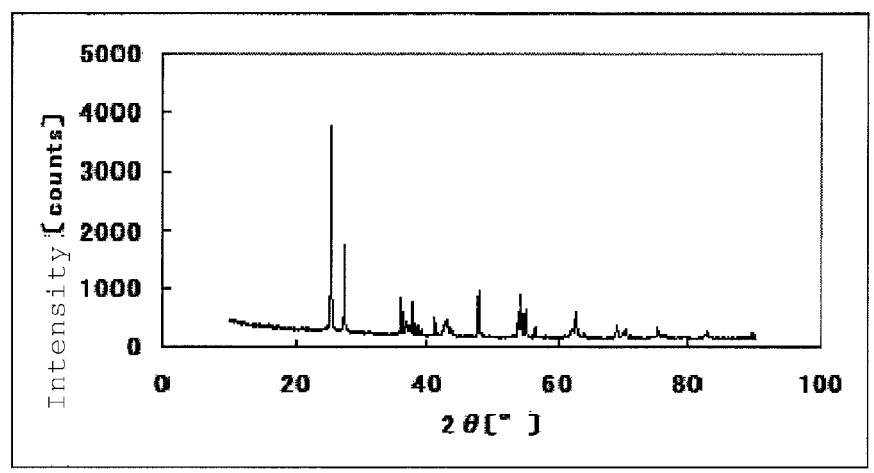
FIG. 54 is a powder X-ray diffraction spectrum of a catalyst (26) of Example 26.

The powder X-ray diffraction spectrum of the catalyst (26) is shown in FIG. 54.

The rate of each element constituting the catalyst (26) (proportion of the number of atoms) was Ti:Fe:C:N:O:S:F=1: 0.11:3.20:0.43:1.62:0.013:0.005.

Further, the BET specific surface area of the catalyst (26) was 343.7 m$^2$/g.

2. Production of Fuel Cell Electrode and Evaluation of Oxygen Reducing Ability A fuel cell electrode (26) was produced and the oxygen reducing ability was evaluated by the same method as in Example 1 except that 0.095 g of the catalyst (26) was used instead of 0.095 g of the catalyst (1).

Figure 55:
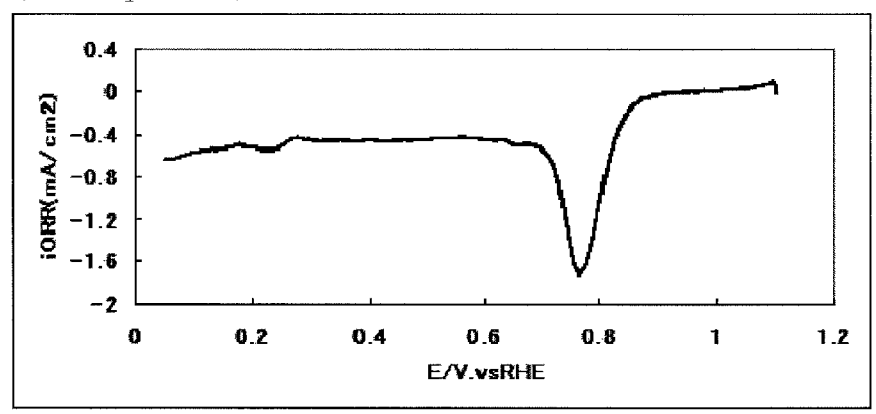
FIG. 55 is an oxygen reduction current density-potential curve of a fuel cell electrode (26) of Example 26.

The measurement result is shown in FIG. 55. The catalyst (26) had an oxygen reduction onset potential of 0.94 V (vs. RHE) and an oxygen reduction current density of 0.950 mA/cm$^2$ at 0.80 V.

Example 27

1. Production of Catalyst

The same operation as in Example 12 was carried out, except that 1762 mg (3.52 mmol) of heptadecafluorooctanesulfonic acid was used instead of tetrafluoroboric acid, to obtain 162 mg of a powdery catalyst (27). The weight of the powder for burning obtained in this process was 12.7 g.

Figure 56:
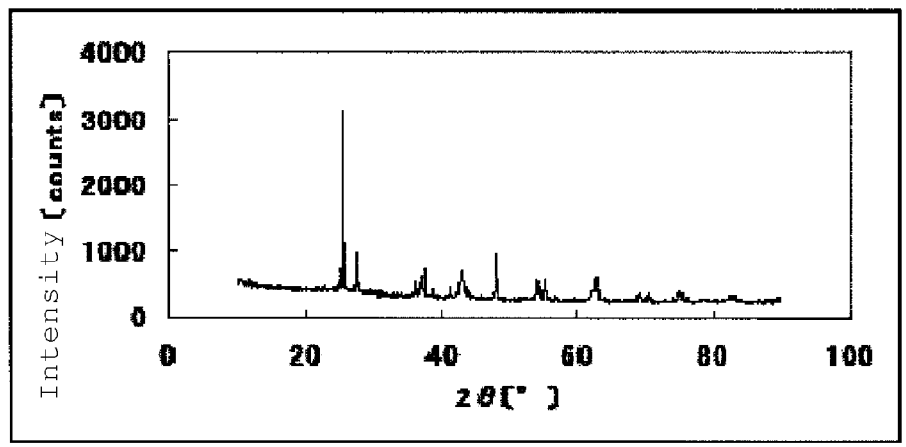
FIG. 56 is a powder X-ray diffraction spectrum of a catalyst (27) of Example 27.

The powder X-ray diffraction spectrum of the catalyst (27) is shown in FIG. 56.

The rate of each element constituting the catalyst (27) (proportion of the number of atoms) was Ti:Fe:C:N:O:S:F=1: 0.11:4.42:0.44:1.51:0.028:0.011.

Further, the BET specific surface area of the catalyst (27) was 404.5 m$^2$/g.

2. Production of Fuel Cell Electrode and Evaluation of Oxygen Reducing Ability A fuel cell electrode (27) was produced and the oxygen reducing ability thereof was evaluated by the same method as in Example 1 except that 0.095 g of the catalyst (27) was used instead of 0.095 g of the catalyst (1).

Figure 57:
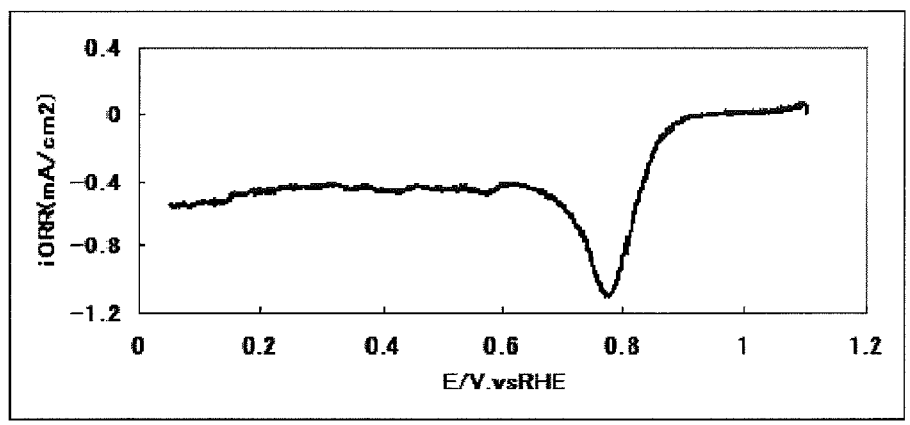
FIG. 57 is an oxygen reduction current density-potential curve of a fuel cell electrode (27) of Example 27.

The measurement result is shown in FIG. 57. The catalyst (27) had an oxygen reduction onset potential of 0.94 V (vs. RHE) and an oxygen reduction current density of 0.856 mA/cm$^2$ at 0.80 V.

Example 28

1. Production of Catalyst

The same operation as in Example 14 was carried out, except that 10 ml of a 5% NAFION (registered trademark) solution (DE521, DuPont) was used instead of tetraethylammonium tetrafluoroborate and iron acetate was not used, to obtain 187 mg of a powdery catalyst (28). The weight of the powder for burning obtained in this process was 11.5 g.

Figure 58:
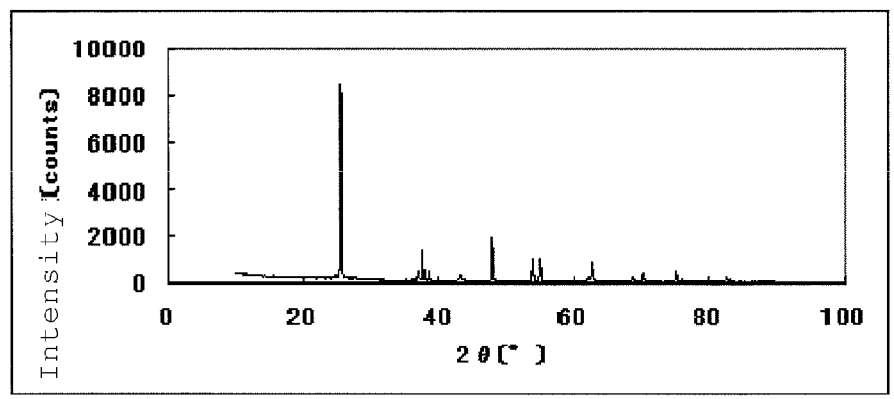
FIG. 58 is a powder X-ray diffraction spectrum of a catalyst (28) of Example 28.

The powder X-ray diffraction spectrum of the catalyst (28) is shown in FIG. 58.

The rate of each element constituting the catalyst (28) (proportion of the number of atoms) was Ti:C:N:O:S:F=1: 2.46:0.19:0.95:0.002:0.003.

Further, the BET specific surface area of the catalyst (28) was 300.2 m$^2$/g.

2. Production of Fuel Cell Electrode and Evaluation of Oxygen Reducing Ability A fuel cell electrode (28) was produced and the oxygen reducing ability was evaluated by the same method as in Example 1 except that 0.095 g of the catalyst (28) was used instead of 0.095 g of the catalyst (1).

Figure 59:
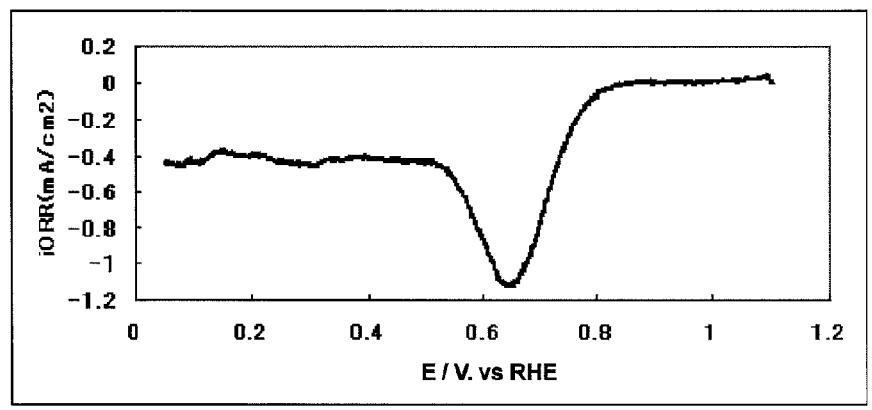
FIG. 59 is an oxygen reduction current density-potential curve of a fuel cell electrode (28) of Example 28.

The measurement result is shown in FIG. 59. The catalyst (28) had an oxygen reduction onset potential of 0.87 V (vs. RHE) and an oxygen reduction current density of 0.049 mA/cm$^2$ at 0.80 V.

3. Production of Fuel Cell Membrane Electrode Assembly and Evaluation of Power Generation Property A fuel cell membrane electrode assembly (hereinafter also referred to as "MEA (28)") was prepared by the same method as in Example 13 except that the catalyst (28) was used instead of the catalyst (13), and a single cell of a polymer electrolyte fuel cell (hereinafter also referred to as "single cell (28)") was prepared by the same method as in Example 13 except that the MEA (28) was used instead of the MEA (13).

The power generation property of the single cell (28) was evaluated by the same method as in Example 13.

Figure 60:
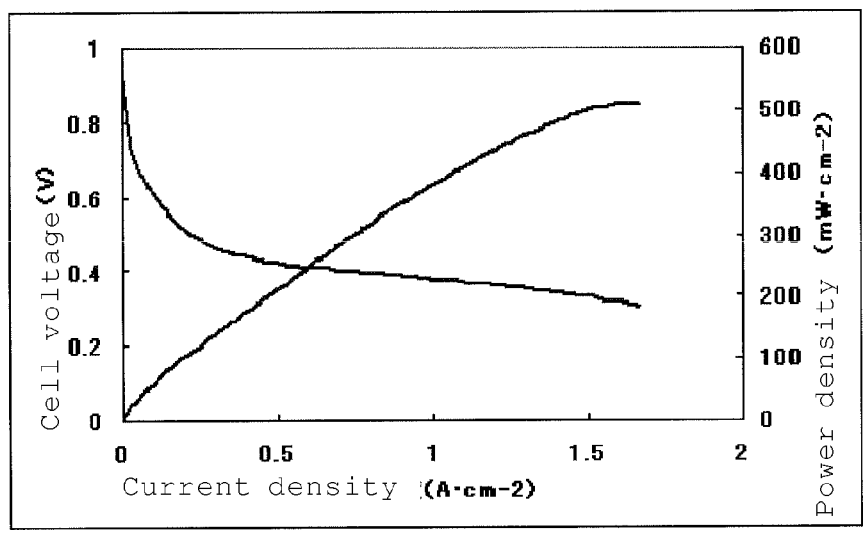
FIG. 60 is a voltage-current density curve in a single cell (28) made in Example 28.

The measurement result is shown in FIG. 60. The catalytic performance, i.e., the maximum power density, in the MEA (28) was 510 mW/cm$^2$.

Example 29

1. Production of Catalyst

In a beaker, 2.60 g (25.94 mmol) of acetylacetone was put; while stirring this, 4.30 g (17.59 mmol) of vanadium(V) tri-1-propoxide oxide was added; and 28 ml of acetic acid was further dropwise added over 2 minutes to prepare a vanadium solution.

In a beaker, 60 ml of water, 50 ml of ethanol, and 60 ml of acetic acid were put; and 8.74 g (70.36 mmol) of pyrazinecarboxylic acid was added thereto and completely dissolved. While stirring this, 10 ml of a 5% NAFION (registered trademark) solution (DE521, DuPont) was added to the resultant solution, and 290 mg (1.67 mmol) of iron acetate was added little by little and dissolved. Then, with the temperature kept at room temperature and stirring, the vanadium solution was dropwise added over 10 minutes; and the dropwise addition was followed by stirring for 30 minutes to obtain a catalyst precursor solution (29).

The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was crushed with an automatic mortar to obtain 11.2 g of a powder (29) for burning.

In a rotary kiln furnace, 1.2 g of the powder (29) for burning was heated to 890° C. under the flowing at a rate of 20 mL/min of a nitrogen gas containing 4% by volume of a hydrogen gas (i.e., mixed gas of hydrogen gas:nitrogen gas=4% by volume: 96% by volume) at a temperature-raising rate of 10° C./min, was burnt at 890° C. for 0.5 hour, and was subjected to natural cooling to obtain 189 mg of a powdery catalyst (29).

Figure 61:
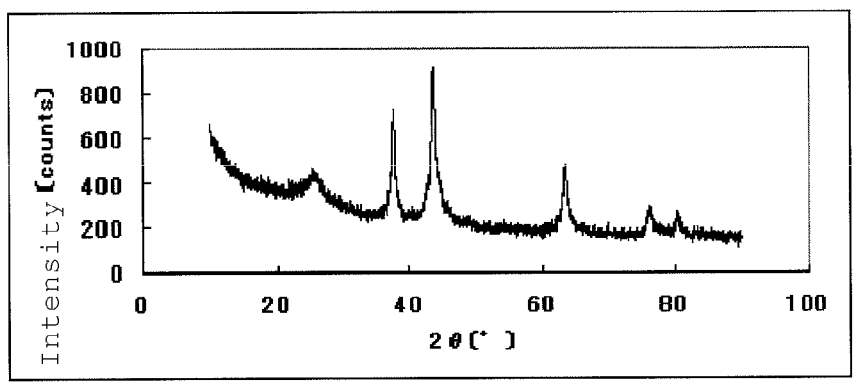
FIG. 61 is a powder X-ray diffraction spectrum of a catalyst (29) of Example 29.

The powder X-ray diffraction spectrum of the catalyst (29) is shown in FIG. 61.

The rate of each element constituting the catalyst (29) (proportion of the number of atoms) was V:Fe:C:N:O:S:F=1: 0.09:5.48:0.96:1.73:0.016:0.007.

Further, the BET specific surface area of the catalyst (29) was 50.5 m$^2$/g.

2. Production of Fuel Cell Electrode and Evaluation of Oxygen Reducing Ability A fuel cell electrode (29) was produced and the oxygen reducing ability was evaluated by the same method as in Example 1 except that 0.095 g of the catalyst (29) was used instead of 0.095 g of the catalyst (1).

Figure 62:
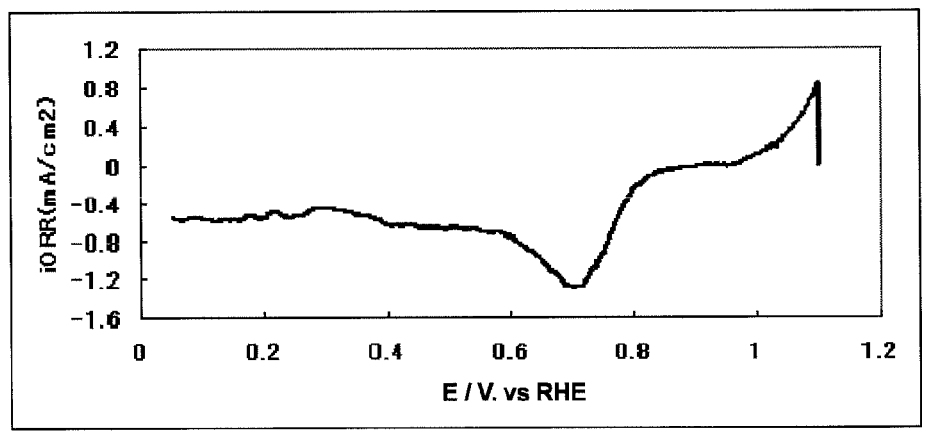
FIG. 62 is an oxygen reduction current density-potential curve of a fuel cell electrode (29) of Example 29.

The measurement result is shown in FIG. 62. The catalyst (29) had an oxygen reduction onset potential of 0.92 V (vs. RHE) and an oxygen reduction current density of 0.257 mA/cm$^2$ at 0.80 V.

Example 30

1. Production of Catalyst

In a beaker, 70 ml of acetic acid was put; while stirring this, 6.14 g (17.54 mmol) of vanadium(III) acetylacetonate was added to prepare a vanadium solution.

In a beaker, 60 ml of water, 50 ml of ethanol, and 60 ml of acetic acid were put; and 8.74 g (70.36 mmol) of pyrazinecarboxylic acid was added thereto and completely dissolved. While stirring this, 10 ml of a 5% NAFION (registered trademark) solution (DE521, DuPont) was added to the resultant solution, and 290 mg (1.67 mmol) of iron acetate was added little by little and dissolved. Then, with the temperature kept at room temperature and stirring, the vanadium solution was dropwise added over 10 minutes; and the dropwise addition was followed by stirring for 30 minutes to obtain a catalyst precursor solution (30).

The same operation as in Example 25 was carried out, except that the catalyst precursor solution (25) was changed to the catalyst precursor solution (30), to obtain 266 mg of a powdery catalyst (30). The weight of the powder for burning obtained in this process was 11.4 g.

Figure 63:
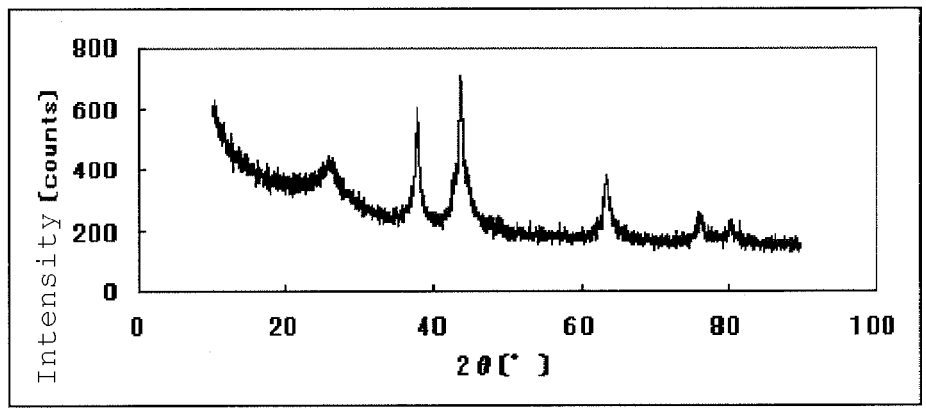
FIG. 63 is a powder X-ray diffraction spectrum of a catalyst (30) of Example 30.

The powder X-ray diffraction spectrum of the catalyst (30) is shown in FIG. 63.

The rate of each element constituting the catalyst (30) (proportion of the number of atoms) was V:Fe:C:N:O:S:F=1: 0.09:6.06:0.92:1.88:0.015:0.031.

Further, the BET specific surface area of the catalyst (30) was 100.8 m$^2$/g.

2. Production of Fuel Cell Electrode and Evaluation of Oxygen Reducing Ability A fuel cell electrode (30) was produced and the oxygen reducing ability thereof was evaluated by the same method as in Example 1 except that 0.095 g of the catalyst (30) was used instead of 0.095 g of the catalyst (1).

Figure 64:
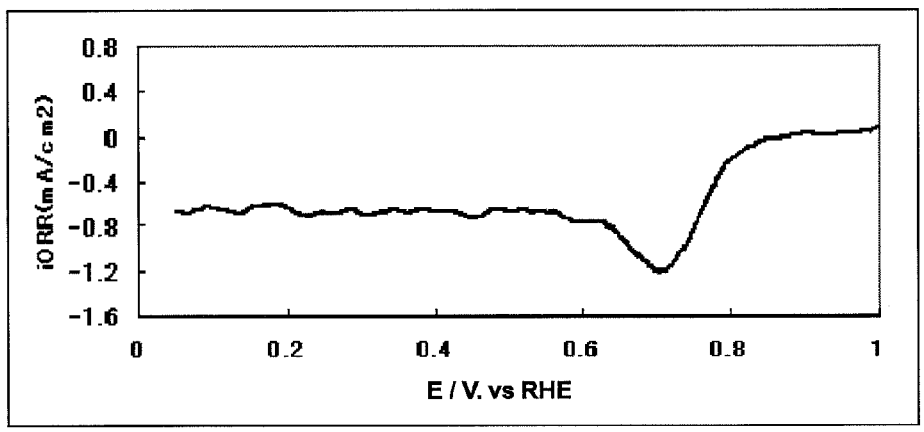
FIG. 64 is an oxygen reduction current density-potential curve of a fuel cell electrode (30) of Example 30.

The measurement result is shown in FIG. 64. The catalyst (30) had an oxygen reduction onset potential of 0.88 V (vs. RHE) and an oxygen reduction current density of 0.207 mA/cm$^2$ at 0.80 V.

Example 31

1. Production of Catalyst

In a beaker, 50 ml of methanol was put; and while stirring this, 2.56 g (13.5 mmol) of titanium tetrachloride, 2.42 g (6.75 mmol) of tantalum pentachloride, 12.5 ml of a 5% NAFION (registered trademark) solution (DE521, DuPont), and 355 mg (2.05 mmol) of iron acetate were added sequentially. To the resultant solution, 10.15 g (81.8 mmol) of pyrazinecarboxylic acid was added little by little, followed by stirring the mixture for 3 hours to obtain a catalyst precursor solution (31). During the stirring for 3 hours, a precipitate was generated with the passage of time.

The same operation as in Example 20 was carried out, except that the catalyst precursor solution (20) was changed to the catalyst precursor solution (31), to obtain 259 mg of a powdery catalyst (31). The weight of the powder for burning obtained in this process was 7.59 g.

Figure 94:
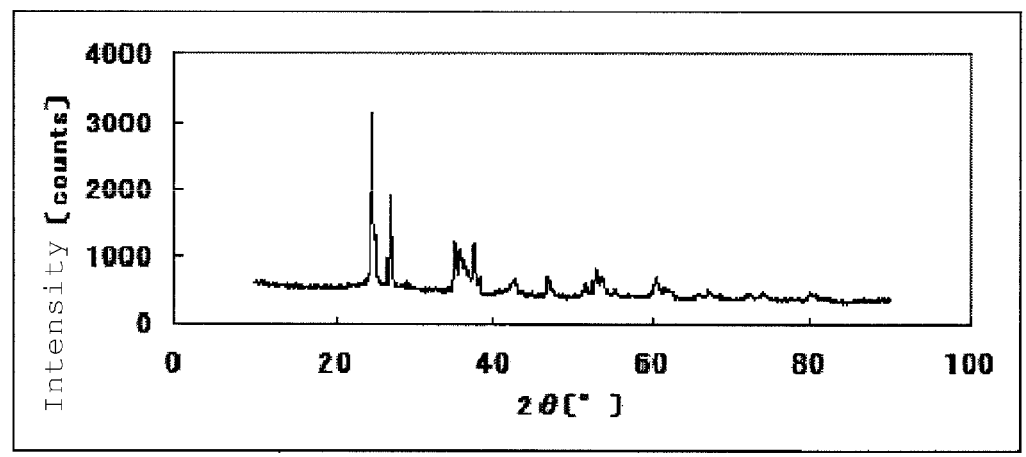
FIG. 94 is a powder X-ray diffraction spectrum of a catalyst (31) of Example 31.

The powder X-ray diffraction spectrum of the catalyst (31) is shown in FIG. 94.

Further, the BET specific surface area of the catalyst (31) was 197.2 m$^2$/g.

2. Production of Fuel Cell Electrode and Evaluation of Oxygen Reducing Ability A fuel cell electrode (31) was produced and the oxygen reducing ability thereof was evaluated by the same method as in Example 1 except that 0.095 g of the catalyst (31) was used instead of 0.095 g of the catalyst (1).

Figure 95:
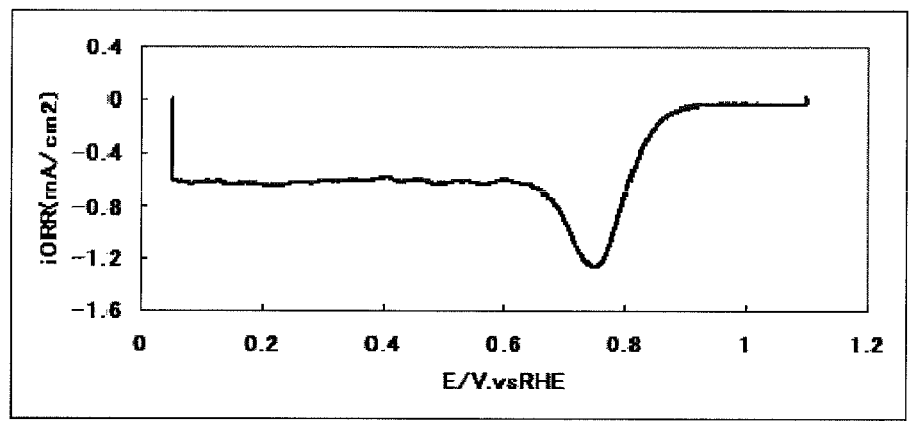
FIG. 95 is an oxygen reduction current density-potential curve of a fuel cell electrode (31) of Example 31.

The measurement result is shown in FIG. 95. The catalyst (31) had an oxygen reduction onset potential of 0.95 V (vs. RHE) and an oxygen reduction current density of 0.699 mA/cm$^2$ at 0.80 V.

Example 32

1. Production of Catalyst

In a beaker, 50 ml of methanol was put; and while stirring this, 1.28 g (6.75 mmol) of titanium tetrachloride, 4.84 g (13.5 mmol) of tantalum pentachloride, 12.5 ml of a 5% NAFION (registered trademark) solution (DE521, DuPont), and 355 mg (2.05 mmol) of iron acetate were added sequentially. To the resultant solution, 10.15 g (81.8 mmol) of pyrazinecarboxylic acid was added little by little, followed by stirring the mixture for 3 hours to obtain a catalyst precursor solution (32). During the stirring for 3 hours, a precipitate was generated with the passage of time.

The same operation as in Example 31 was carried out, except that the catalyst precursor solution (31) was changed to the catalyst precursor solution (32), to obtain 259 mg of a powdery catalyst (32). The weight of the powder for burning obtained in this process was 7.59 g.

Figure 96:
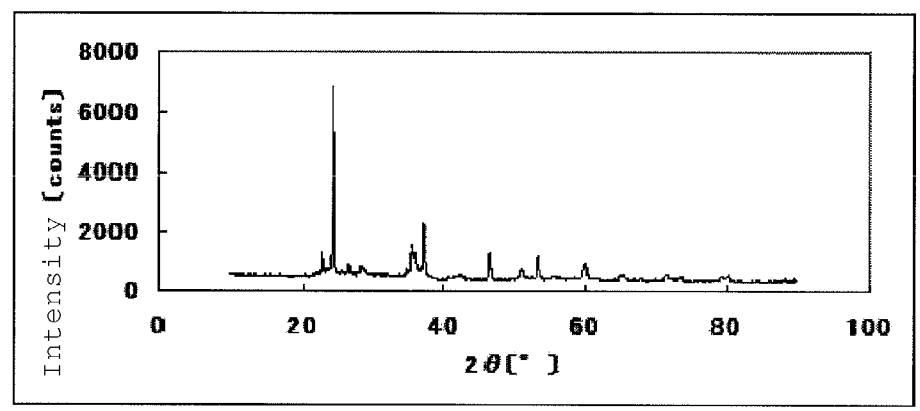
FIG. 96 is a powder X-ray diffraction spectrum of a catalyst (32) of Example 32.

The powder X-ray diffraction spectrum of the catalyst (32) is shown in FIG. 96.

Further, the BET specific surface area of the catalyst (32) was 177.2 m$^2$/g.

2. Production of Fuel Cell Electrode and Evaluation of Oxygen Reducing Ability A fuel cell electrode (32) was produced and the oxygen reducing ability thereof was evaluated by the same method as in Example 1 except that 0.095 g of the catalyst (32) was used instead of 0.095 g of the catalyst (1).

Figure 97:
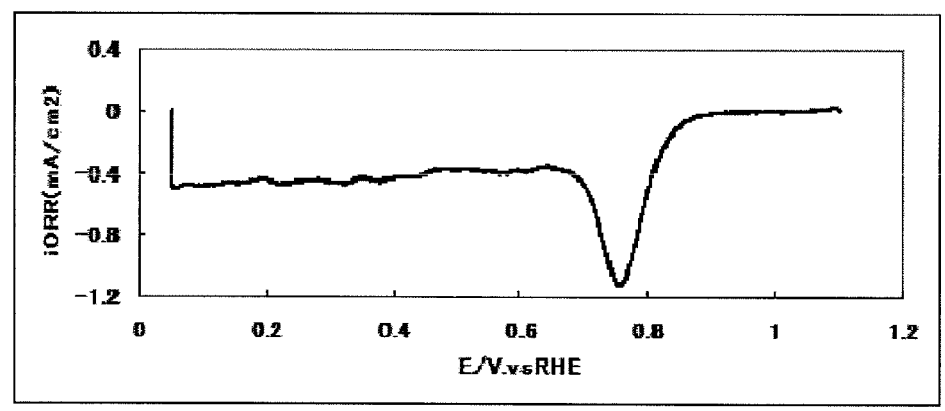
FIG. 97 is an oxygen reduction current density-potential curve of a fuel cell electrode (32) of Example 32.

The measurement result is shown in FIG. 97. The catalyst (32) had an oxygen reduction onset potential of 0.97 V (vs. RHE) and an oxygen reduction current density of 0.506 mA/cm$^2$ at 0.80 V.

Example 33

1. Production of Catalyst

In a beaker, 2.60 g (25.94 mmol) of acetylacetone was put; while stirring this, 1 ml (3.52 mmol) of titanium isopropoxide, and 6.53 g (14.1 mmol) of 85% 1-butanol solution of zirconium butoxide were added; and 20 ml of acetic acid was further dropwise added over 2 minutes to prepare a titanium-zirconium solution (33).

In a beaker, 60 ml of water, 50 ml of ethanol, and 60 ml of acetic acid were put; and 8.74 g (70.4 mmol) of pyrazinecarboxylic acid was added thereto and completely dissolved. While stirring this, 10.0 ml of a 5% NAFION (registered trademark) solution (DE521, DuPont) was added to the resultant solution, and 290 mg (1.67 mmol) of iron acetate was added little by little and dissolved. Then, with the temperature kept at room temperature and stirring, the titanium-zirconium solution (33) was dropwise added over 10 minutes; and the dropwise addition was followed by stirring for 30 minutes to obtain a catalyst precursor solution (33).

The catalyst precursor solution (33) was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was crushed with an automatic mortar for 30 minutes to obtain 11.7 g of a powder (33) for burning.

The same operation as in Example 31 was carried out, except that 1.200 g of the powder (33) for burning was used instead of the powder (31) for burning, to obtain 321 mg of a powdery catalyst (33).

Figure 98:
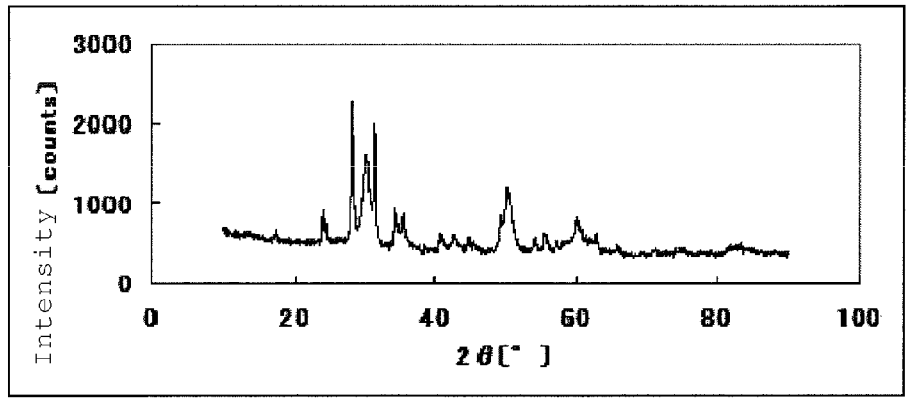
FIG. 98 is a powder X-ray diffraction spectrum of a catalyst (33) of Example 33.

The powder X-ray diffraction spectrum of the catalyst (33) is shown in FIG. 98.

Further, the BET specific surface area of the catalyst (33) was 242.5 m$^2$/g.

2. Production of Fuel Cell Electrode and Evaluation of Oxygen Reducing Ability A fuel cell electrode (33) was produced by the same method as in Example except that 0.095 g of the catalyst (33) was used instead of 0.095 g of the catalyst (1), and the oxygen reducing ability thereof was evaluated.

Figure 99:
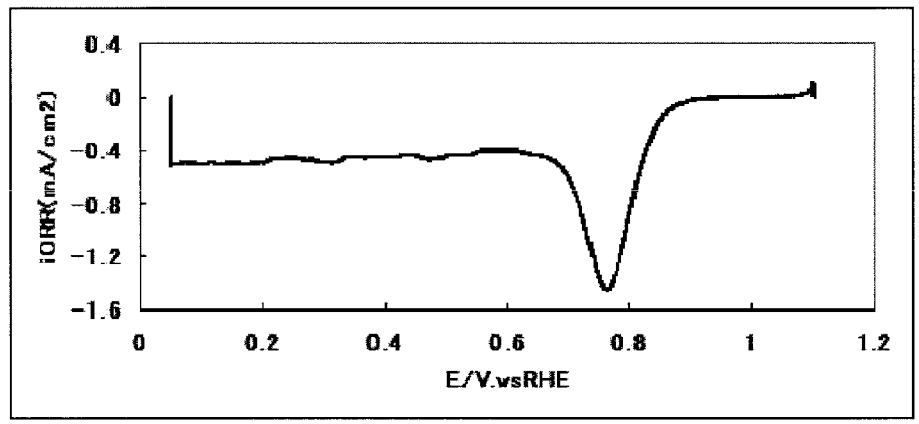
FIG. 99 is an oxygen reduction current density-potential curve of a fuel cell electrode (33) of Example 33.

The measurement result is shown in FIG. 99. The catalyst (33) had an oxygen reduction onset potential of 0.94 V (vs. RHE) and an oxygen reduction current density of 0.856 mA/cm$^2$ at 0.80 V.

Example 34

1. Production of Catalyst

In a beaker, 2.60 g (25.94 mmol) of acetylacetone was put; while stirring this, 4 ml (17.6 mmol) of titanium isopropoxide, and 1.59 g (3.52 mmol) of zirconium butoxide were added; and 16 ml of acetic acid was further dropwise added over 2 minutes to prepare a titanium-zirconium solution (34).

The same operation as in Example 33 was carried out, except that the titanium-zirconium solution (34) was used instead of the titanium-zirconium solution (33), to obtain 236 mg of a powdery catalyst (34). The weight of the powder for burning obtained in this process was 11.1 g.

Figure 100:
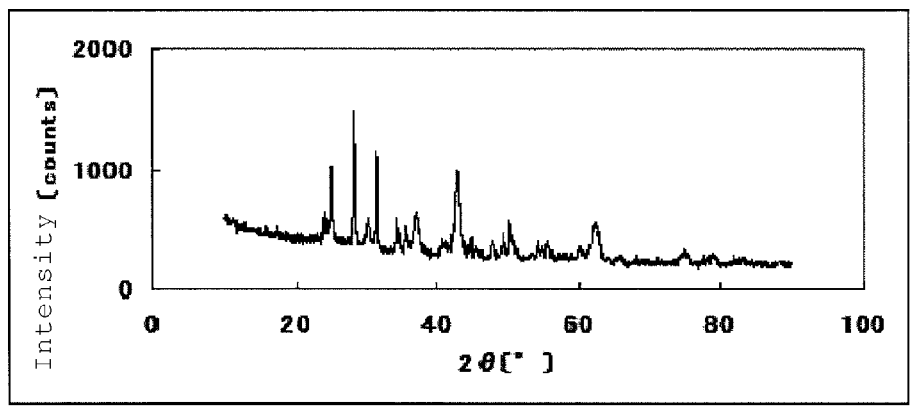
FIG. 100 is a powder X-ray diffraction spectrum of a catalyst (34) of Example 34.

The powder X-ray diffraction spectrum of the catalyst (34) is shown in FIG. 100.

Further, the BET specific surface area of the catalyst (34) was 209.3 m$^2$/g.

2. Production of Fuel Cell Electrode and Evaluation of Oxygen Reducing Ability A fuel cell electrode (34) was produced and the oxygen reducing ability was evaluated by the same method as in Example 1 except that 0.095 g of the catalyst (34) was used instead of 0.095 g of the catalyst (1).

Figure 101:
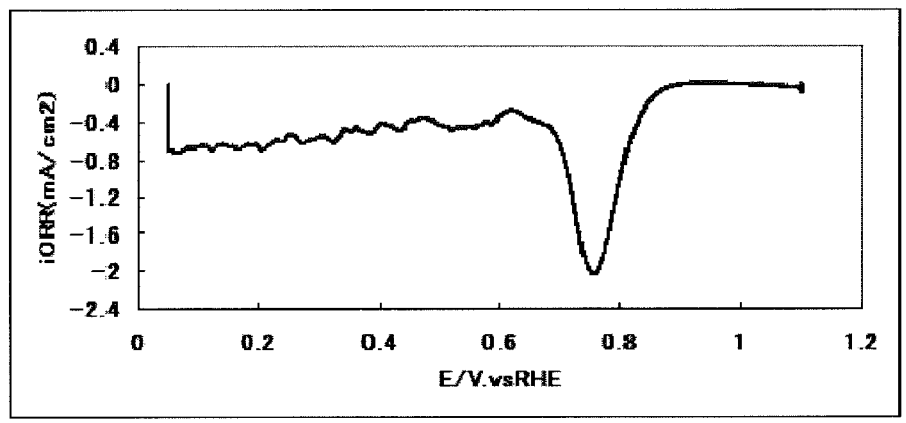
FIG. 101 is an oxygen reduction current density-potential curve of a fuel cell electrode (34) of Example 34.

The measurement result is shown in FIG. 101. The catalyst (34) had an oxygen reduction onset potential of 0.91 V (vs. RHE) and an oxygen reduction current density of 1.002 mA/cm$^2$ at 0.80 V.

Example 35

1. Production of Catalyst

In a beaker, 2.60 g (25.94 mmol) of acetylacetone was put; while stirring this, 5 ml (17.6 mmol) of titanium isopropoxide was added; and 16 ml of acetic acid was further dropwise added over 2 minutes to prepare a titanium solution.

In a beaker, 60 ml of water, 50 ml of ethanol, and 60 ml of acetic acid were put; and 8.74 g (70.4 mmol) of pyrazinecarboxylic acid was added thereto and completely dissolved. While stirring this, 10.0 ml of a 5% NAFION (registered trademark) solution (DE521, DuPont) and 476 mg (1.41 mmol) of yttrium acetate tetrahydrate were added to the resultant solution, and 290 mg (1.67 mmol) of iron acetate was added little by little and dissolved. Then, with the temperature kept at room temperature and stirring, the titanium solution was dropwise added over 10 minutes; and the dropwise addition was followed by stirring for 30 minutes to obtain a catalyst precursor solution (35).

The same operation as in Example 33 was carried out, except that the catalyst precursor solution (35) was used instead of the catalyst precursor solution (33), to obtain 229 mg of a powdery catalyst (35). The weight of the powder for burning obtained in this process was 11.5 g.

Figure 102:
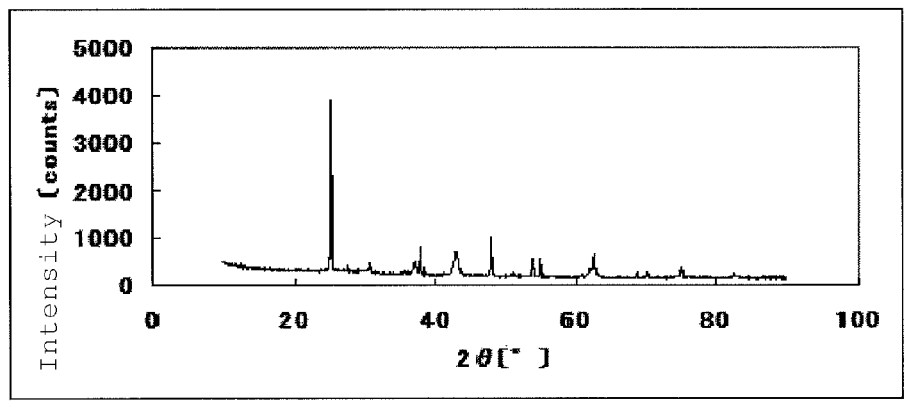
FIG. 102 is a powder X-ray diffraction spectrum of a catalyst (35) of Example 35.

The powder X-ray diffraction spectrum of the catalyst (1) is shown in FIG. 102.

Further, the BET specific surface area of the catalyst (35) was 271 $m^2/g$.

2. Production of Fuel Cell Electrode and Evaluation of Oxygen Reducing Ability A fuel cell electrode (35) was produced and the oxygen reducing ability thereof was evaluated by the same method as in Example 1 except that 0.095 g of the catalyst (35) was used instead of 0.095 g of the catalyst (1).

Figure 103:
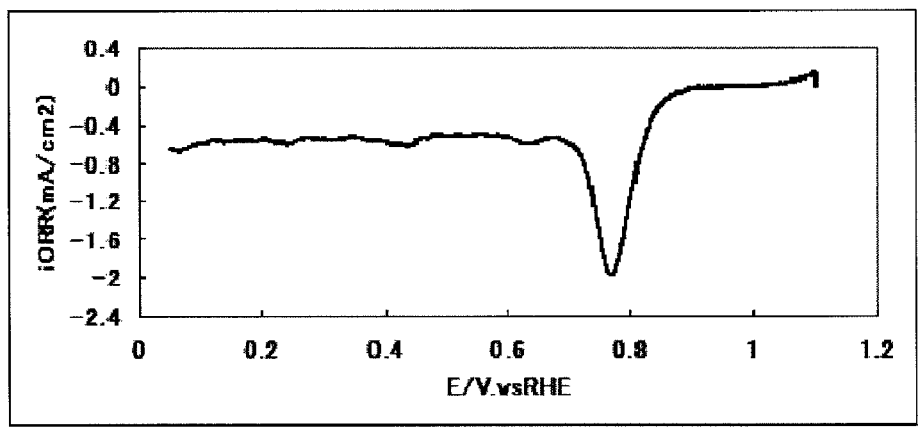
FIG. 103 is an oxygen reduction current density-potential curve of a fuel cell electrode (35) of Example 35.

The measurement result is shown in FIG. 103. The catalyst (35) had an oxygen reduction onset potential of 0.98 V (vs. RHE) and an oxygen reduction current density of 1.158 $mA/cm^2$ at 0.80 V.

Example 36

1. Production of Catalyst

The same operation as in Example 35 was carried out, except that the amount of yttrium acetate tetrahydrate was changed to 178 mg (0.526 mmol), to obtain 217 mg of a powdery catalyst (36). The weight of the powder for burning obtained in this process was 11.3 g.

Figure 104:
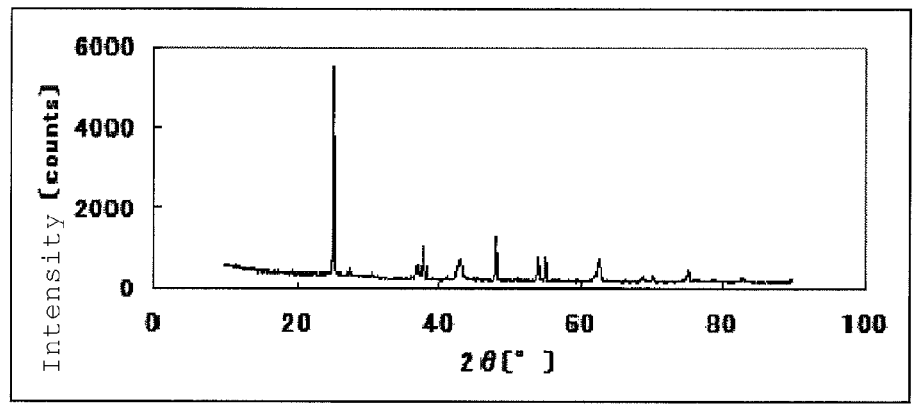
FIG. 104 is a powder X-ray diffraction spectrum of a catalyst (36) of Example 36.

The powder X-ray diffraction spectrum of the catalyst (36) is shown in FIG. 104.

Further, the BET specific surface area of the catalyst (36) was 275.1 $m^2/g$.

2. Production of Fuel Cell Electrode and Evaluation of Oxygen Reducing Ability A fuel cell electrode (36) was produced and the oxygen reducing ability thereof was evaluated by the same method as in Example 1 except that 0.095 g of the catalyst (36) was used instead of 0.095 g of the catalyst (1).

Figure 105:
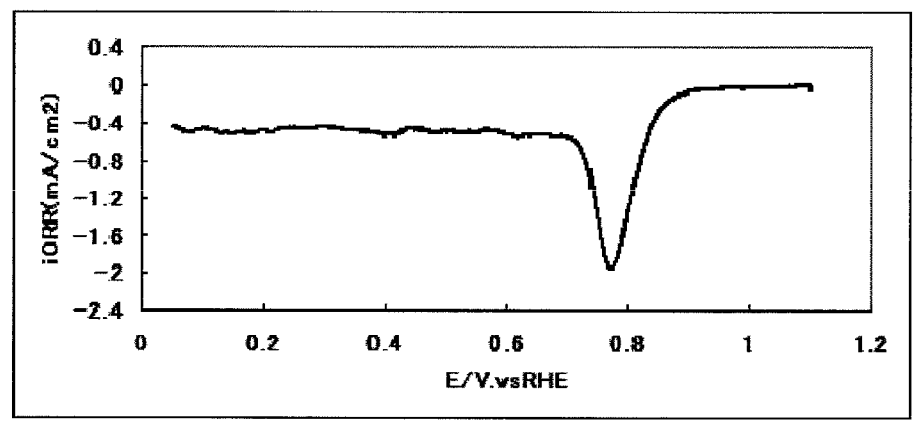
FIG. 105 is an oxygen reduction current density-potential curve of a fuel cell electrode (36) of Example 36.

The measurement result is shown in FIG. 105. The catalyst (36) had an oxygen reduction onset potential of 0.96 V (vs. RHE) and an oxygen reduction current density of 1.321 $mA/cm^2$ at 0.80 V.

Example 37

1. Production of Catalyst

In a beaker, 2.60 g (25.94 mmol) of acetylacetone was put; while stirring this, 7.94 ml (17.6 mmol) of zirconium butoxide was added; and 28 ml of acetic acid was further dropwise added over 2 minutes to prepare a zirconium solution.

In a beaker, 60 ml of water, 50 ml of ethanol, and 60 ml of acetic acid were put; and 8.74 g (70.4 mmol) of pyrazinecarboxylic acid was added thereto and completely dissolved. While stirring this, 10.0 ml of a 5% NAFION (registered trademark) solution (DE521, DuPont) was added to the resultant solution, and 290 mg (1.67 mmol) of iron acetate and 476 mg (1.41 mmol) of yttrium acetate tetrahydrate were added little by little and dissolved. Then, with the temperature kept at room temperature and stirring, the zirconium solution was dropwise added over 10 minutes; and the dropwise addition was followed by stirring for 30 minutes to obtain a catalyst precursor solution (37).

The same operation as in Example 33 was carried out, except that the catalyst precursor solution (37) was used instead of the catalyst precursor solution (33), to obtain 339 mg of a powdery catalyst (37). The weight of the powder for burning obtained in this process was 12.6 g.

Figure 106:
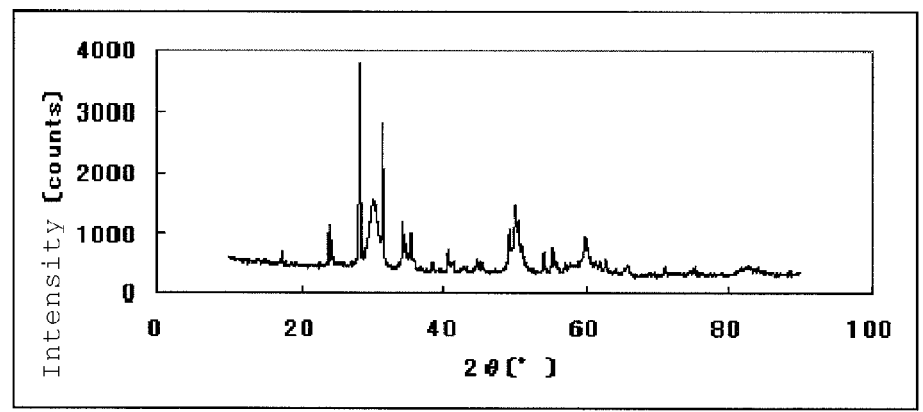
FIG. 106 is a powder X-ray diffraction spectrum of a catalyst (37) of Example 37.

The powder X-ray diffraction spectrum of the catalyst (1) is shown in FIG. 106.

Further, the BET specific surface area of the catalyst (37) was 250.6 $m^2/g$.

2. Production of Fuel Cell Electrode and Evaluation of Oxygen Reducing Ability A fuel cell electrode (37) was produced and the oxygen reducing ability thereof was evaluated by the same method as in Example 1 except that 0.095 g of the catalyst (37) was used instead of 0.095 g of the catalyst (1).

Figure 107:
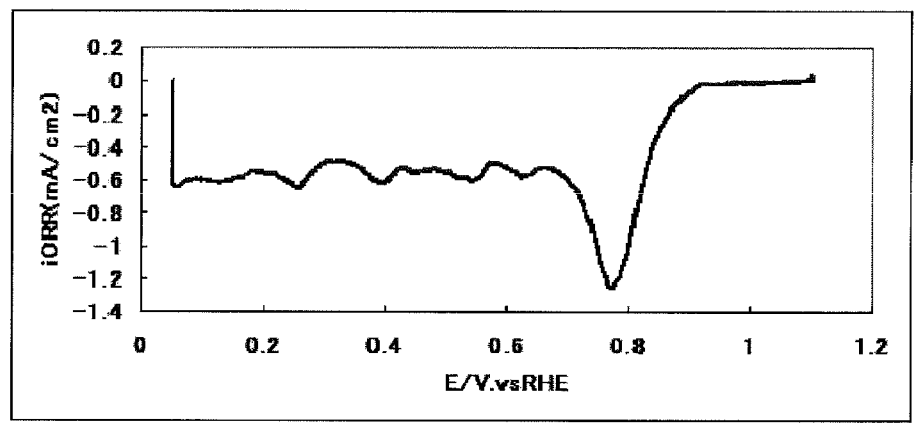
FIG. 107 is an oxygen reduction current density-potential curve of a fuel cell electrode (37) of Example 37.

The measurement result is shown in FIG. 107. The catalyst (37) had an oxygen reduction onset potential of 1.07 V (vs. RHE) and an oxygen reduction current density of 0.971 $mA/cm^2$ at 0.80 V.

Example 38

1. Production of Catalyst

In a beaker, 2.56 g (13.5 mmol) of titanium tetrachloride was put; and while stirring this, 1.28 g (6.75 mmol) of tin trichloride, 50 ml of methanol, 12.5 ml of a 5% NAFION (registered trademark) solution (DE521, DuPont), and 355 mg (2.05 mmol) of iron acetate were added sequentially. To the resultant solution, 10.15 g (81.8 mmol) of pyrazinecarboxylic acid was added little by little, followed by stirring the mixture for 3 hours to obtain a catalyst precursor solution (38). During the stirring for 3 hours, a precipitate was generated with the passage of time.

The same operation as in Example 31 was carried out, except that the catalyst precursor solution (31) was changed to the catalyst precursor solution (38), to obtain 374 mg of a powdery catalyst (38). The weight of the powder for burning obtained in this process was 4.49 g.

Figure 108:
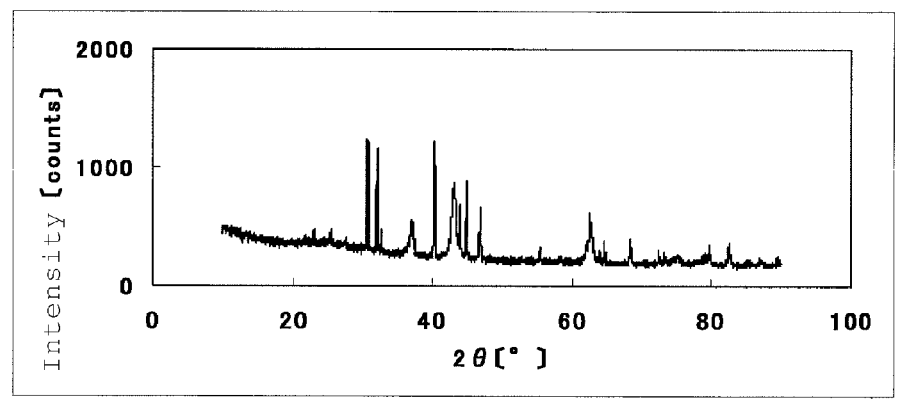
FIG. 108 is a powder X-ray diffraction spectrum of a catalyst (38) of Example 38.

The powder X-ray diffraction spectrum of the catalyst (38) is shown in FIG. 108.

Further, the BET specific surface area of the catalyst (38) was 316.8 $m^2/g$.

2. Production of Fuel Cell Electrode and Evaluation of Oxygen Reducing Ability

A fuel cell electrode (38) was produced and the oxygen reducing ability thereof was evaluated by the same method as in Example 1 except that 0.095 g of the catalyst (38) was used instead of 0.095 g of the catalyst (1).

Figure 109:
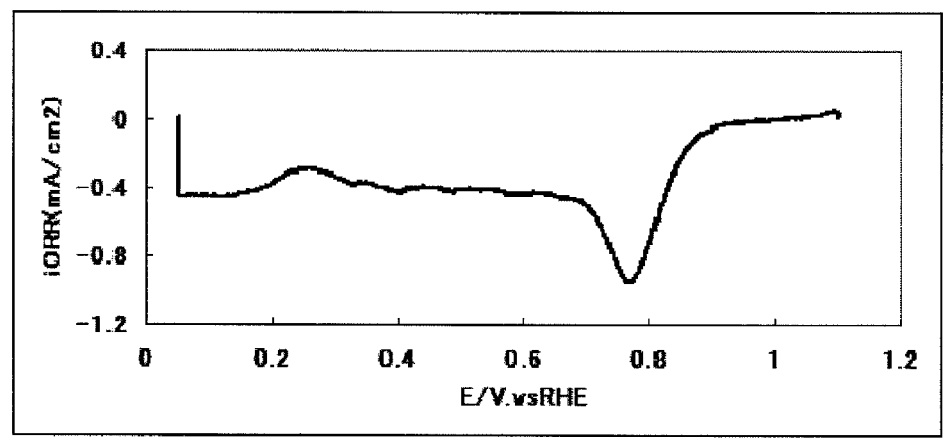
FIG. 109 is an oxygen reduction current density-potential curve of a fuel cell electrode (38) of Example 38.

The measurement result is shown in FIG. 109. The catalyst (38) had an oxygen reduction onset potential of 1.01 V (vs. RHE) and an oxygen reduction current density of 0.708 mA/cm$^2$ at 0.80 V.

Example 39

1. Production of Catalyst

In a beaker, 2.56 g (13.5 mmol) of titanium tetrachloride was put; and while stirring this, 1.55 g (6.75 mmol) of antimony trichloride, 50 ml of methanol, 12.5 ml of a 5% NAFION (registered trademark) solution (DE521, DuPont), and 355 mg (2.05 mmol) of iron acetate were added sequentially. To the resultant solution, 10.15 g (81.8 mmol) of pyrazinecarboxylic acid was added little by little, followed by stirring the mixture for 3 hours to obtain a catalyst precursor solution (39). During the stirring for 3 hours, a precipitate was generated with the passage of time.

The same operation as in Example 31 was carried out, except that the catalyst precursor solution (31) was changed to the catalyst precursor solution (39), to obtain 360 mg of a powdery catalyst (39). The weight of the powder for burning obtained in this process was 3.16 g.

Figure 110:
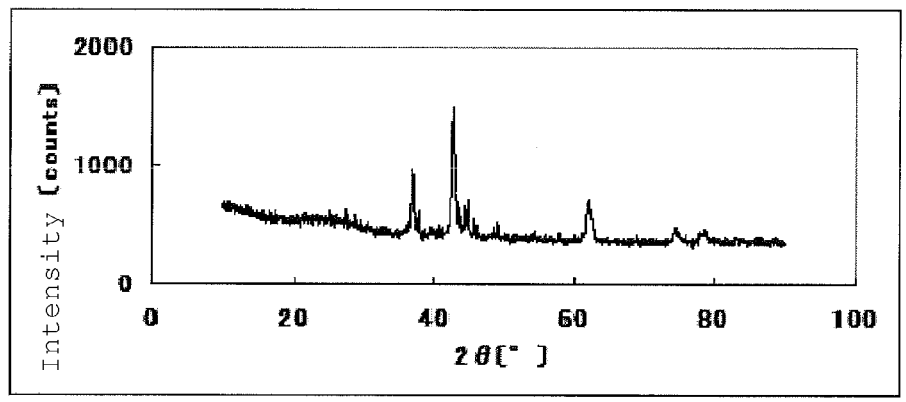
FIG. 110 is a powder X-ray diffraction spectrum of a catalyst (39) of Example 39.

The powder X-ray diffraction spectrum of the catalyst (39) is shown in FIG. 110.

Further, the BET specific surface area of the catalyst (39) was 382 m$^2$/g.

2. Production of Fuel Cell Electrode and Evaluation of Oxygen Reducing Ability

A fuel cell electrode (39) was produced and the oxygen reducing ability thereof was evaluated by the same method as in Example 1 except that 0.095 g of the catalyst (39) was used instead of 0.095 g of the catalyst (1).

Figure 111:
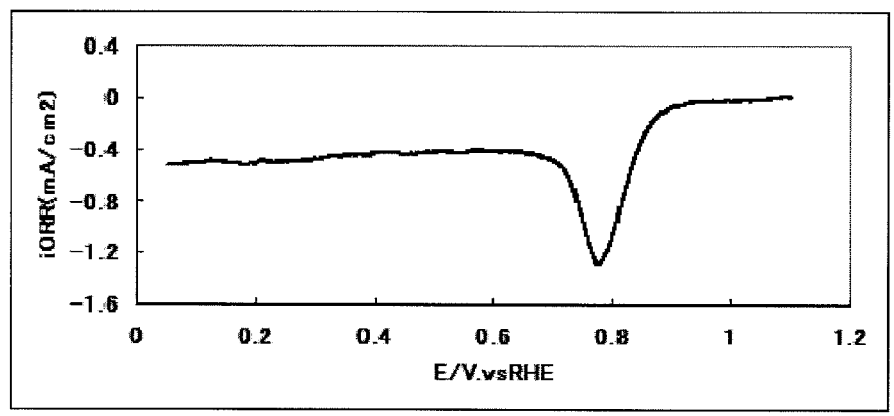
FIG. 111 is an oxygen reduction current density-potential curve of a fuel cell electrode (39) of Example 39.

The measurement result is shown in FIG. 111. The catalyst (39) had an oxygen reduction onset potential of 0.98 V (vs. RHE) and an oxygen reduction current density of 1.036 mA/cm$^2$ at 0.80 V.

Example 40

1. Production of Catalyst

In a beaker, 2.60 g (25.94 mmol) of acetylacetone was put; while stirring this, 5 ml (17.6 mmol) of titanium isopropoxide and 172 mg (0.84 mmol) of aluminum isopropoxide were added; and 28 ml (140.00 mmol) of acetic acid was further dropwise added over 2 minutes to prepare a titanium-aluminum solution.

In a beaker, 60 ml of water, 50 ml of ethanol, and 60 ml of acetic acid were put; and 8.74 g (70.4 mmol) of pyrazinecarboxylic acid was added thereto and completely dissolved. While stirring this, 910 mg (1.76 mmol) of ammonium heptadecafluorooctanesulfonate was added to the resultant solution, and 290 mg (1.67 mmol) of iron acetate was added little by little and dissolved. Then, with the temperature kept at room temperature and stirring, the titanium-aluminum solution was dropwise added over 10 minutes; and the dropwise addition was followed by stirring for 30 minutes to obtain a catalyst precursor solution (40).

The same operation as in Example 33 was carried out, except that the catalyst precursor solution (40) was used instead of the catalyst precursor solution (33), to obtain 199 mg of a powdery catalyst (40). The weight of the powder for burning obtained in this process was 12.0 g.

Figure 112:
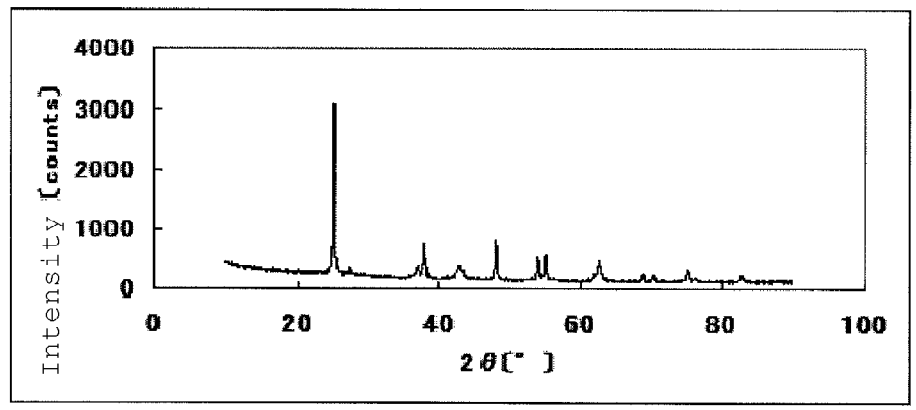
FIG. 112 is a powder X-ray diffraction spectrum of a catalyst (40) of Example 40.

The powder X-ray diffraction spectrum of the catalyst (40) is shown in FIG. 112.

Further, the BET specific surface area of the catalyst (40) was 271.5 m$^2$/g.

2. Production of Fuel Cell Electrode and Evaluation of Oxygen Reducing Ability

A fuel cell electrode (40) was produced and the oxygen reducing ability thereof was evaluated by the same method as in Example 1 except that 0.095 g of the catalyst (40) was used instead of 0.095 g of the catalyst (1).

Figure 113:
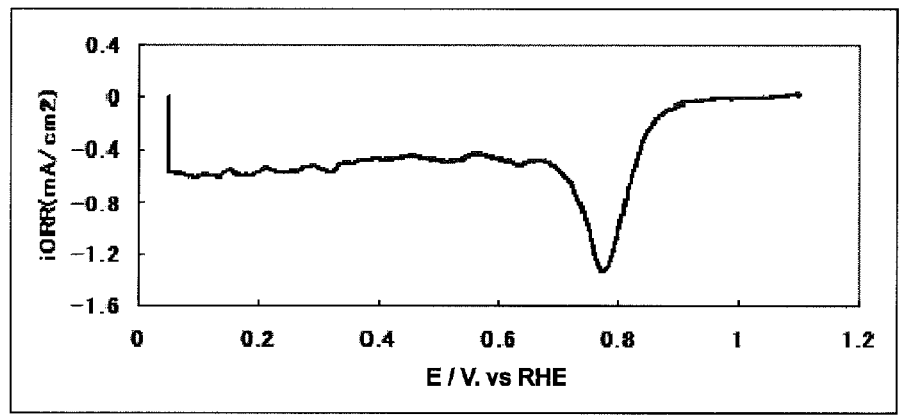
FIG. 113 is an oxygen reduction current density-potential curve of a fuel cell electrode (40) of Example 40.

The measurement result is shown in FIG. 113. The catalyst (40) had an oxygen reduction onset potential of 0.97 V (vs. RHE) and an oxygen reduction current density of 0.998 mA/cm$^2$ at 0.80 V.

Example 41

1. Production of Catalyst

In a beaker, 2.60 g (25.94 mmol) of acetylacetone was put; while stirring this, 4.80 g (17.6 mmol) of niobium ethoxide and 171 mg (0.84 mmol) of aluminum isopropoxide were added; and 28 ml (140.00 mmol) of acetic acid was further dropwise added over 2 minutes to prepare a niobium-aluminum solution.

In a beaker, 60 ml of water, 50 ml of ethanol, and 60 ml of acetic acid were put; and 8.74 g (70.4 mmol) of pyrazinecarboxylic acid was added thereto and completely dissolved. While stirring this, 10.0 ml of a 5% NAFION (registered trademark) solution (DE521, DuPont) was added to the resultant solution, and 290 mg (1.67 mmol) of iron acetate was added little by little and dissolved. Then, with the temperature kept at room temperature and stirring, the niobium-aluminum solution was dropwise added over 10 minutes; and the dropwise addition was followed by stirring for 30 minutes to obtain a catalyst precursor solution (41).

The same operation as in Example 33 was carried out, except that the catalyst precursor solution (41) was used instead of the catalyst precursor solution (33), to obtain 266 mg of a powdery catalyst (41). The weight of the powder for burning obtained in this process was 11.9 g.

Figure 114:
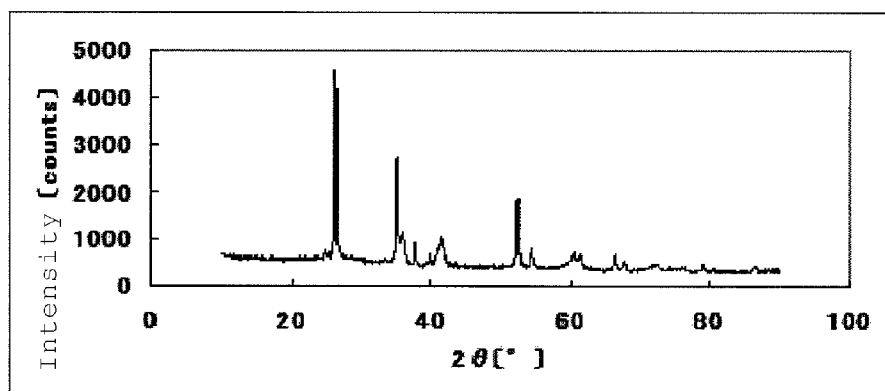
FIG. 114 is a powder X-ray diffraction spectrum of a catalyst (41) of Example 41.

The powder X-ray diffraction spectrum of the catalyst (41) is shown in FIG. 114.

Further, the BET specific surface area of the catalyst (41) was 203.5 m$^2$/g.

2. Production of Fuel Cell Electrode and Evaluation of Oxygen Reducing Ability

A fuel cell electrode (41) was produced and the oxygen reducing ability thereof was evaluated by the same method as in Example 1 except that 0.095 g of the catalyst (41) was used instead of 0.095 g of the catalyst (1).

Figure 115:
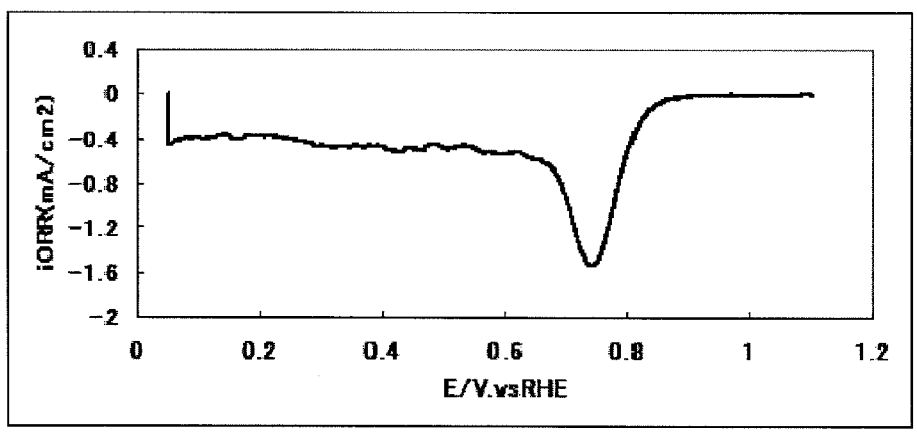
FIG. 115 is an oxygen reduction current density-potential curve of a fuel cell electrode (41) of Example 41.

The measurement result is shown in FIG. 115. The catalyst (41) had an oxygen reduction onset potential of 0.95 V (vs. RHE) and an oxygen reduction current density of 0.514 mA/cm$^2$ at 0.80 V.

Example 42

1. Production of Catalyst

In a beaker, 2.60 g (25.94 mmol) of acetylacetone was put; while stirring this, 7.95 mg (17.6 mmol) of zirconium butoxide and 342 mg (1.67 mmol) of aluminum isopropoxide were added; and 36 ml (140.00 mmol) of acetic acid was further dropwise added over 2 minutes to prepare a niobium-aluminum solution.

In a beaker, 60 ml of water, 50 ml of ethanol, and 60 ml of acetic acid were put; and 8.74 g (70.4 mmol) of pyrazinecarboxylic acid was added thereto and completely dissolved. While stirring this, 910 mg (1.76 mmol) of ammonium heptadecafluorooctanesulfonate was added to the resultant solution, and 290 mg (1.67 mmol) of iron acetate was added little by little and dissolved. Then, with the temperature kept at room temperature and stirring, the niobium-aluminum solution was dropwise added over 10 minutes; and the dropwise addition was followed by stirring for 30 minutes to obtain a catalyst precursor solution (42).

The same operation as in Example 33 was carried out, except that the catalyst precursor solution (42) was used instead of the catalyst precursor solution (33), to obtain 349 mg of a powdery catalyst (42). The weight of the powder for burning obtained in this process was 13.4 g.

Figure 116:
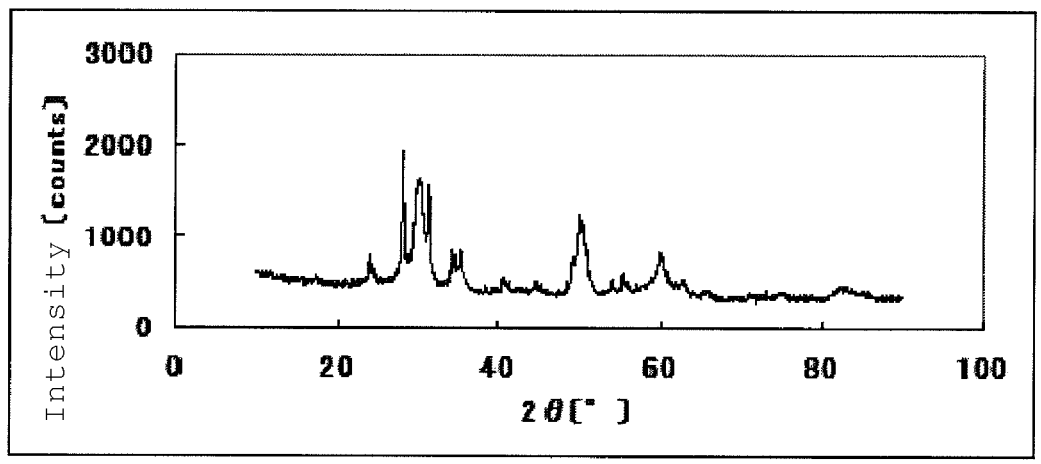
FIG. 116 is a powder X-ray diffraction spectrum of a catalyst (42) of Example 42.

The powder X-ray diffraction spectrum of the catalyst (42) is shown in FIG. 116.

Further, the BET specific surface area of the catalyst (42) was 249.4 $m^2/g$.

2. Production of Fuel Cell Electrode and Evaluation of Oxygen Reducing Ability A fuel cell electrode (42) was produced and the oxygen reducing ability thereof was evaluated by the same method as in Example 1 except that 0.095 g of the catalyst (42) was used instead of 0.095 g of the catalyst (1).

Figure 117:
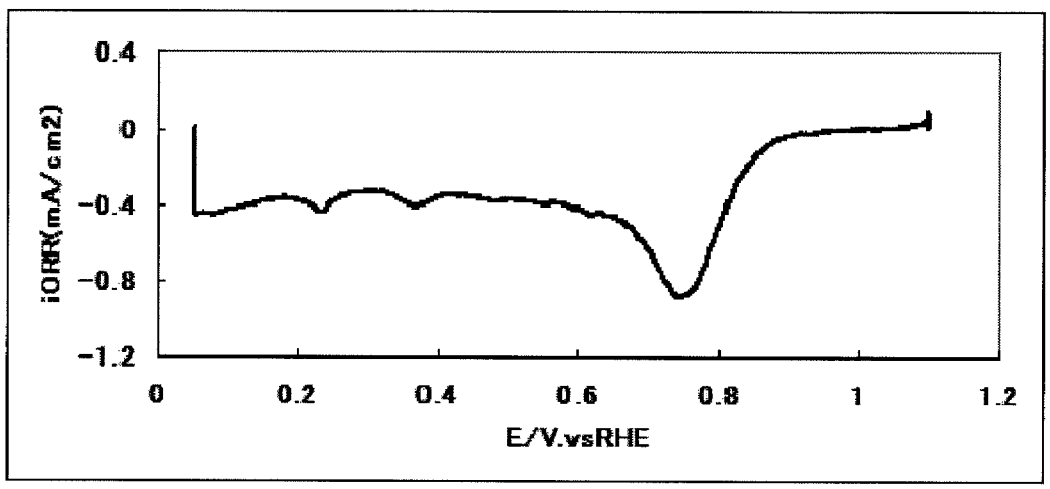
FIG. 117 is an oxygen reduction current density-potential curve of a fuel cell electrode (42) of Example 42.

The measurement result is shown in FIG. 117. The catalyst (42) had an oxygen reduction onset potential of 0.97 V (vs. RHE) and an oxygen reduction current density of 0.491 $mA/cm^2$ at 0.80 V.

Comparative Example 1

1. Production of Catalyst

The same operation as in Example 1 was carried out, except that tetraethylammoniumtetrafluoroborate was not used, to obtain 290 mg of a powdery catalyst (c1). The weight of the powder for burning obtained in this process was 10.3 g.

Figure 65:
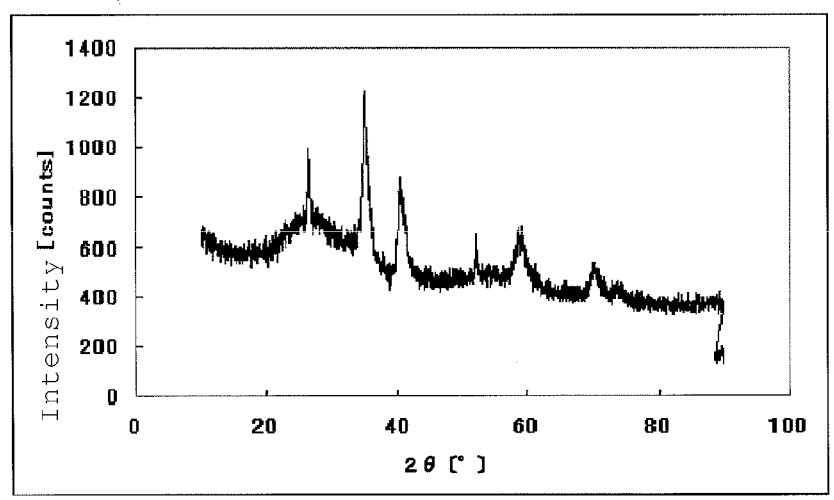
FIG. 65 is a powder X-ray diffraction spectrum of a catalyst (c1) of Comparative Example 1.

The powder X-ray diffraction spectrum of the catalyst (c1) is shown in FIG. 65.

The rate of each element constituting the catalyst (c1) (proportion of the number of atoms) was Nb:Fe:C:N:O=1: 0.10:3.51:0.72:2.84.

Further, the BET specific surface area of the catalyst (c1) was 173.7 $m^2/g$.

2. Production of Fuel Cell Electrode and Evaluation of Oxygen Reducing Ability A fuel cell electrode (c1) was produced and the oxygen reducing ability thereof was evaluated by the same method as in Example 1 except that 0.095 g of the catalyst (c1) was used instead of 0.095 g of the catalyst (1).

Figure 66:
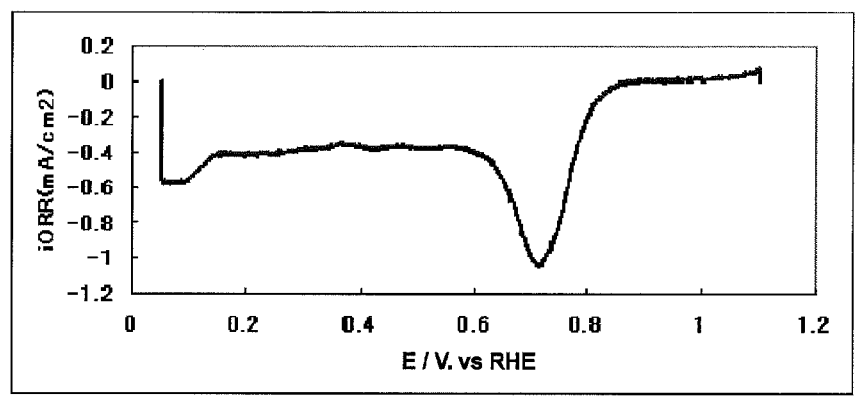
FIG. 66 is an oxygen reduction current density-potential curve of a fuel cell electrode (c1) of Comparative Example 1.

The measurement result is shown in FIG. 66. The catalyst (c1) had an oxygen reduction onset potential of 0.90 V (vs. RHE) and an oxygen reduction current density of 0.194 $mA/cm^2$ at 0.80 V.

Comparative Example 2

1. Production of Catalyst

The same operation as in Example 1 was carried out, except that neither tetraethylammonium tetrafluoroborate nor iron acetate was used, to obtain 239 mg of a powdery catalyst (c2). The weight of the powder for burning obtained in this process was 10.7 g.

Figure 67:
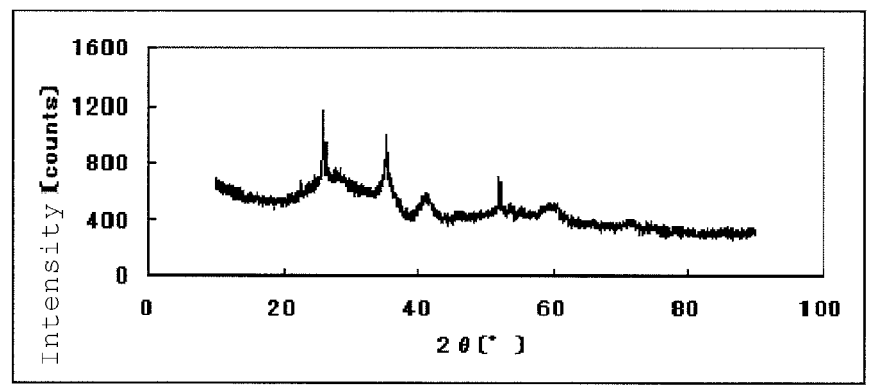
FIG. 67 is a powder X-ray diffraction spectrum of a catalyst (c2) of Comparative Example 2.

The powder X-ray diffraction spectrum of the catalyst (c2) is shown in FIG. 67.

The rate of each element constituting the catalyst (c2) (proportion of the number of atoms) was Nb:C:N:O=1:3.17: 0.72:2.84.

Further, the BET specific surface area of the catalyst (c2) was 167.2 $m^2/g$.

2. Production of Fuel Cell Electrode and Evaluation of Oxygen Reducing Ability A fuel cell electrode (c2) was produced and the oxygen reducing ability thereof was evaluated by the same method as in Example 1 except that 0.095 g of the catalyst (c2) was used instead of 0.095 g of the catalyst (1).

Figure 68:
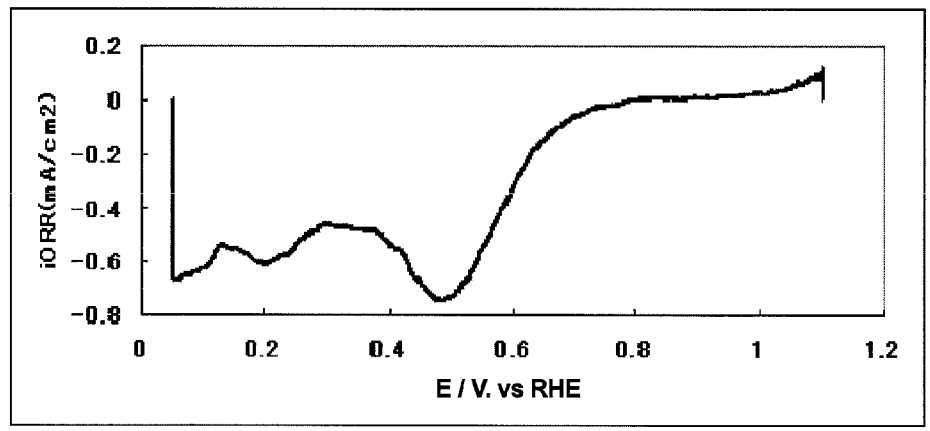
FIG. 68 is an oxygen reduction current density-potential curve of a fuel cell electrode (c2) of Comparative Example 2.

The measurement result is shown in FIG. 68. The catalyst (c2) had an oxygen reduction onset potential of 0.78 V (vs. RHE) and an oxygen reduction current density of 0.001 $mA/cm^2$ at 0.80 V.

Comparative Example 3

1. Production of Catalyst

The same operation as in Example 5 was carried out, except that tetraethylammoniumtetrafluoroborate was not used, to obtain 361 mg of a powdery catalyst (c3). The weight of the powder for burning obtained in this process was 11.5 g.

Figure 69:
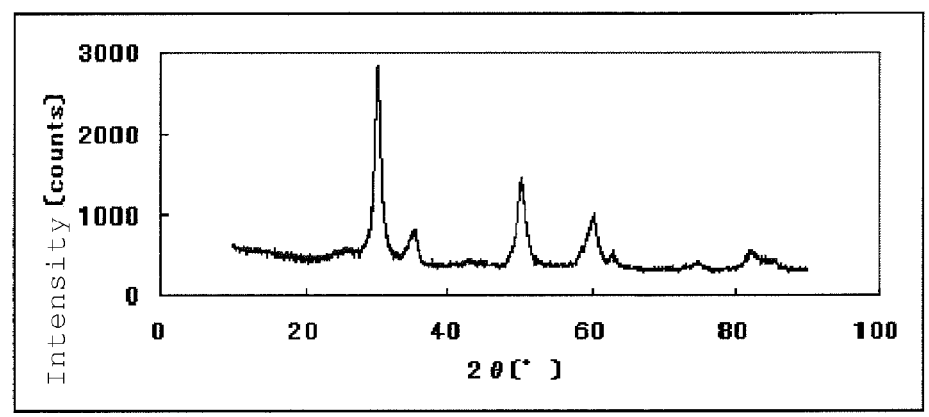
FIG. 69 is a powder X-ray diffraction spectrum of a catalyst (c3) of Comparative Example 3.

The powder X-ray diffraction spectrum of the catalyst (c3) is shown in FIG. 69.

The rate of each element constituting the catalyst (c3) (proportion of the number of atoms) was Zr:Fe:C:N:O=1: 0.08:6.49:0.08:2.64.

Further, the BET specific surface area of the catalyst (c3) was 163 $m^2/g$.

2. Production of Fuel Cell Electrode and Evaluation of Oxygen Reducing Ability A fuel cell electrode (c3) was produced and the oxygen reducing ability thereof was evaluated by the same method as in Example 1 except that 0.095 g of the catalyst (c3) was used instead of 0.095 g of the catalyst (1).

Figure 70:
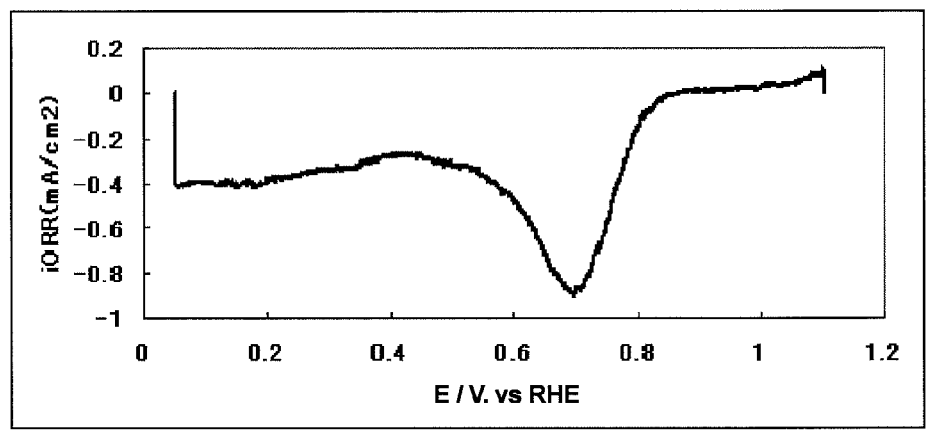
FIG. 70 is an oxygen reduction current density-potential curve of a fuel cell electrode (c3) of Comparative Example 3.

The measurement result is shown in FIG. 70. The catalyst (c3) had an oxygen reduction onset potential of 0.87 V (vs. RHE) and an oxygen reduction current density of 0.142 $mA/cm^2$ at 0.80 V.

Comparative Example 4

1. Production of Catalyst

The same operation as in Example 5 was carried out, except that neither 5% NAFION (registered trademark) solution nor iron acetate was used, to obtain 348 mg of a powdery catalyst (c4). The weight of the powder for burning obtained in this process was 11.8 g.

Figure 71:
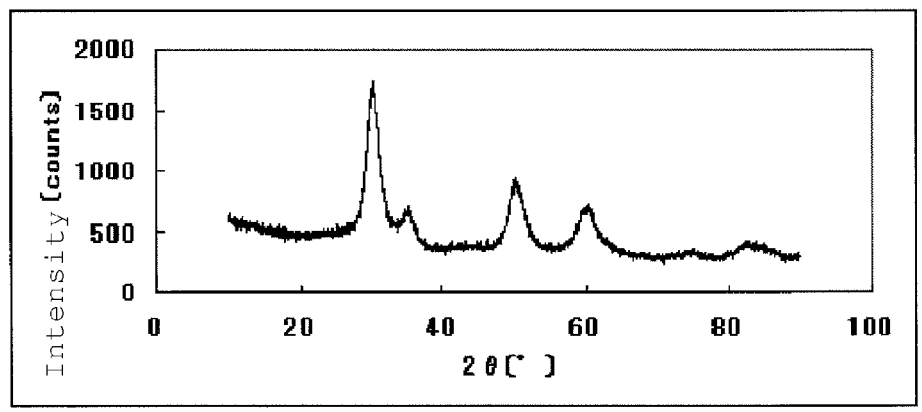
FIG. 71 is a powder X-ray diffraction spectrum of a catalyst (c4) of Comparative Example 4.

The powder X-ray diffraction spectrum of the catalyst (c4) is shown in FIG. 71.

The rate of each element constituting the catalyst (c4) (proportion of the number of atoms) was Zr:C:N:O=1:5.68: 0.28:2.73.

Further, the BET specific surface area of the catalyst (c4) was 32.7 $m^2/g$.

2. Production of Fuel Cell Electrode and Evaluation of Oxygen Reducing Ability A fuel cell electrode (c4) was produced and the oxygen reducing ability thereof was evaluated by the same method as in Example 1 except that 0.095 g of the catalyst (c4) was used instead of 0.095 g of the catalyst (1).

Figure 72:
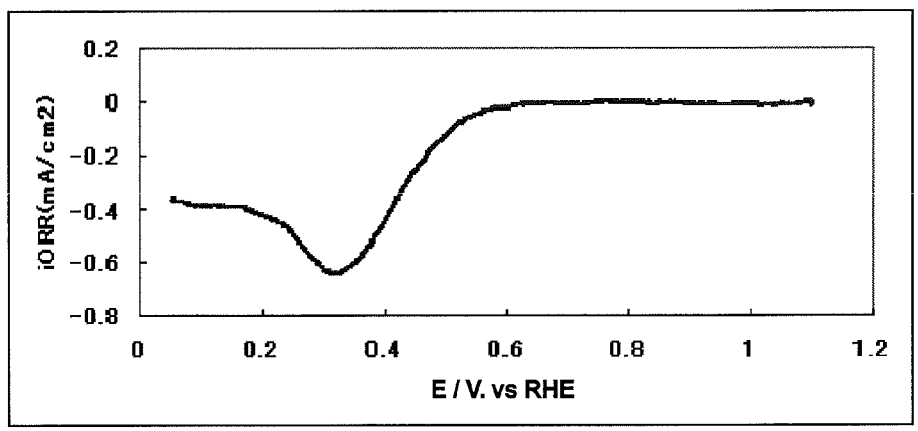
FIG. 72 is an oxygen reduction current density-potential curve of a fuel cell electrode (c4) of Comparative Example 4.

The measurement result is shown in FIG. 72. The catalyst (c4) had an oxygen reduction onset potential of 0.75 V (vs. RHE) and an oxygen reduction current density of 0.002 $mA/cm^2$ at 0.80 V.

Comparative Example 5

1. Production of Catalyst

The same operation as in Example 10 was carried out, except that a 5% NAFION (registered trademark) solution was not used, to obtain 435 mg of a powdery catalyst (c5). The weight of the powder for burning obtained in this process was 9.21 g.

Figure 73:
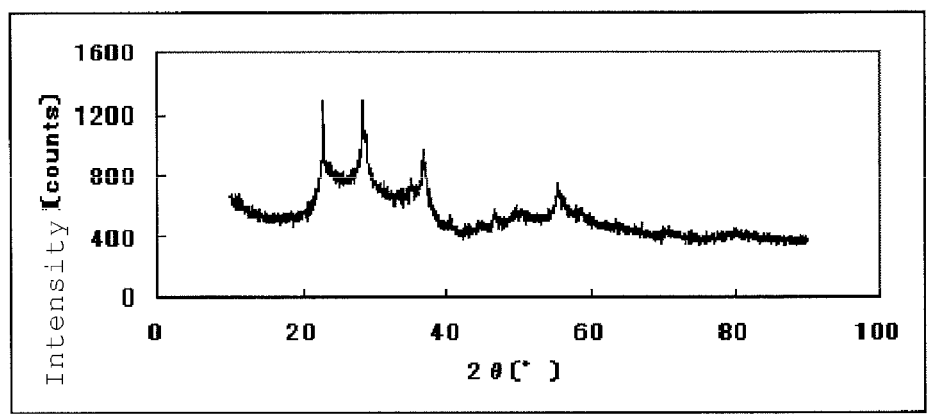
FIG. 73 is a powder X-ray diffraction spectrum of a catalyst (c5) of Comparative Example 5.

The powder X-ray diffraction spectrum of the catalyst (c5) is shown in FIG. 73.

The rate of each element constituting the catalyst (c5) (proportion of the number of atoms) was Ta:Fe:C:N:O=1: 0.09:3.84:0.47:2.72.

Further, the BET specific surface area of the catalyst (c5) was 12.5 $m^2/g$.

2. Production of Fuel Cell Electrode and Evaluation of Oxygen Reducing Ability A fuel cell electrode (c5) was produced and the oxygen reducing ability thereof was evaluated by the same method as in Example 1 except that 0.095 g of the catalyst (c5) was used instead of 0.095 g of the catalyst (1).

Figure 74:
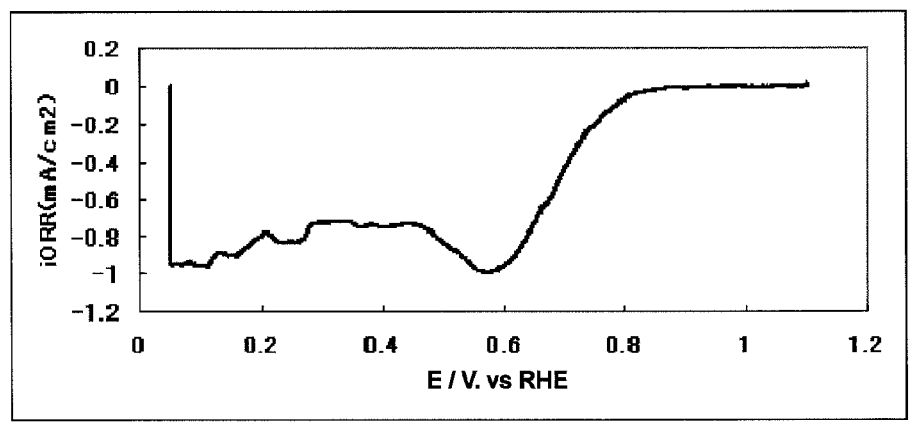
FIG. 74 is an oxygen reduction current density-potential curve of a fuel cell electrode (c5) of Comparative Example 5.

The measurement result is shown in FIG. 74. The catalyst (c5) had an oxygen reduction onset potential of 0.95 V (vs. RHE) and an oxygen reduction current density of 0.068 $mA/cm^2$ at 0.80 V.

Comparative Example 6

1. Production of Catalyst

The same operation as in Example 11 was carried out, except that iron acetate was not used, to obtain 330 mg of a powdery catalyst (c6). The weight of the powder for burning obtained in this process was 11.1 g.

Figure 75:
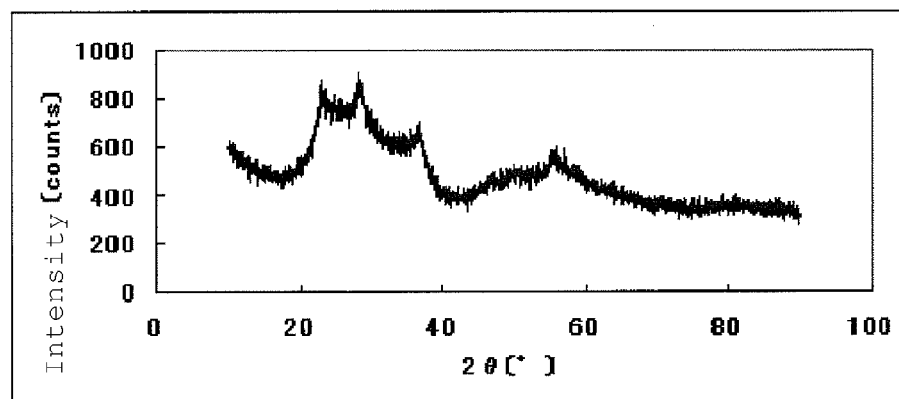
FIG. 75 is a powder X-ray diffraction spectrum of a catalyst (c6) of Comparative Example 6.

The powder X-ray diffraction spectrum of the catalyst (c6) is shown in FIG. 75.

The rate of each element constituting the catalyst (c6) (proportion of the number of atoms) was Ta:C:N:O=1:3.61: 0.48:2.95.

Further, the BET specific surface area of the catalyst (c6) was 4.2 $m^2/g$.

2. Production of Fuel Cell Electrode and Evaluation of Oxygen Reducing Ability A fuel cell electrode (c6) was produced and the oxygen reducing ability thereof was evaluated by the same method as in Example 1 except that 0.095 g of the catalyst (c6) was used instead of 0.095 g of the catalyst (1).

Figure 76:
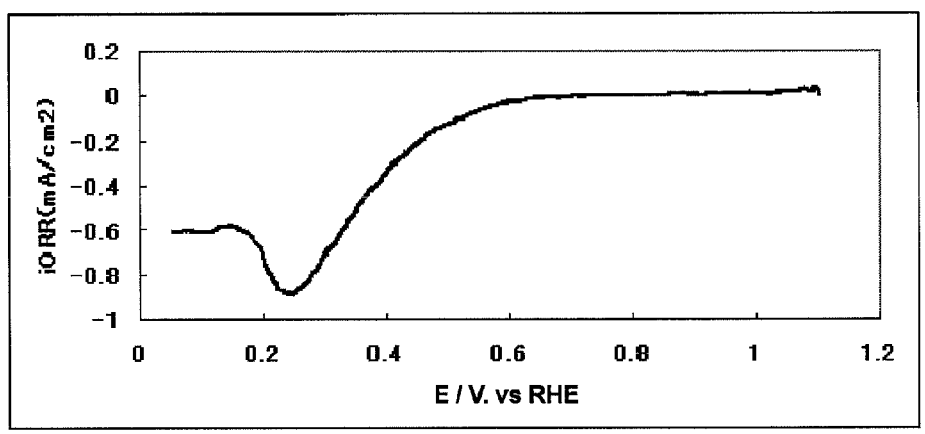
FIG. 76 is an oxygen reduction current density-potential curve of a fuel cell electrode (c6) of Comparative Example 6.

The measurement result is shown in FIG. 76. The catalyst (c6) had an oxygen reduction onset potential of 0.70 V (vs. RHE) and an oxygen reduction current density of 0.002 $mA/cm^2$ at 0.80 V.

Comparative Example 7

1. Production of Catalyst

The same operation as in Example 12 was carried out, except that tetrafluoroboric acid was not used, to obtain 224 mg of a powdery catalyst (c7). The weight of the powder for burning obtained in this process was 11.1 g.

Figure 77:
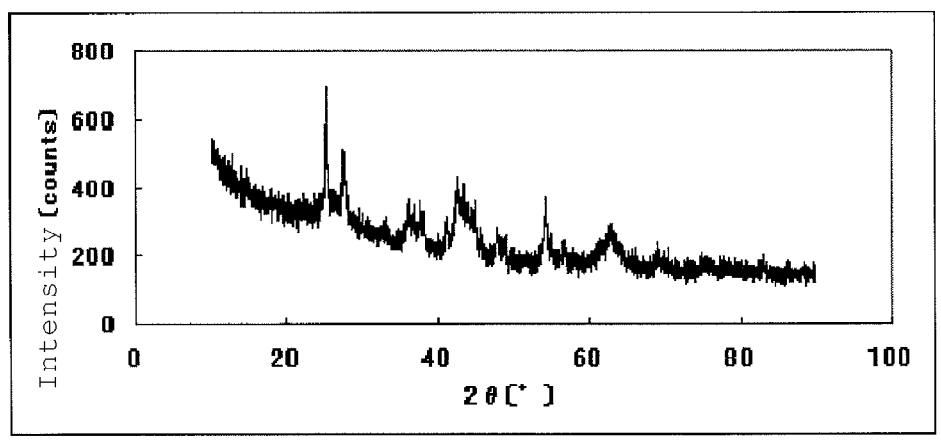
FIG. 77 is a powder X-ray diffraction spectrum of a catalyst (c7) of Comparative Example 7.

The powder X-ray diffraction spectrum of the catalyst (c7) is shown in FIG. 77.

The rate of each element constituting the catalyst (c7) (proportion of the number of atoms) was Ti:Fe:C:N:O=1: 0.10:1.80:0.17:1.20.

Further, the BET specific surface area of the catalyst (c7) was 196.4 $m^2/g$.

2. Production of Fuel Cell Electrode and Evaluation of Oxygen Reducing Ability A fuel cell electrode (c7) was produced and the oxygen reducing ability thereof was evaluated by the same method as in Example 1 except that 0.095 g of the catalyst (c7) was used instead of 0.095 g of the catalyst (1).

Figure 78:
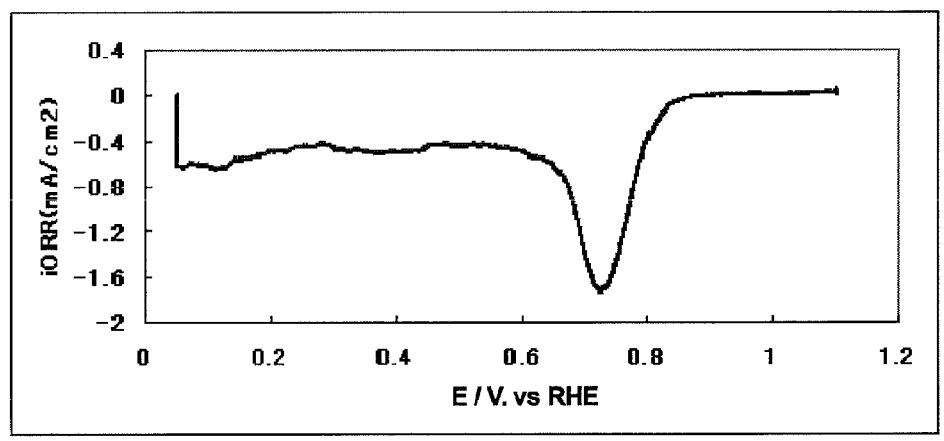
FIG. 78 is an oxygen reduction current density-potential curve of a fuel cell electrode (c7) of Comparative Example 7.

The measurement result is shown in FIG. 78. The catalyst (c7) had an oxygen reduction onset potential of 0.91 V (vs. RHE) and an oxygen reduction current density of 0.497 $VmA/cm^2$ at 0.80 V.

Comparative Example 8

1. Production of Catalyst

The same operation as in Example 12 was carried out, except that neither tetrafluoroboric acid nor iron acetate was used, to obtain 186 mg of a powdery catalyst (c8). The weight of the powder for burning obtained in this process was 10.8 g.

Figure 79:
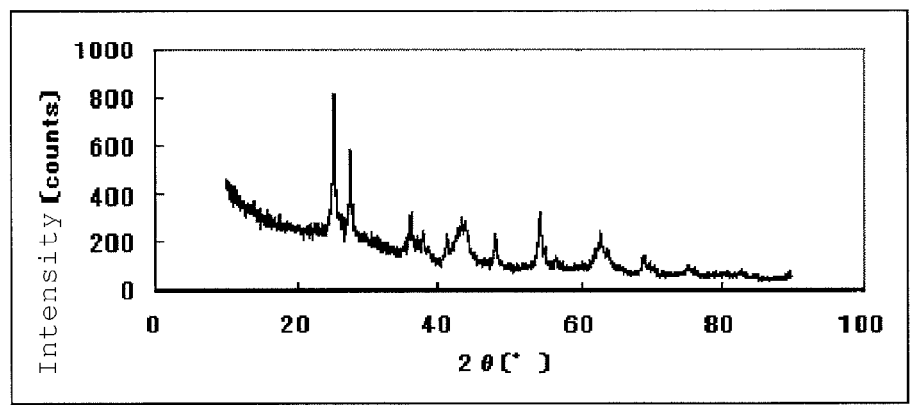
FIG. 79 is a powder X-ray diffraction spectrum of a catalyst (c8) of Comparative Example 8.

The powder X-ray diffraction spectrum of the catalyst (c8) is shown in FIG. 79.

The rate of each element constituting the catalyst (c8) (proportion of the number of atoms) was Ti:C:N:O=1:1.72: 0.32:1.65.

Further, the BET specific surface area of the catalyst (c8) was 224.2 $m^2/g$.

2. Production of Fuel Cell Electrode and Evaluation of Oxygen Reducing Ability A fuel cell electrode (c8) was produced and the oxygen reducing ability thereof was evaluated by the same method as in Example 1 except that 0.095 g of the catalyst (c8) was used instead of 0.095 g of the catalyst (1).

Figure 80:
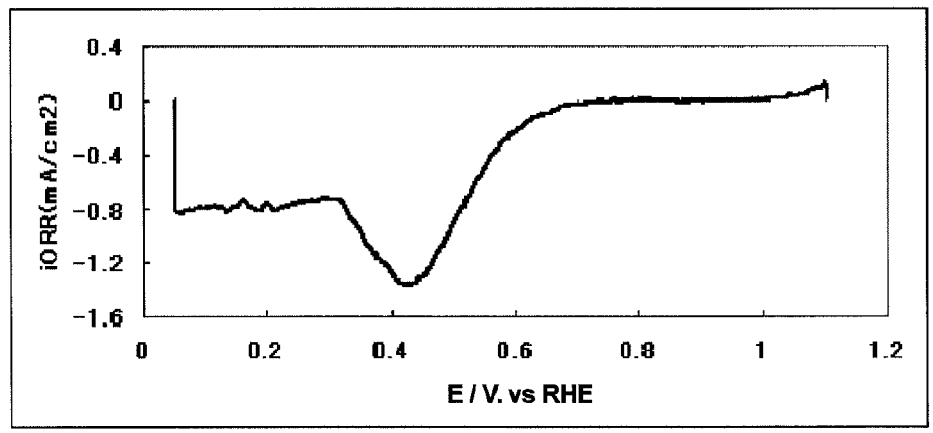
FIG. 80 is an oxygen reduction current density-potential curve of a fuel cell electrode (c8) of Comparative Example 8.

The measurement result is shown in FIG. 80. The catalyst (c8) had an oxygen reduction onset potential of 0.75 V (vs. RHE) and an oxygen reduction current density of 0.006 mA/cm² at 0.80 V.

Comparative Example 9

1. Production of Catalyst

The same operation as in Example 12 was carried out, except that 109 mg of boric acid was used instead of tetrafluoroboric acid, to obtain 219 mg of a powdery catalyst (c9). The weight of the powder for burning obtained in this process was 11.0 g.

Figure 81:
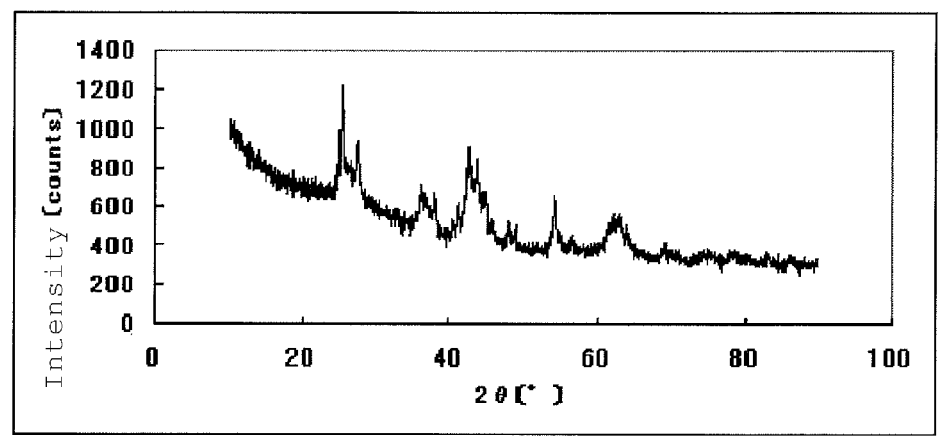
FIG. 81 is a powder X-ray diffraction spectrum of a catalyst (c9) of Comparative Example 9.

The powder X-ray diffraction spectrum of the catalyst (c9) is shown in FIG. 81.

The rate of each element constituting the catalyst (c9) (proportion of the number of atoms) was Ti:Fe:C:N:O:B=1:0.09:2.64:0.58:2.09:0.09.

Further, the BET specific surface area of the catalyst (c9) was 178.3 m²/g.

2. Production of Fuel Cell Electrode and Evaluation of Oxygen Reducing Ability

A fuel cell electrode (c9) was produced and the oxygen reducing ability thereof was evaluated by the same method as in Example 1 except that 0.095 g of the catalyst (c9) was used instead of 0.095 g of the catalyst (1).

Figure 82:
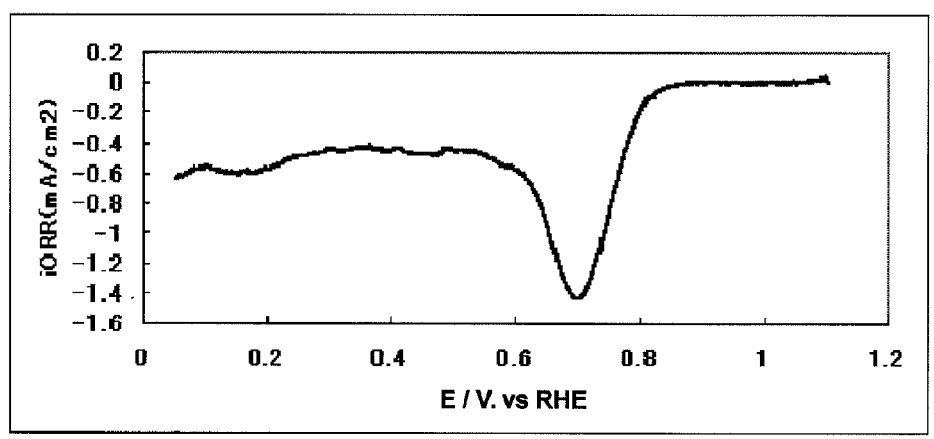
FIG. 82 is an oxygen reduction current density-potential curve of a fuel cell electrode (c9) of Comparative Example 9.

The measurement result is shown in FIG. 82. The catalyst (c9) had an oxygen reduction onset potential of 0.89 V (vs. RHE) and an oxygen reduction current density of 0.177 mA/cm² at 0.80 V.

Comparative Example 10

1. Production of Catalyst

The same operation as in Example 12 was carried out, except that 202 mg of ammonium dihydrogen phosphate was used instead of tetrafluoroboric acid, to obtain 213 mg of a powdery catalyst (c10). The weight of the powder for burning obtained in this process was 11.1 g.

Figure 83:
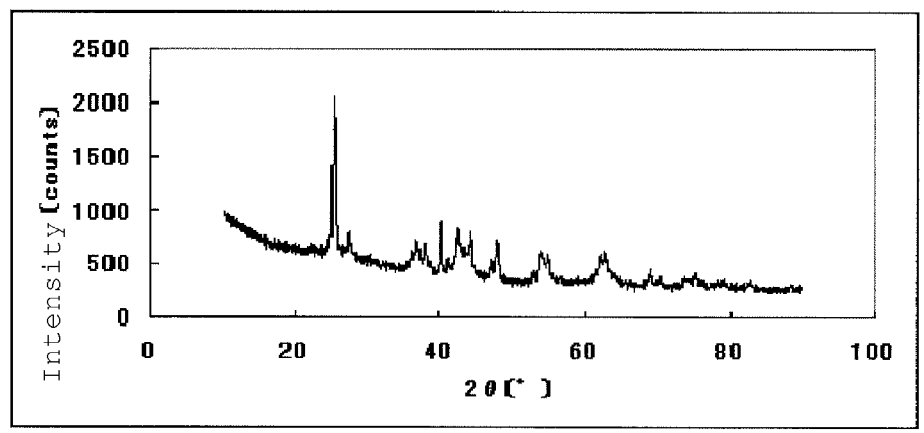
FIG. 83 is a powder X-ray diffraction spectrum of a catalyst (c10) of Comparative Example 10.

The powder X-ray diffraction spectrum of the catalyst (c10) is shown in FIG. 83.

The rate of each element constituting the catalyst (c10) (proportion of the number of atoms) was Ti:Fe:C:N:O:P=1:0.09:2.04:0.50:2.04:0.08.

Further, the BET specific surface area of the catalyst (c10) was 221 m²/g.

2. Production of Fuel Cell Electrode and Evaluation of Oxygen Reducing Ability

A fuel cell electrode (c10) was produced and the oxygen reducing ability thereof was evaluated by the same method as in Example 1 except that 0.095 g of the catalyst (c10) was used instead of 0.095 g of the catalyst (1).

Figure 84:
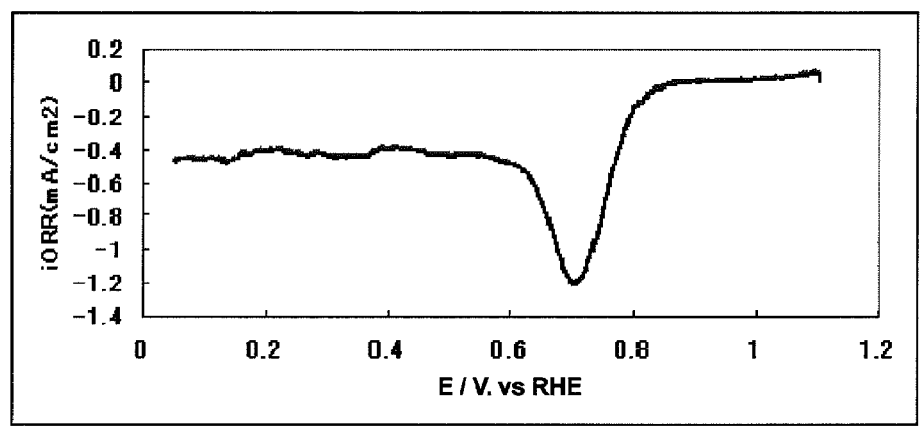
FIG. 84 is an oxygen reduction current density-potential curve of a fuel cell electrode (c10) of Comparative Example 10.

The measurement result is shown in FIG. 84. The catalyst (c10) had an oxygen reduction onset potential of 0.86 V (vs. RHE) and an oxygen reduction current density of 0.156 mA/cm² at 0.80 V.

Comparative Example 11

1. Production of Catalyst

The same operation as in Example 25 was carried out, except that NAFION (registered trademark) was not used, to obtain 265 mg of a powdery catalyst (c11). The weight of the powder for burning obtained in this process was 8.0 g.

Figure 85:
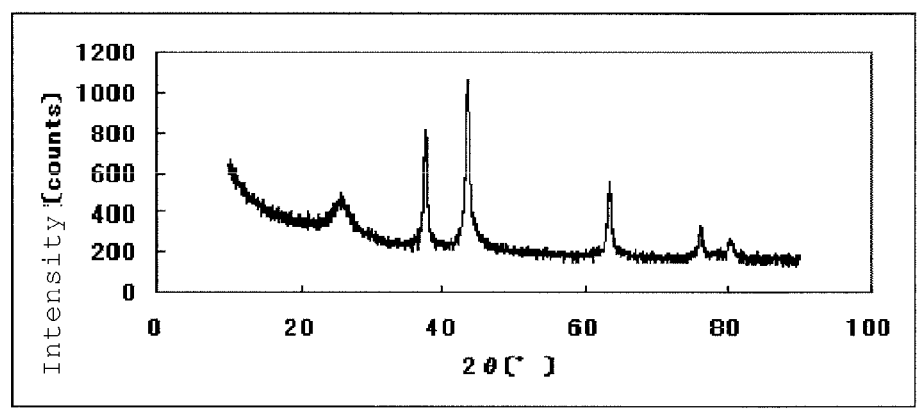
FIG. 85 is an oxygen reduction current density-potential curve of a fuel cell electrode (c11) of Comparative Example 11.

The powder X-ray diffraction spectrum of the catalyst (c11) is shown in FIG. 85.

The rate of each element constituting the catalyst (c11) (proportion of the number of atoms) was V:Fe:C:N:O=1:0.10:6.64:0.89:1.70.

Further, the BET specific surface area of the catalyst (c11) was 50.6 m²/g.

2. Production of Fuel Cell Electrode and Evaluation of Oxygen Reducing Ability

A fuel cell electrode (c11) was produced and the oxygen reducing ability thereof was evaluated by the same method as in Example 1 except that 0.095 g of the catalyst (c11) was used instead of 0.095 g of the catalyst (1).

Figure 86:
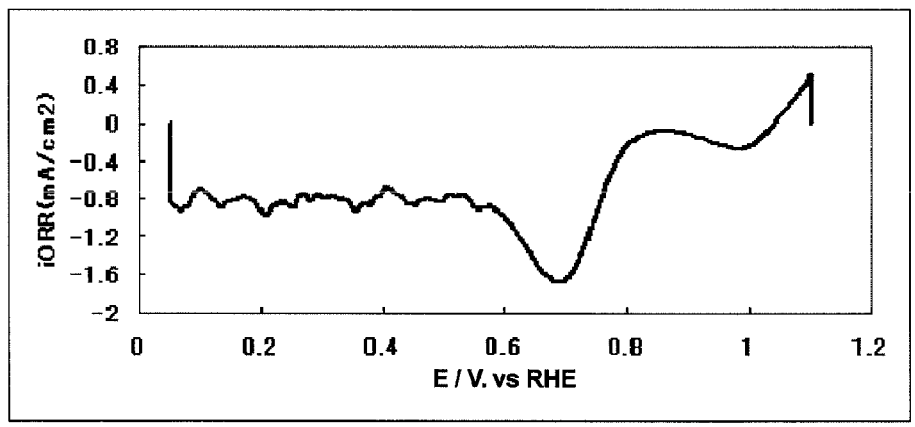
FIG. 86 is an oxygen reduction current density-potential curve of a fuel cell electrode (c11) of Comparative Example 11.

The measurement result is shown in FIG. 86. The catalyst (c11) had an oxygen reduction onset potential of 0.86 V (vs. RHE) and an oxygen reduction current density of 0.233 mA/cm² at 0.80 V.

Comparative Example 12

1. Production of Catalyst

The same operation as in Example 26 was carried out, except that a 5% NAFION (registered trademark) solution was not used, to obtain 274 mg of a powdery catalyst (c12). The weight of the powder for burning obtained in this process was 10.6 g.

Figure 87:
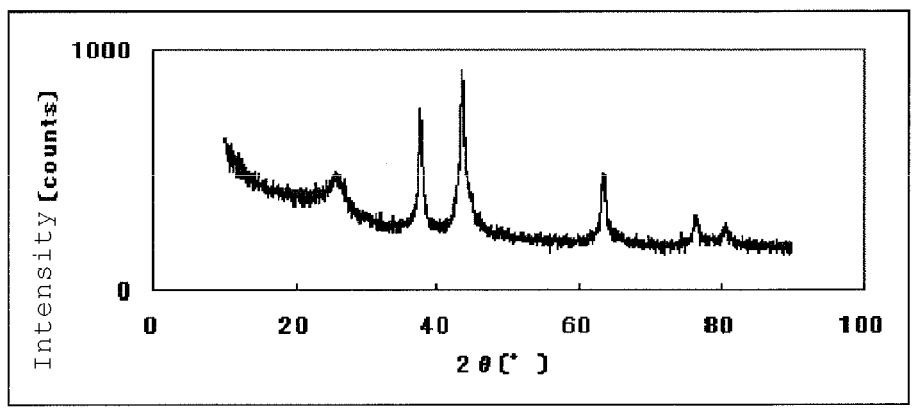
FIG. 87 is an oxygen reduction current density-potential curve of a fuel cell electrode (c12) of Comparative Example 12.

The powder X-ray diffraction spectrum of the catalyst (c12) is shown in FIG. 87.

The rate of each element constituting the catalyst (c12) (proportion of the number of atoms) was V:Fe:C:N:O=1:0.09:6.1:0.88:1.85.

Further, the BET specific surface area of the catalyst (c12) was 170.1 m²/g.

2. Production of Fuel Cell Electrode and Evaluation of Oxygen Reducing Ability

A fuel cell electrode (c12) was produced and the oxygen reducing ability thereof was evaluated by the same method as in Example 1 except that 0.095 g of the catalyst (c12) was used instead of 0.095 g of the catalyst (1).

Figure 88:
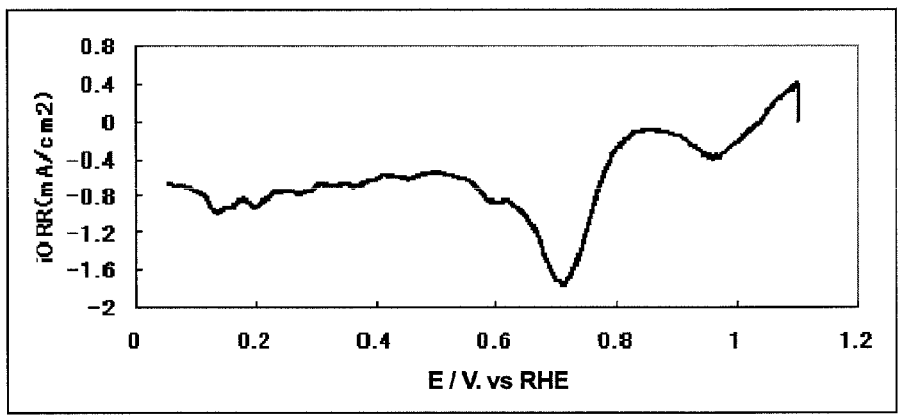
FIG. 88 is an oxygen reduction current density-potential curve of a fuel cell electrode (c12) of Comparative Example 12.

The measurement result is shown in FIG. 88. The catalyst (c12) had an oxygen reduction onset potential of 0.85 V (vs. RHE) and an oxygen reduction current density of 0.297 mA/cm² at 0.80 V.

Comparative Example 13

1. Production of Catalyst

To a mixed liquid of 15 mL of ethanol and 5 mL of acetic acid, 9.37 g of titanium tetraisopropoxide (manufactured by Junsei Chemical Co., Ltd.) and 5.12 g of acetylacetone (manufactured by Junsei Chemical Co., Ltd.) were added and stirred at room temperature to prepare a titanium solution. Further, 8.30 g of ethylene glycol and 0.582 g of iron acetate (manufactured by Aldrich) were added to 20 mL of pure water, and stirred at room temperature and completely dissolved, to prepare an ethylene glycol solution. The titanium solution was slowly added to the ethylene glycol solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder for burning.

This powder was introduced to a tubular furnace; and the powder was heated to 890° C. under the nitrogen atmosphere containing 4% by volume of a hydrogen gas at a temperature-raising rate of 10° C./min, was held at 890° C. for 1 hour, and then subjected to natural cooling, to provide a powdery catalyst (c13).

The rate of each element constituting the catalyst (c13) (proportion of the number of atoms) was Ti:Fe:C:N:O=0.96:0.04:0.96:0.01:1.04.

Further, the BET specific surface area of the catalyst (c13) was 77 $m^2/g$.

2. Production of Fuel Cell Electrode and Evaluation of Oxygen Reducing Ability A fuel cell electrode (c13) was produced and the oxygen reducing ability thereof was evaluated by the same method as in Example 1 except that 0.095 g of the catalyst (c13) was used instead of 0.095 g of the catalyst (1).

Figure 89:
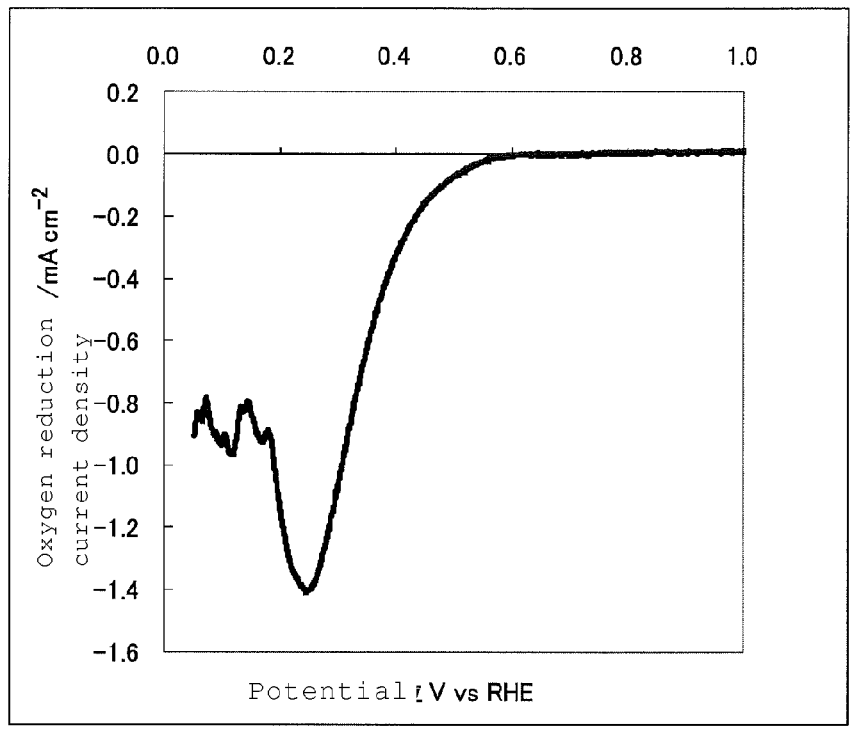
FIG. 89 is an oxygen reduction current density-potential curve of a fuel cell electrode (c13) of Comparative Example 13.

The measurement result is shown in FIG. 89. The catalyst (c13) was an oxygen reduction onset potential of 0.62 V (vs. RHE) and an oxygen reduction current density of 0.000 $mA/cm^2$ at 0.80 V.

Comparative Example 14

1. Production of Catalyst

The same operation as in Comparative Example 13 was carried out, except that 12.05 g of oxalic acid was used instead of ethylene glycol, to obtain a powdery catalyst (c14).

The rate of each element constituting the catalyst (c14) (proportion of the number of atoms) was Ti:Fe:C:N:O=0.96:0.04:0.94:0.02:0.89.

Further, the BET specific surface area of the catalyst (c14) was 3.6 $m^2/g$.

2. Production of Fuel Cell Electrode and Evaluation of Oxygen Reducing Ability A fuel cell electrode (c14) was produced and the oxygen reducing ability thereof was evaluated by the same method as in Example 1 except that 0.095 g of the catalyst (c14) was used instead of 0.095 g of the catalyst (1).

Figure 90:
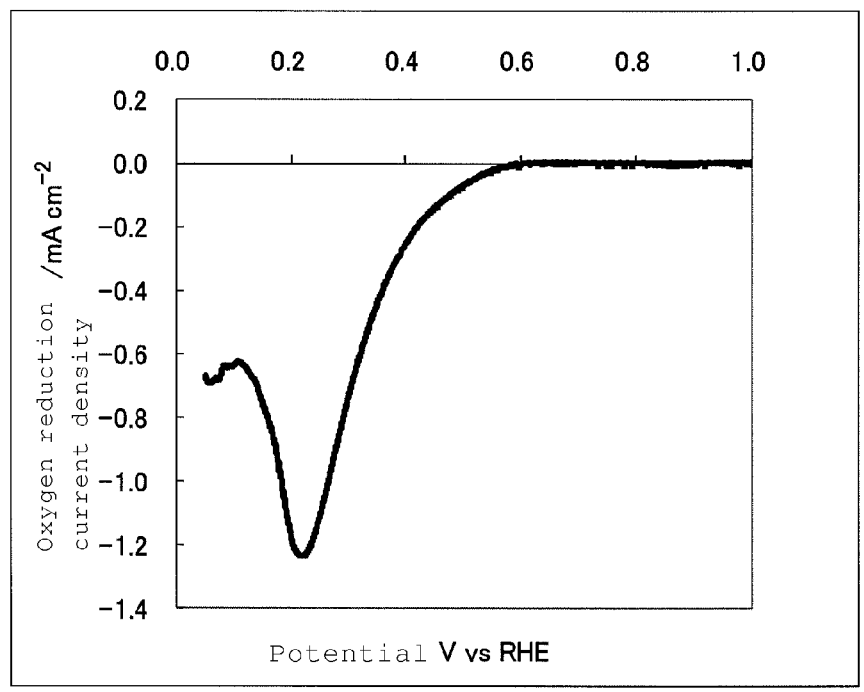
FIG. 90 is an oxygen reduction current density-potential curve of a fuel cell electrode (c14) of Comparative Example 14.

The measurement result is shown in FIG. 90. The catalyst (c14) had an oxygen reduction onset potential of 0.64 V (vs. RHE) and an oxygen reduction current density of 0.000 $mA/cm^2$ at 0.80 V.

Comparative Example 15

1. Production of Catalyst

The same operation as in Comparative Example 13 was carried out, except that 10.18 g of glycolic acid was used instead of ethylene glycol, to obtain a powdery catalyst (c15).

The rate of each element constituting the catalyst (c15) (proportion of the number of atoms) was Ti:Fe:C:N:O=0.95:0.05:0.96:0.01:1.02.

Further, the BET specific surface area of the catalyst (c15) was 229 $m^2/g$.

2. Production of Fuel Cell Electrode and Evaluation of Oxygen Reducing Ability A fuel cell electrode (c15) was produced and the oxygen reducing ability thereof was evaluated by the same method as in Example 1 except that 0.095 g of the catalyst (c15) was used instead of 0.095 g of the catalyst (1).

Figure 91:
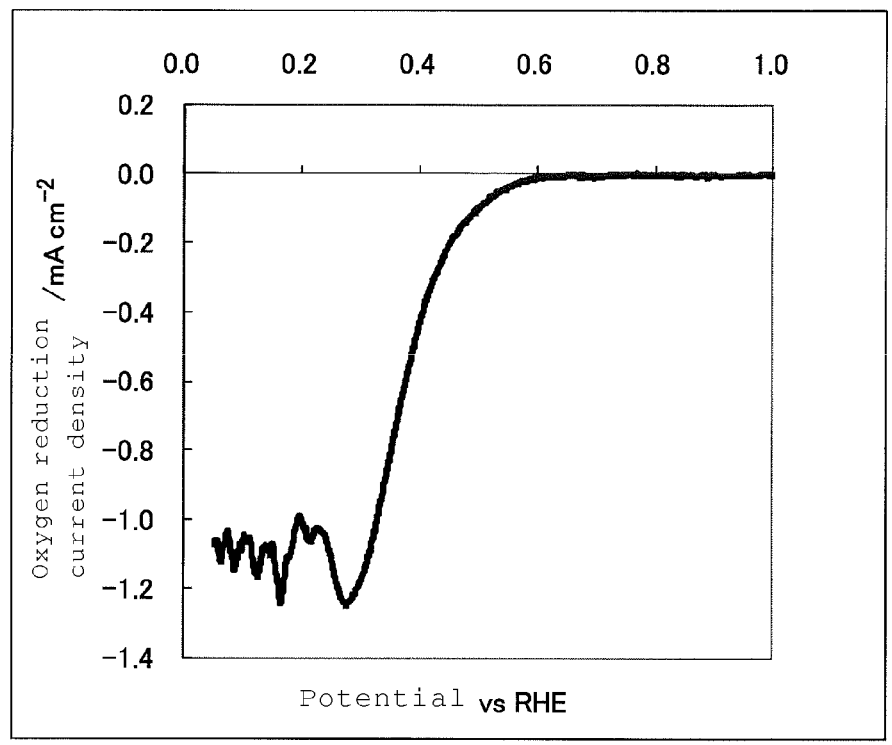
FIG. 91 is an oxygen reduction current density-potential curve of a fuel cell electrode (c15) of Comparative Example 15.

The measurement result is shown in FIG. 91. The catalyst (c15) had an oxygen reduction onset potential of 0.76 V (vs. RHE) and an oxygen reduction current density of 0.000 $mA/cm^2$ at 0.80 V.

Comparative Example 16

1. Production of Catalyst

Titanium oxide (anatase type, 100 $m^2/g$) was introduced to a tubular furnace; and the powder was heated to 900° C. under the nitrogen atmosphere containing 4% by volume of a hydrogen gas at a temperature-raising rate of 10° C./min, was held at 900° C. for 1 hour, and then subjected to natural cooling, to provide a powdery catalyst (c16).

The rate of each element constituting the catalyst (c16) (proportion of the number of atoms) was Ti:O=1:1.8.

Further, the BET specific surface area of the catalyst (c16) was 9.4 $m^2/g$.

2. Production of Fuel Cell Electrode and Evaluation of Oxygen Reducing Ability A fuel cell electrode (c16) was produced and the oxygen reducing ability thereof was evaluated by the same method as in Example 1 except that 0.095 g of the catalyst (c16) was used instead of 0.095 g of the catalyst (1).

Figure 92:
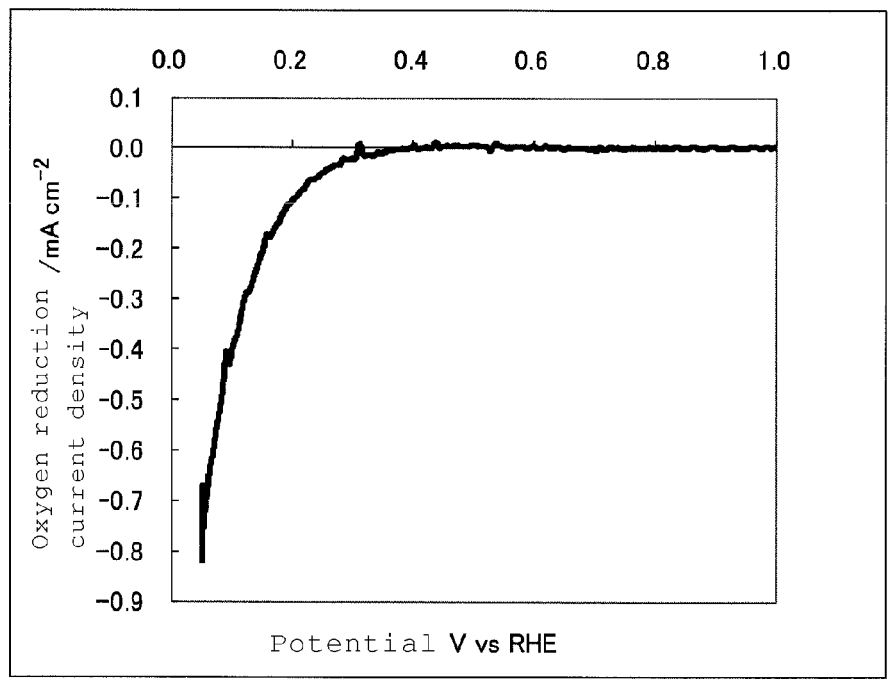
FIG. 92 is an oxygen reduction current density-potential curve of a fuel cell electrode (c16) of Comparative Example 16.

The measurement result is shown in FIG. 92. The catalyst (c16) had an oxygen reduction onset potential of 0.47 V (vs. RHE) and an oxygen reduction current density of 0.000 $mA/cm^2$ at 0.80 V.

Comparative Example 17

1. Production of Catalyst

In a mortar, 2 g of titanium oxide (anatase type, 100 $m^2/g$) and 0.75 g of carbon black (VULCAN (registered trademark) XC72, manufactured by Cabot Corporation) were thoroughly mixed; and the mixture was introduced to a tubular furnace, was heated to 1700° C. under the nitrogen atmosphere containing 4% by volume of a hydrogen gas at a temperature-raising rate of 10° C./min, was held at 1700° C. for 3 hours, and then subjected to natural cooling, to provide a powdery catalyst (c17).

The rate of each element constituting the catalyst (c17) (proportion of the number of atoms) was Ti:C:N:O=1:0.52:0.48:0.01.

The BET specific surface area of the catalyst (c17) was 1.8 $m^2/g$.

2. Production of Fuel Cell Electrode and Evaluation of Oxygen Reducing Ability A fuel cell electrode (c17) was produced and the oxygen reducing ability thereof was evaluated by the same method as in Example 1 except that 0.095 g of the catalyst (c17) was used instead of 0.095 g of the catalyst (1).

Figure 93:
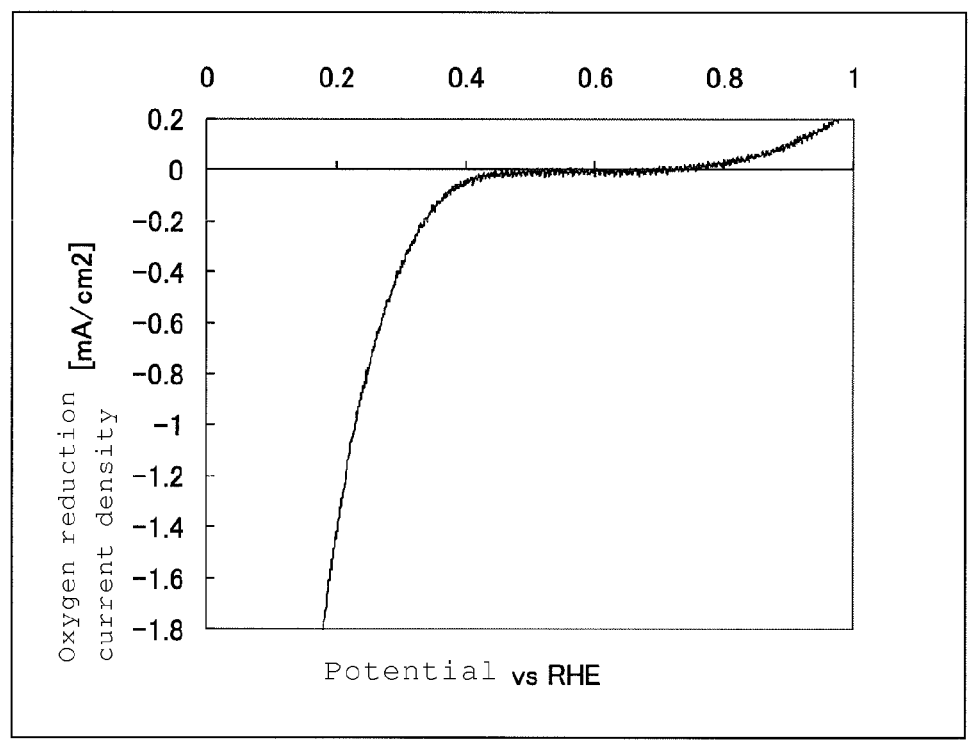
FIG. 93 is an oxygen reduction current density-potential curve of a fuel cell electrode (c17) of Comparative Example 17.

The measurement result is shown in FIG. 93. The catalyst (c17) had an oxygen reduction onset potential of 0.55 V (vs. RHE) and an oxygen reduction current density of 0.000 $mA/cm^2$ at 0.80 V.

In Table 1, there is listed each measurement result of the proportions of the numbers of the atoms, oxygen reduction onset potentials, and oxygen reduction current densities of the catalysts obtained in Examples 1 to 30. Furthermore, the measurement results of the maximum output densities in Examples 13, 14, and 28 are also listed.

TABLE 1

| | Proportion of the Number of Atoms | | | | | | | | | | | | | Oxygen Reduction Onset Potential/ V vs RHE | Oxygen Reduction Current Density @ 0.80 V (mA/cm$^2$) | Maximum Power Density (mW/cm$^2$) |
|---|---|---|---|---|---|---|---|---|---|---|---|---|---|---|---|---|
| | Nb | Zr | Ta | Ti | V | Fe | C | N | O | B | P | S | F | | | |
| Example 1 | 0.91 | | | | | 0.09 | 2.91 | 0.50 | 2.52 | 0.036 | | | 0.001 | 1.02 | 0.266 | |
| Example 2 | 0.91 | | | | | 0.09 | 4.09 | 1.00 | 1.85 | | | 0.012 | 0.001 | 0.96 | 0.645 | |
| Example 3 | 0.91 | | | | | 0.09 | 4.25 | 0.91 | 1.96 | | | 0.045 | 0.001 | 0.95 | 0.570 | |
| Example 4 | 1 | | | | | | 4.51 | 0.72 | 2.64 | | | 0.006 | 0.001 | 0.83 | 0.010 | |
| Example 5 | | 0.93 | | | | 0.07 | 5.45 | 0.36 | 2.51 | | | 0.006 | 0.083 | 0.95 | 0.997 | |
| Example 6 | | 0.93 | | | | 0.07 | 5.63 | 0.46 | 2.51 | | | 0.011 | 0.074 | 0.96 | 0.603 | |
| Example 7 | | 0.93 | | | | 0.07 | 5.43 | 0.14 | 2.08 | 0.037 | | | 0.009 | 1.00 | 0.768 | |
| Example 8 | | 0.93 | | | | 0.07 | 5.28 | 0.34 | 2.45 | | | 0.005 | 0.143 | 1.02 | 0.516 | |
| Example 9 | | 1 | | | | | 5.82 | 0.42 | 2.82 | | | 0.001 | 0.090 | 0.94 | 0.065 | |
| Example 10 | | | 0.92 | | | 0.08 | 3.15 | 0.39 | 2.35 | | | 0.012 | 0.028 | 0.92 | 0.087 | |
| Example 11 | | | 1 | | | | 3.30 | 0.38 | 2.42 | | | 0.009 | 0.030 | 0.87 | 0.006 | |
| Example 12 | | | | 0.93 | | 0.07 | 2.64 | 0.28 | 2.13 | 0.030 | | | 0.005 | 0.92 | 0.550 | |
| Example 13 | | | | 0.91 | | 0.09 | 2.15 | 0.28 | 1.91 | | 0.091 | | 0.006 | 0.97 | 0.580 | 559 |
| Example 14 | | | | 0.93 | | 0.07 | 2.63 | 0.11 | 1.43 | 0.028 | | | 0.002 | 0.93 | 0.654 | 822 |
| Example 15 | | | | 0.90 | | 0.10 | 2.98 | 0.39 | 1.46 | | | 0.027 | 0.005 | 0.97 | 1.300 | |
| Example 16 | | | | 0.89 | | 0.11 | 3.96 | 0.46 | 2.13 | 0.036 | | | 0.006 | 0.90 | 0.428 | |
| Example 17 | 0.07 | | | 0.85 | | 0.08 | 2.87 | 0.35 | 1.31 | | | 0.008 | 0.003 | 0.95 | 1.070 | |
| Example 18 | | | | 0.92 | | 0.08 | 2.30 | 0.36 | 1.53 | | | 0.006 | 0.002 | 0.95 | 0.880 | |
| Example 19 | | | | 0.92 | | 0.08 | 2.50 | 0.59 | 1.07 | | | 0.006 | 0.002 | 0.93 | 1.070 | |
| Example 20 | | | | 0.81 | | 0.19 | 5.20 | 0.69 | 1.11 | | | 0.021 | 0.015 | 0.94 | 0.709 | |
| Example 21 | | | | 0.92 | | 0.08 | 2.77 | 0.28 | 1.14 | | | 0.006 | 0.003 | 0.95 | 1.233 | |
| Example 22 | | | | 0.93 | | 0.07 | 2.28 | 0.24 | 1.93 | 0.031 | | | 0.005 | 0.94 | 0.606 | |
| Example 23 | | | | 0.92 | | 0.08 | 2.09 | 0.34 | 1.43 | | | 0.010 | 0.002 | 0.93 | 1.070 | |
| Example 24 | | | | 0.91 | | 0.09 | 3.33 | 0.48 | 1.17 | | | 0.011 | 0.002 | 0.90 | 0.513 | |
| Example 25 | | | | 0.90 | | 0.10 | 3.49 | 0.29 | 1.31 | | | 0.009 | 0.003 | 0.88 | 0.083 | |
| Example 26 | | | | 0.90 | | 0.10 | 2.88 | 0.39 | 1.46 | | | 0.012 | 0.005 | 0.94 | 0.950 | |
| Example 27 | | | | 0.90 | | 0.10 | 3.98 | 0.40 | 1.36 | | | 0.025 | 0.010 | 0.94 | 0.856 | |
| Example 28 | | | | 1 | | | 2.46 | 0.19 | 0.95 | | | 0.002 | 0.003 | 0.87 | 0.049 | 510 |
| Example 29 | | | | | 0.93 | 0.07 | 5.03 | 0.88 | 1.59 | | | 0.015 | 0.006 | 0.92 | 0.257 | |
| Example 30 | | | | | 0.93 | 0.07 | 5.56 | 0.84 | 1.72 | | | 0.014 | 0.028 | 0.88 | 0.207 | |

In Table 2, there is listed each measurement result of the proportions of the numbers of the atoms of the metal elements, oxygen reduction current density, and BET specific surface area of the catalysts obtained in Examples 31 to 42.

TABLE 2

| | Proportion of the Number of Atoms | | | | | | | | | Oxygen Reduction Onset Potential/V vs RHE | Oxygen Reduction Current Density @ 0.80 V (mA/cm$^2$) | BET (m$^2$/g) |
|---|---|---|---|---|---|---|---|---|---|---|---|---|
| | Nb | Zr | Ta | Ti | Y | Al | Sb | Sn | Fe | | | |
| Example 31 | | | 0.33 | 0.67 | | | | | | 0.95 | 0.699 | 197.2 |
| Example 32 | | | 0.67 | 0.33 | | | | | | 0.97 | 0.506 | 177.2 |
| Example 33 | | 0.8 | | 0.2 | | | | | | 0.94 | 0.856 | 242.5 |
| Example 34 | | 0.2 | | 0.8 | | | | | | 0.91 | 1.002 | 209.3 |
| Example 35 | | | | 0.92 | 0.08 | | | | | 0.98 | 1.158 | 271 |
| Example 36 | | | | 0.97 | 0.03 | | | | | 0.96 | 1.321 | 275.1 |
| Example 37 | | 0.92 | | | 0.08 | | | | | 1.07 | 0.971 | 250.6 |
| Example 38 | | | | 0.67 | | | | 0.33 | | 1.01 | 0.708 | 316.8 |
| Example 39 | | | | 0.67 | | | 0.33 | | | 0.98 | 1.036 | 382 |
| Example 40 | | | | 0.95 | | 0.05 | | | | 0.97 | 0.998 | 271.5 |
| Example 41 | 0.95 | | | | | 0.05 | | | | 0.95 | 0.514 | 203.5 |
| Example 42 | | 0.9 | | | | 0.1 | | | | 0.97 | 0.491 | 249.4 |

In Table 3, there is listed each measurement result of the proportions of the numbers of the atoms, oxygen reduction onset potentials, and oxygen reduction current densities of the catalysts obtained in Comparative Examples 1 to 17.

TABLE 3

| | Proportion of the Number of Atoms | | | | | | | | | | | Oxygen Reduction Onset Potential/ | Oxygen Reduction Current Density @ 0.80 V |
|---|---|---|---|---|---|---|---|---|---|---|---|---|---|
| | Nb | Zr | Ta | Ti | V | Fe | C | N | O | B | P | S | V vs RHE | (mA/cm²) |
| Comp. Ex. 1 | 0.91 | | | | | 0.09 | 3.19 | 0.65 | 2.58 | | | | 0.90 | 0.194 |
| Comp. Ex. 2 | 1 | | | | | | 3.17 | 0.72 | 2.84 | | | | 0.78 | 0.001 |
| Comp. Ex. 3 | | 0.93 | | | | 0.07 | 6.01 | 0.07 | 2.44 | | | | 0.87 | 0.142 |
| Comp. Ex. 4 | | 1 | | | | | 5.68 | 0.28 | 2.73 | | | | 0.75 | 0.002 |
| Comp. Ex. 5 | | | 0.92 | | | 0.08 | 3.52 | 0.43 | 2.50 | | | | 0.95 | 0.068 |
| Comp. Ex. 6 | | | 1 | | | | 3.61 | 0.48 | 2.95 | | | | 0.70 | 0.002 |
| Comp. Ex. 7 | | | | 0.91 | | 0.09 | 1.64 | 0.15 | 1.09 | | | | 0.91 | 0.497 |
| Comp. Ex. 8 | | | | 1 | | | 1.72 | 0.32 | 1.65 | | | | 0.75 | 0.006 |
| Comp. Ex. 9 | | | | 0.92 | | 0.08 | 2.42 | 0.53 | 1.92 | 0.08 | | | 0.89 | 0.177 |
| Comp. Ex. 10 | | | | 0.92 | | 0.08 | 1.87 | 0.46 | 1.87 | | | 0.073 | 0.86 | 0.156 |
| Comp. Ex. 11 | | | | | 0.93 | 0.07 | 6.04 | 0.81 | 1.55 | | | | 0.86 | 0.233 |
| Comp. Ex. 12 | | | | | 0.93 | 0.07 | 5.60 | 0.81 | 1.70 | | | | 0.85 | 0.297 |
| Comp. Ex. 13 | | | | 0.96 | | 0.04 | 0.96 | 0.01 | 1.04 | | | | 0.62 | 0.000 |
| Comp. Ex. 14 | | | | 0.96 | | 0.04 | 0.94 | 0.02 | 0.99 | | | | 0.64 | 0.000 |
| Comp. Ex. 15 | | | | 0.95 | | 0.05 | 0.96 | 0.01 | 1.02 | | | | 0.76 | 0.000 |
| Comp. Ex. 16 | | | | 1 | | | | | 1.80 | | | | 0.47 | 0.000 |
| Comp. Ex. 17 | | | | 1 | | | 0.52 | 0.48 | 0.01 | | | | 0.55 | 0.000 |

REFERENCE SIGNS LIST

11 Membrane electrode assembly (MEA)
12 Gasket
13 Separator
14 Collector
15 Rubber heater
21 Single cell of polymer electrolyte fuel cell
22 Cathode humidifier
23 Anode humidifier
24 Current-voltage property measuring apparatus

The invention claimed is:

1. A method for producing a fuel cell electrode catalyst, comprising:
a step (1) of mixing at least a metal compound (1), a nitrogen-containing organic compound (2), a compound (3) containing fluorine and at least one element A selected from the group consisting of boron, phosphorus, and sulfur, and a solvent to obtain a catalyst precursor solution,
a step (2) of removing the solvent from the catalyst precursor solution, and
a step (3) of heat-treating a solid residue, obtained in the step (2), at a temperature of 500 to 1100° C. to obtain an electrode catalyst;
a portion or the entirety of the metal compound (1) being a compound containing, as a metal element, at least one transition metal element M1 selected from the elements of group 4 and group 5 of the periodic table; and
at least one of the metal compound (1), the nitrogen-containing organic compound (2), and the compound (3) having an oxygen atom.

2. The method for producing a fuel cell electrode catalyst according to claim 1, wherein the compound (3) is at least one selected from the group consisting of boric acid derivatives containing fluorine, sulfonic acid derivatives containing fluorine, and phosphoric acid derivatives containing fluorine.

3. The method for producing a fuel cell electrode catalyst according to claim 1, wherein in the step (1), a solution of the metal compound (1) is mixed with the nitrogen-containing organic compound (2).

4. The method for producing a fuel cell electrode catalyst according to claim 1, wherein in the step (1), a precipitation suppressant comprising a compound having a diketone structure is further mixed.

5. The method for producing a fuel cell electrode catalyst according to claim 1, wherein the metal compound (1) is partially a compound comprising at least one transition metal element M2 selected from iron, nickel, chromium, cobalt, and manganese as a metal element.

6. The method for producing a fuel cell electrode catalyst according to claim 1, wherein the metal compound (1) is at least one selected from the group consisting of metal phosphates, metal sulfates, metal nitrates, metal organic acid salts, metal acid halides, metal alkoxides, metal halides, metal perhalates, metal hypohalites, and metal complexes.

7. The method for producing a fuel cell electrode catalyst according to claim 1, wherein the nitrogen-containing organic compound (2) has, in the molecule, one or more selected from amino group, nitrile group, imido group, imine group, nitro group, amide group, azido group, aziridine group, azo group, isocyanate group, isothiocyanate group, oxime group, diazo group, nitroso group, pyrrole ring, porphyrin ring, imidazole ring, pyridine ring, pyrimidine ring, and pyrazine ring.

8. The method for producing a fuel cell electrode catalyst according to claim 1, wherein the nitrogen-containing organic compound (2) has, in the molecule, one or more selected from hydroxyl group, carboxyl group, aldehyde group, acid halide group, sulfo group, phosphate group, ketone group, ether group, and ester group.

9. The method for producing a fuel cell electrode catalyst according to claim 1, wherein in the step (3), the solid residue is heat-treated in an atmosphere containing 0.01% by volume or more and 10% by volume or less of a hydrogen gas.

10. A method for producing a fuel cell catalyst layer, the method comprising:
carrying out the method of claim 1 to produce a fuel cell electrode catalyst;

carrying out application of a suspension comprising the fuel cell electrode catalyst.

11. A method for producing a fuel cell catalyst layer, the method comprising:
    carrying out the method of claim 1 to produce a fuel cell electrode catalyst,
    applying a suspension comprising the fuel cell electrode catalyst to a porous support layer.

12. A method for producing a membrane electrode assembly, the method comprising:
    carrying out the method of claim 11 to produce an electrode; and
    placing an electrolyte membrane between a cathode and an anode, wherein the cathode and/or the anode is the electrode produced.

13. A method for producing a fuel cell, the method comprising:
    carrying out the method of claim 12 to produce a membrane electrode assembly; and
    holding the membrane electrode assembly by two collectors.

* * * * *